(12) United States Patent
Bressler et al.

(10) Patent No.: US 11,964,895 B2
(45) Date of Patent: Apr. 23, 2024

(54) APPARATUS FOR, AND METHOD OF, ROLL FORMING SHEETS OF HIGH REFRACTIVE INDEX GLASS

(71) Applicant: CORNING INCORPORATED, Corning, NY (US)

(72) Inventors: Douglas Dale Bressler, Julian, PA (US); David Alan Deneka, Corning, NY (US); Michael Charles Gerrish, Corning, NY (US); Douglas Hull Jennings, Corning, NY (US); Miki Eugene Kunitake, Elmira, NY (US); William Edward Lock, Horseheads, NY (US); Shyam Prasad Mudiraj, Valley Cottage, NY (US); Neil Eugene Partridge, Avoca, NY (US); Jeremy Nathan Payne, Corning, NY (US); Eugene Roland Proulx, II, Addison, NY (US); Ryan Christopher Sutton, Corning, NY (US); Steven Howard Tarcza, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/119,570

(22) Filed: Mar. 9, 2023

(65) Prior Publication Data
US 2023/0212052 A1   Jul. 6, 2023

Related U.S. Application Data

(63) Continuation of application No. PCT/US2021/058551, filed on Nov. 9, 2021, and a
(Continued)

(51) Int. Cl.
C03B 17/06   (2006.01)

(52) U.S. Cl.
CPC .......... *C03B 17/067* (2013.01); *C03B 17/068* (2013.01)

(58) Field of Classification Search
None
See application file for complete search history.

(56) References Cited

U.S. PATENT DOCUMENTS

| 7,207,193 B2 | 4/2007 | Kun et al. |
| 8,713,972 B2 | 5/2014 | Lakota et al. |
(Continued)

FOREIGN PATENT DOCUMENTS

| EP | 2077254 A1 | 7/2009 |
| WO | 2005/055284 A2 | 6/2005 |
(Continued)

OTHER PUBLICATIONS

Boley et al., "Theory of Thermal Stresses", John Wiley and Sons.—Textbook, 1960, 19 pages.
(Continued)

*Primary Examiner* — Cynthia Szewczyk
(74) *Attorney, Agent, or Firm* — Amy T. Lang

(57) ABSTRACT

A method of forming a glass sheet comprises: (a) forming a ribbon of glass from molten glass with a pair of forming rollers; (b) reducing horizontal temperature variability of the ribbon of glass to be 10° C. or less across 80 percent of an entire width of the ribbon of glass before the ribbon of glass cools to a glass transition temperature; (c) controlling a cooling rate of the ribbon of glass while the ribbon of glass moves vertically downward within a setting zone such that the ribbon of glass has a first average cooling rate before the ribbon of glass cools to the glass transition temperature and a second average cooling rate after the ribbon of glass cools to the glass transition temperature, the first average cooling
(Continued)

rate being less than the second average cooling rate; and (d) separating a glass sheet from the ribbon of glass.

19 Claims, 35 Drawing Sheets

Related U.S. Application Data continuation of application No. 17/521,364, filed on Nov. 8, 2021, now Pat. No. 11,629,087.

(60) Provisional application No. 63/113,507, filed on Nov. 13, 2020.

(56) References Cited

U.S. PATENT DOCUMENTS

| | | | |
|---|---|---|---|
| 9,643,872 B2 | 5/2017 | Fredholm | |
| 10,246,365 B2 | 4/2019 | Bisson et al. | |
| 11,180,404 B2 | 11/2021 | Fournel et al. | |
| 2004/0093900 A1* | 5/2004 | Fredholm | C03B 17/064 65/44 |
| 2005/0120748 A1* | 6/2005 | Xun | C03B 17/067 65/53 |
| 2007/0062219 A1 | 3/2007 | Blevins et al. | |
| 2009/0170684 A1 | 7/2009 | Kato et al. | |
| 2012/0159990 A1 | 6/2012 | Tsuda et al. | |
| 2012/0304695 A1 | 12/2012 | Lakota et al. | |
| 2014/0013805 A1 | 1/2014 | Kariya et al. | |
| 2019/0169059 A1 | 6/2019 | Fredholm | |

FOREIGN PATENT DOCUMENTS

| | | | | |
|---|---|---|---|---|
| WO | 2012/169430 A1 | 12/2012 | | |
| WO | WO-2013082212 A1 * | 6/2013 | | C03B 13/04 |
| WO | 2017/184544 A1 | 10/2017 | | |

OTHER PUBLICATIONS

European Patent Application No. 21206516 Search Report and Search Opinion dated Jul. 13, 2022; 11 Pages; European Patent Office.

European Patent Application No. 21206516.3 Office Action dated Jul. 27, 2022; 8 Pages; European Patent Office.

NL Search Report; 2027190; dated Aug. 23, 2021; 16 pages; NL Patent Office.

* cited by examiner

Example 8

APPARATUS FOR, AND METHOD OF, ROLL FORMING SHEETS OF HIGH REFRACTIVE INDEX GLASS

This application is a continuation and claims the benefit of priority to U.S. patent application Ser. No. 17/521,364, filed on Nov. 8, 2021 and a continuation and claims the benefit of priority to § 371 of International Application No. PCT/US2021/058551, filed on Nov. 9, 2021, both of which claim the benefit of priority under 35 USC § 119(e) from U.S. Provisional Patent Application Ser. No. 63/113,507 filed on Nov. 13, 2020 which are incorporated by reference herein in their entirety.

BACKGROUND OF THE INVENTION

An augmented reality system adds computer-generated imagery to a real visual scene observed by a user of the system. The augmented reality system typically includes an optical system that is configured to allow viewing of an object or scene, while adding computer-generated imagery to the actual object or scene that is being viewed directly. The optical system can utilize a light guide, which can be made of high refractive index glass, to project the computer-generated image into the user's field of view. Deviations in the geometry of the light guide can reduce the quality of the images guided through the light guide and displayed for the user. For example, the total thickness variation and the warp of the light guide should be minimized to allow for the output of high-quality images. Further, the light guide is specified sometimes to be relatively thin.

One process to achieve a light guide with acceptable total thickness variation and warp is to cast boules of the high refractive index glass, to saw the boules into numerous wafers, and either to lap and polish the wafers or to reheat the wafers to flatten them. However, these processes are expensive and time-consuming. Further, reheating the wafers can cause devitrification of the glass.

Moreover, fusion manufacturing processes can be incompatible with high refractive index glass compositions, because the liquidus viscosity associated with such glass compositions is too low (e.g., 1 to 100 Poise). In addition, some processes are unable to produce the glass with the requisite thinness.

SUMMARY OF THE DISCLOSURE

The present disclosure addresses those problems by continuously roll forming a ribbon of glass of high refractive index glass, from which glass sheets can be separated. The glass sheets can be segmented into the required dimensions for application with the augmented reality devices. This process is less expensive than the wafers-from-boule process described above.

However, it has been discovered that there is a further problem in that continuously roll forming the ribbon of glass of the high refractive index glass can result in fracture of the ribbon of glass or in separated glass sheets that have suboptimal total thickness variation and warp. The present disclosure addresses this problem, as well, by (a) reducing horizontal temperature variability of the ribbon of glass before the ribbon of glass cools to a glass transition temperature; (b) one or more of (i) reducing the rate of temperature decrease of the ribbon of glass vertically before the ribbon of glass cools to the glass transition temperature and (ii) increasing the rate of temperature decrease of the ribbon of glass vertically after the ribbon of glass cools to the glass transition temperature; and (c) extracting heat from one or both of opposing rollers that roll form the molten glass into the ribbon of molten glass. Reducing horizontal temperature variability of the ribbon of glass reduces total thickness variation and warp of glass sheets separated from the ribbon of glass. One or more of (i) reducing the rate of temperature decrease of the ribbon of glass vertically before the ribbon of glass cools to the glass transition temperature, and (ii) increasing the rate of temperature decrease of the ribbon of glass vertically after the ribbon of glass cools to the glass transition temperature, as further explained below, cause the strain profile of the ribbon of glass vertically to be more linear. A more linear strain profile reduces the likelihood that the ribbon of glass will fracture upon separation of the sheet of glass, and reduces the total thickness variation and warp of the sheet of glass. Further, extracting heat from one or both of the opposing rollers reduces outward expansion of the center of the rollers, which would otherwise form the ribbon of glass with thickness variation and warp.

The present disclosure reduces horizontal temperature variability of the ribbon of glass in one or more of the following ways: (i) widening the width of the stream of molten glass delivered to a gap between the opposing rollers that form the molten glass into the ribbon of molten glass; (ii) increasing heat loss of lateral edges of the ribbon of glass relative to the ribbon of glass between the lateral edges; (iii) reducing heat loss of a center portion of the ribbon of glass between the lateral edges relative to the heat loss of the lateral edges; or (iv) increasing the height of the puddle of molten glass within the gap between the forming rollers. The present disclosure widens the width of the stream of molten glass delivered to the gap by utilizing a distributive feed device to deliver the stream of molten glass. The present disclosure increases heat loss of the lateral edges of the ribbon of glass relative to the central portion of the ribbon of glass in one of the following ways: (i) by blowing air onto the lateral edges; or (ii) reducing the thickness of the lateral edges of the ribbon of glass. The present disclosure reduces heat loss of the center portion of the ribbon of glass relative to the heat loss of the lateral edges by facing heat loss reduction elements (such as insulative substrates, heat producing elements, or combinations thereof) at the central portion of the ribbon of glass but not the lateral edges. The present disclosure increases the height of the puddle of molten glass within the gap between the forming rollers by utilizing lateral dams above the rollers to limit lateral spread of the puddle of molten glass.

The present disclosure reduces the rate of temperature decrease of the ribbon of glass vertically before the ribbon of glass cools to the glass transition temperature also with the heat loss reduction elements facing the central portion of the ribbon of glass.

The present disclosure increases the rate of temperature decrease of the ribbon of glass vertically after the ribbon of glass cools to the glass transition temperature by facing the ribbon of glass to a radiative cooling element or blowing a cooling fluid (such as air) onto the ribbon of glass.

The present disclosure extracts heat from at least one of the forming rollers by (i) by utilizing a heat exchanger within the forming roller; (ii) by utilizing a sprayer to spray a liquid onto the roller; (iii) by contacting the roller with a liquid cooled metal brush; and/or (iv) by opposing the roller with a liquid cooled riding block.

In addition, continuously roll forming the ribbon of glass of the high refractive index glass can result in the ribbon of glass and thus the separated sample of glass being thicker than desired. The present disclosure addresses that problem by utilizing forming rollers with an outer diameter of less than 80 mm, such as 20 mm to 80 mm.

According to a first aspect of the present disclosure, a method of forming a glass sheet comprises: (a) forming a ribbon of glass from molten glass with a pair of forming rollers; (b) reducing horizontal temperature variability of the ribbon of glass to be 10° C. or less across 80 percent of an entire width of the ribbon of glass before the ribbon of glass cools to a glass transition temperature; (c) controlling a cooling rate of the ribbon of glass while the ribbon of glass moves vertically downward within a setting zone such that the ribbon of glass has a first average cooling rate before the ribbon of glass cools to the glass transition temperature and a second average cooling rate after the ribbon of glass cools to the glass transition temperature, the first average cooling rate being less than the second average cooling rate; and (d) separating a glass sheet from the ribbon of glass.

According to another aspect of the present disclosure, an apparatus for roll forming a ribbon of glass comprises: (a) pair of forming rollers separated by a gap, each roller of the pair of forming rollers having an axis of rotation such that the axes of rotation are parallel to each other, the gap having a minimum distance disposed along a horizontal plane extending through both axes of rotation, and a vertical plane that is parallel to the axes of rotation extends through the gap; (b) a feed device for supplying a stream of molten glass into the gap, the feed device disposed vertically above the horizontal plane extending through the axes of rotation of the pair of forming rollers, the feed device comprising an internal chamber, a floor, and a slot through the floor that provides passage from the internal chamber; and (c) a pair of heat loss reduction elements, one heat loss reduction element disposed on each side of the vertical plane extending through the gap between the pair of forming rolls, each heat loss reduction element being disposed below the horizontal plane that extends through both axes of rotation of the pair of forming rollers.

According to another aspect of the present disclosure, an apparatus for roll forming a ribbon of glass comprises: (a) a pair of forming rollers, each forming roller having an axis of rotation and an outer cylindrical surface, the pair of forming rollers being separated by a gap and the axes of rotation are parallel to each other, the gap having a minimum distance disposed along a horizontal plane extending through both axes of rotation; (b) a feed device for supplying a stream of molten glass into the gap, the feed device disposed vertically above the horizontal plane extending through the axes of rotation of the pair of forming rollers; (c) a first lateral edge cooling element and a second lateral edge cooling element both disposed vertically below the horizontal plane, the first lateral edge cooling element configured to decrease temperature of a first lateral edge of the ribbon of glass and the second lateral edge cooling element configured to decrease temperature of a second lateral edge of the ribbon of glass; and (d) a pair of dams disposed above the horizontal plane cooperating with the outer cylindrical surfaces to retain molten glass, one or both of the pair of dams being laterally movable toward and away from the other of the pair of dams.

According to another aspect of the present disclosure, a method of forming a ribbon of glass comprises: supplying molten glass into a gap separating a pair of forming rollers; wherein, the molten glass has a viscosity of 0.01 Poise to 3000 Poise; wherein, each of the pair of forming rollers has an outer diameter; and wherein, the outer diameter of the forming rollers is 20 mm to 80 mm.

These and other features, advantages, and objects of the present invention will be further understood and appreciated by those skilled in the art by reference to the following specification, claims, and appended drawings.

DETAILED DESCRIPTION

Figure 1:
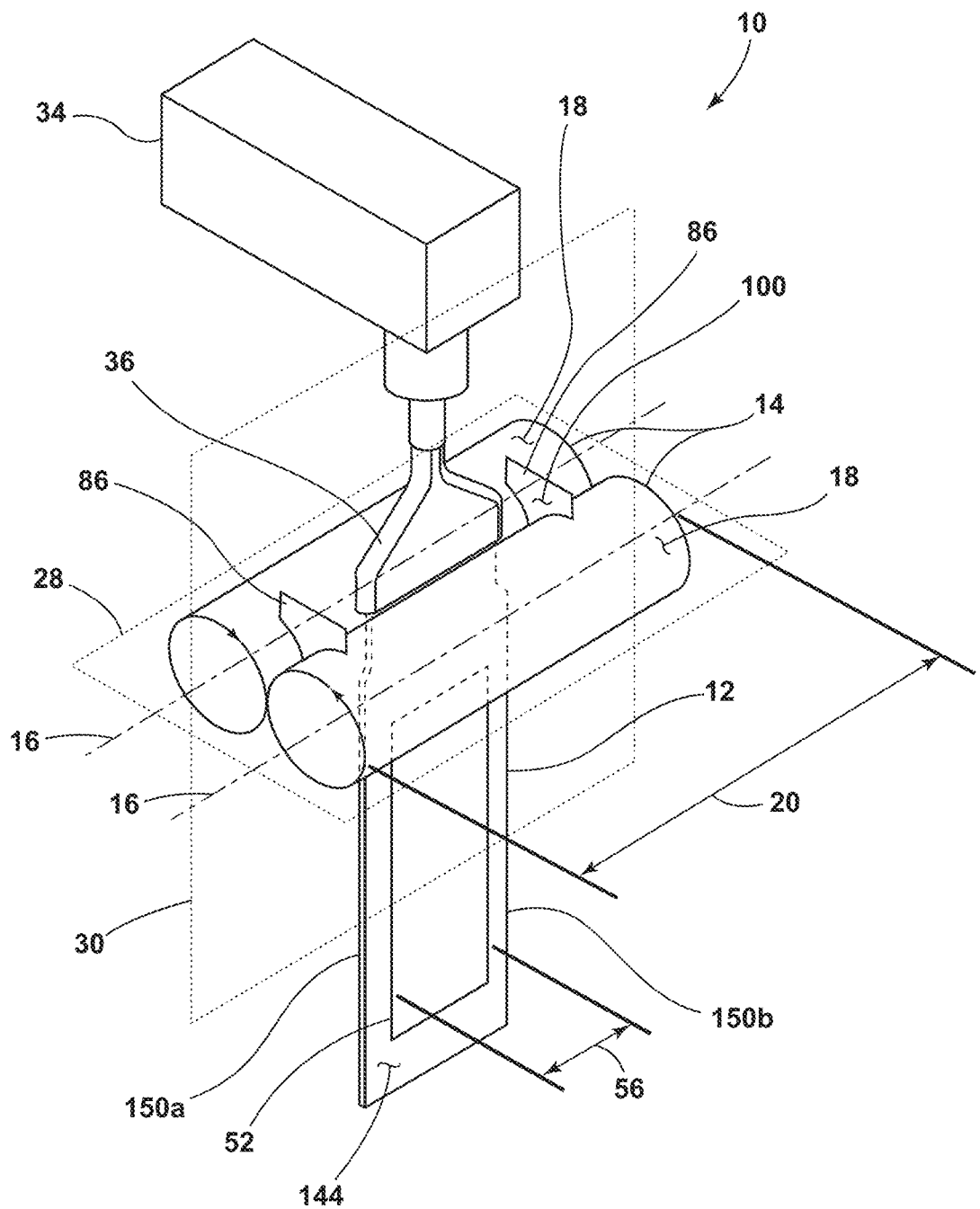
FIG. 1 is a perspective view of an apparatus of the disclosure, illustrating a pair of forming rollers forming a ribbon of glass from molten glass supplied by a feed device.
Figure 2:
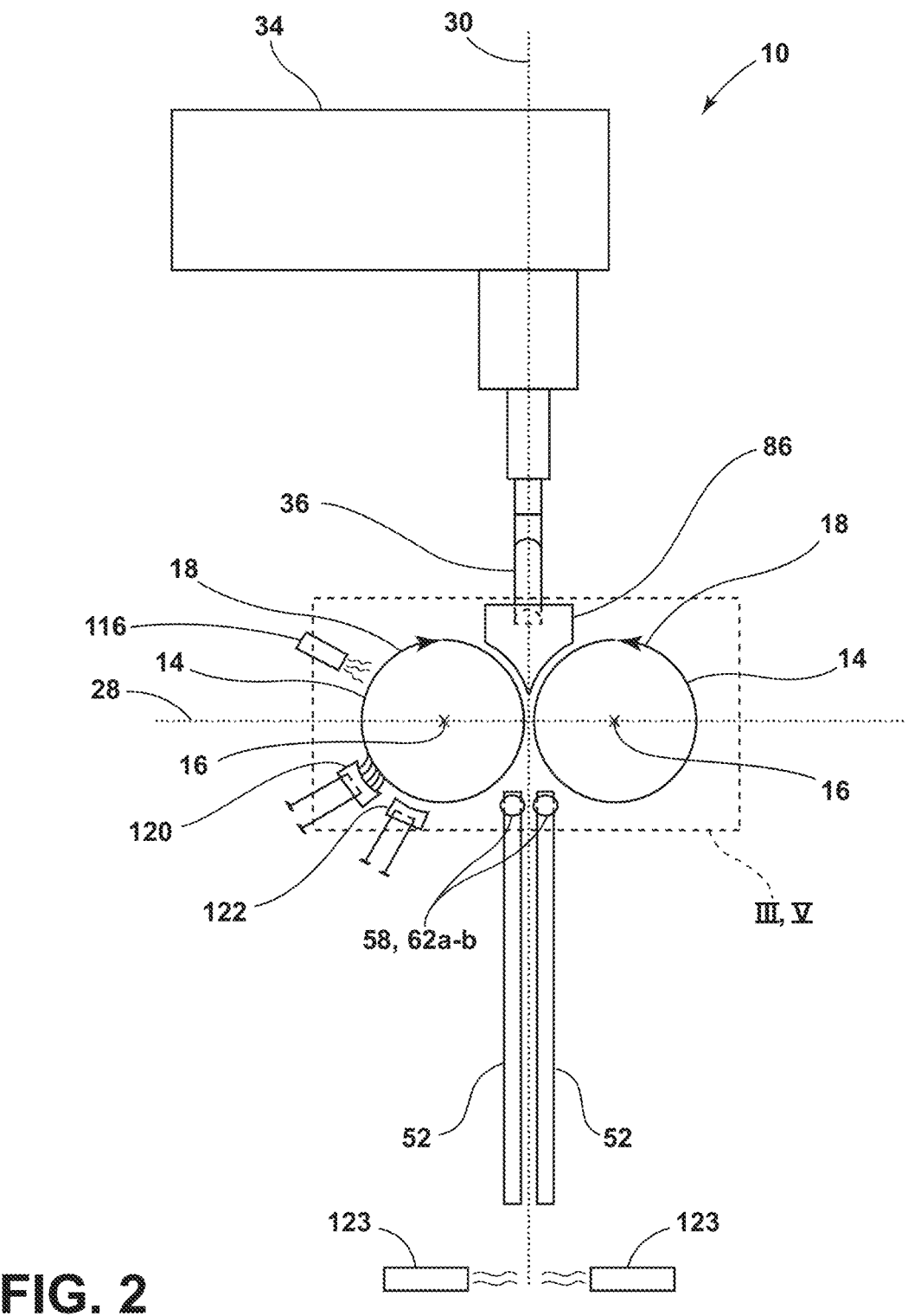
FIG. 2 is a side view of the apparatus of FIG. 1, illustrating a horizontal plane extending through axes of rotation of the forming rollers, a vertical plane extending through a gap between the forming rollers, and a pair of heat loss reduction elements—one heat loss reduction element disposed on each side of the vertical plane below the horizontal plane.
Figure 3:
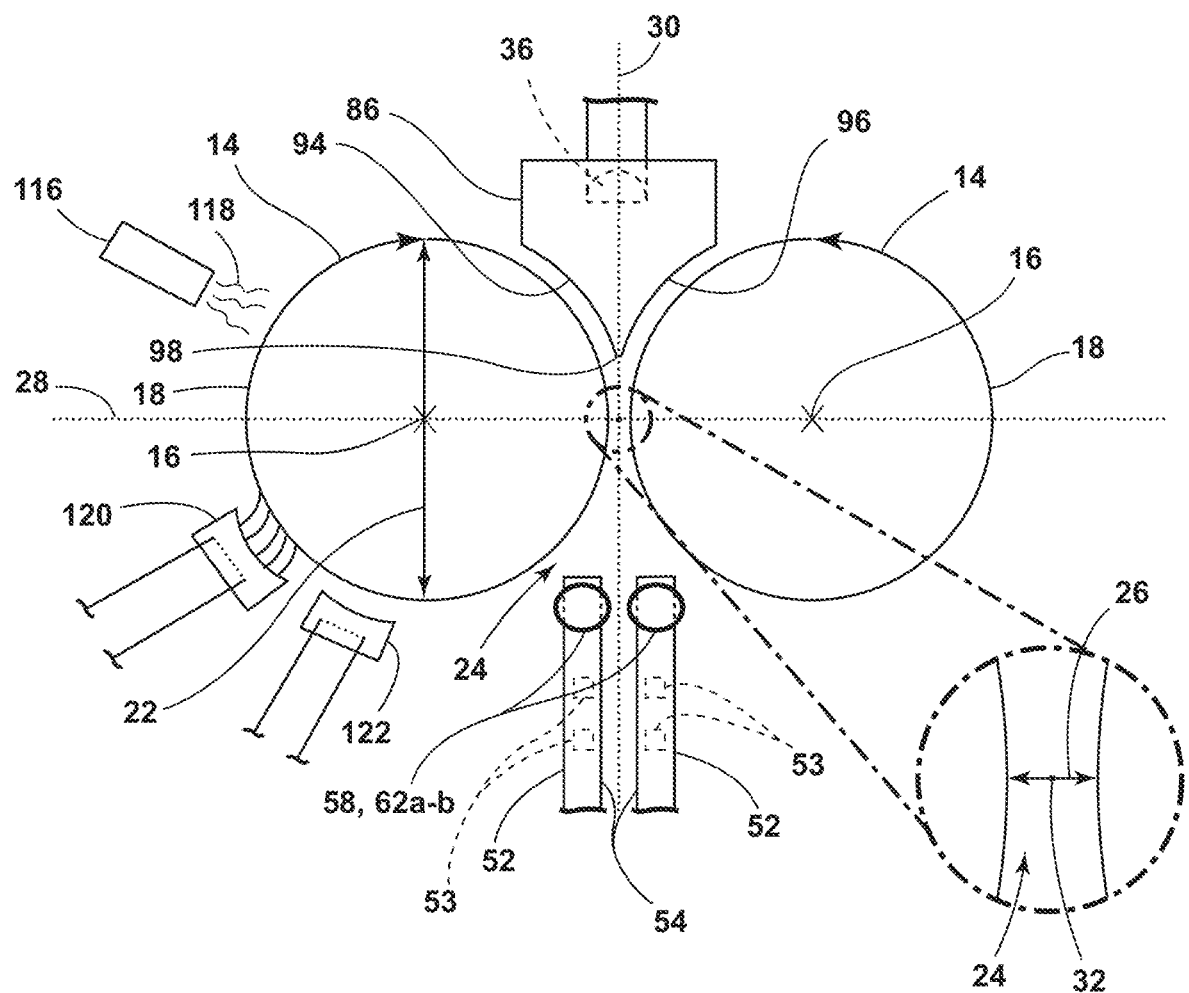
FIG. 3 is a close-up view of area III of FIG. 2, illustrating a first lateral edge cooling element in the form of pinching rollers disposed on each side of the vertical plane and below the horizontal plane.

Referring now to FIGS. 1-3, an apparatus 10 for roll forming a ribbon of glass 12 is illustrated and herein described. The apparatus 10 includes a pair of forming rollers 14. Each forming roller 14 has an axis of rotation 16 and an outer cylindrical surface 18. The axes of rotation 16 are parallel to each other. In operation of the apparatus 10, each forming roller 14 rotates about the axis of rotation 16, as indicated by the arrows. The forming rollers 14 can be formed out of steel. Each forming roller 14 has a width 20 that is parallel to the axis of rotation 16 of the forming roller 14. In embodiments, the width 20 of each forming roller 14 is 100 mm to 500 mm, such as 100 mm, 200 mm, 250 mm, 300 mm, 350 mm, 400 mm, or 500 mm, or any range including any two those values (e.g., 200 mm to 400 mm). The widths 20 of the forming rollers 14 can be the same but need not be the same. In embodiments, the outer cylindrical surface 18 is at an outer diameter 22 of 20 mm to 600 mm, such as 20 mm, 25 mm, 50 mm, 60 mm, 80 mm, 100 mm, 110 mm, 200 mm, 300 mm, 400 mm, 500 mm, or 600 mm, or any range including any two of those values (e.g., 20 mm to 80 mm, 50 mm to 110 mm, and so on). Unless stated otherwise, any range described herein is inclusive of the end points of the range. For example, "outer diameter 22 of 20 mm to 600 mm" means that the outer diameter 22 is greater than or equal to 20 mm and less than or equal to 600 mm (i.e., 20 mm≤outer diameter 22≤600 mm).

A gap 24 separates the pair of forming rollers 14. The gap 24 is at a minimum distance 26 at a horizontal plane 28 that extends through both the axes of rotation 16. A vertical plane 30 extends vertically through the gap 24. The vertical plane 30 is oriented parallel to the axes of rotation 16 of the forming rollers 14. The vertical plane 30 and the horizontal plane 28 are thus orthogonal to each other and intersect within the gap 24 between the forming rollers 14, such as at a midpoint 32 of the minimum distance 26 of the gap 24. The vertical plane 30 and the horizontal plane 28 are not structural features of the apparatus 10 but, rather, are conceptual guides to help explain relative orientation of the structural features of the apparatus 10.

The apparatus 10 further includes a delivery system 34 and a feed device 36 in communication with the delivery system 34. The feed device 36 is disposed vertically above the horizontal plane 28 that extends through the axes of rotation 16 of the pair of forming rollers 14. In embodiments, the delivery system 34 is a crucible. In embodiments, the delivery system 34 is continuous process. In embodiments, the feed device 36 is a distributive tube (see, e.g., FIG. 17), which can be made of platinum.

Figure 4:
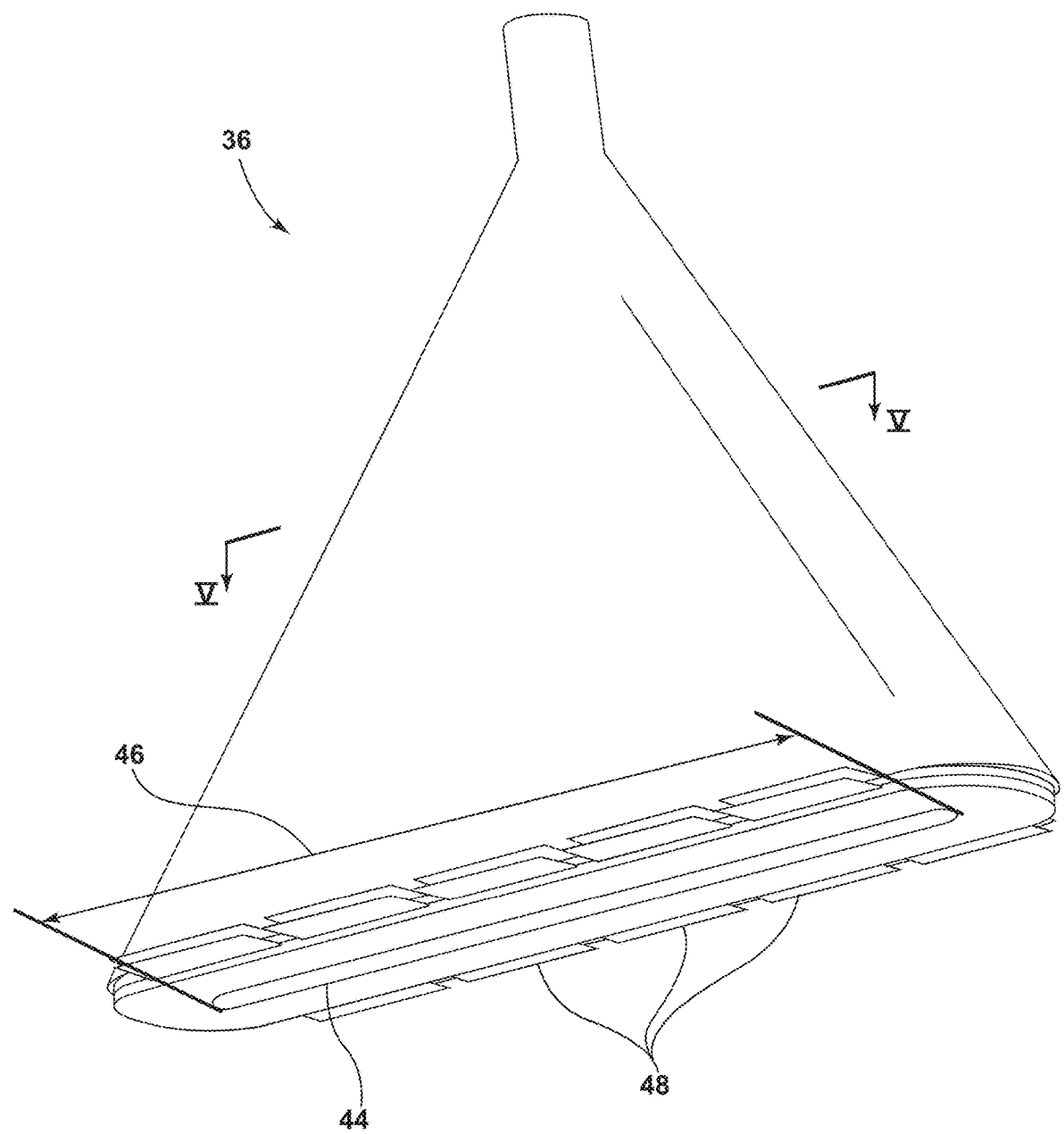
FIG. 4 is an embodiment of the feed device of the apparatus of FIG. 1, which is a distributive feed device with a slot and heating elements.
Figure 5:
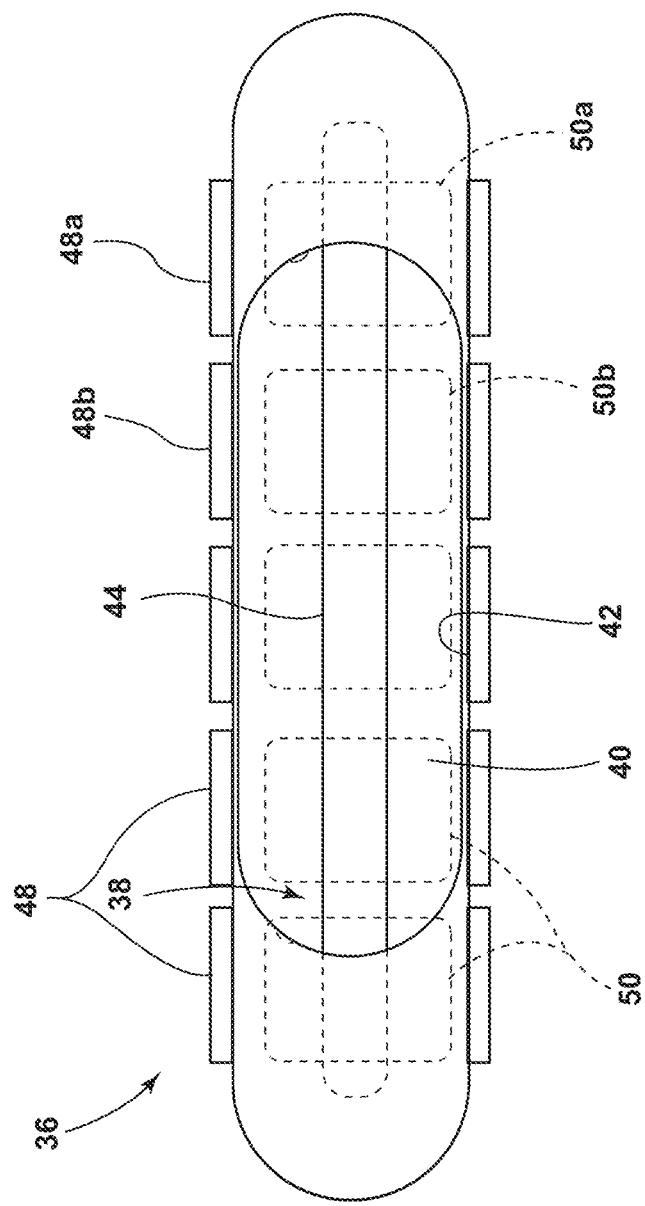
FIG. 5 is a top-down cross-sectional view of the distributive feed device of FIG. 4 taken through line V-V, illustrating a floor and a side defining an internal chamber in communication with the slot.

Referring now additionally to FIGS. 4 and 5, in embodiments, the feed device 36 is a distributive feed device 36. The distributive feed device 36 includes an internal chamber 38, as well as a floor 40 and sides 42 extending upward from the floor 40 to define the internal chamber 38. The distributive feed device 36 further includes a slot 44 through the floor 40 that provides passage from the internal chamber 38 out of the distributive feed device 36. The slot 44 is disposed along a width 46 that is parallel to the axes of rotation 16 of the pair of forming rollers 14. In embodiments, the width 46 is 200 mm to 400 mm, such as 200 mm, 250 mm, 300 mm, 350 mm, or 400 mm, or any range that includes any of those values (e.g., 250 mm to 350 mm). In other embodiments, the width 46 is greater than 400 mm.

In embodiments, the distributive feed device 36 includes a plurality of heating elements 48. The plurality of heating elements 48 are in thermal communication with the internal chamber 38. Each of the plurality of heating elements 48 have thermal output that is individually controllable to heat the floor 40 of the internal chamber 38 to different temperatures throughout different heating zones 50. For example, heating element 48a can be individually controlled to produce a first thermal output that heats the floor 40 of the internal chamber 38 to a first temperature throughout heating zone 50a. Simultaneously, heating element 48b can be individually controlled to produce a second thermal output that heats the floor 40 of the internal chamber 38 to a second temperature throughout a heating zone 50b. The plurality of heating elements 48 can produce heat via electrical resistance, among other options.

In embodiments, the apparatus 10 further includes a pair of heat loss reduction elements 52 (see, e.g., FIGS. 2 and 3), one on each side of the vertical plane 30. Each heat loss reduction element 52 has a surface 54, which can be planar, facing the vertical plane 30 that extends through the gap 24 between the pair of forming rollers 14. Each heat loss reduction element 52 is disposed vertically below the horizontal plane 28 that extends through the axes of rotation 16 of the pair of forming rollers 14. Each heat loss reduction element 52 has a width 56 parallel to the axes of rotation 16 of the pair of forming rollers 14. The width 56 of each heat loss reduction element 52 is narrower than the width 20 of the pair of forming rollers 14. In embodiments, the heat loss reduction element 52 is passive, such as an insulative substrate. In embodiments, the heat loss reduction element 52 is active and includes a heating element. In embodiments, the heat loss reduction element 52 includes one or more heating elements 53, the thermal output of each of which is individually controllable. In embodiments, multiple heating elements 53 are arranged in a row horizontally. In embodiments, multiple heating elements 53 are arranged in a column vertically. In embodiments, multiple heating elements 53 are arranged in rows horizontally and in columns vertically.

Figure 6A:
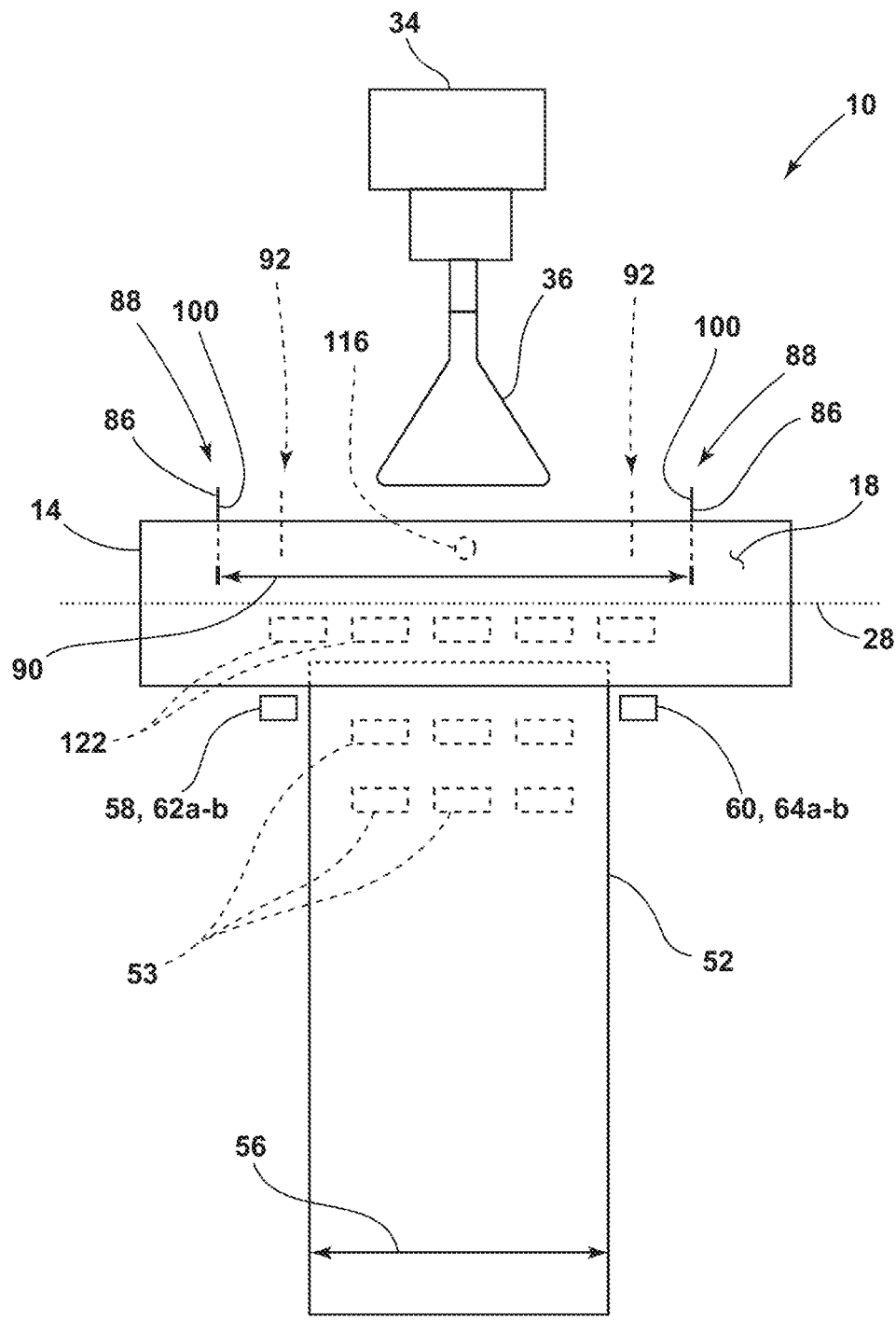
FIG. 6A is an elevation view of the apparatus of FIG. 1, illustrating the first lateral edge cooling element and a second lateral edge cooling element in the form of pairs of pinching rollers disposed below the horizontal plane and laterally away from the insulative substrates.
Figure 6B:
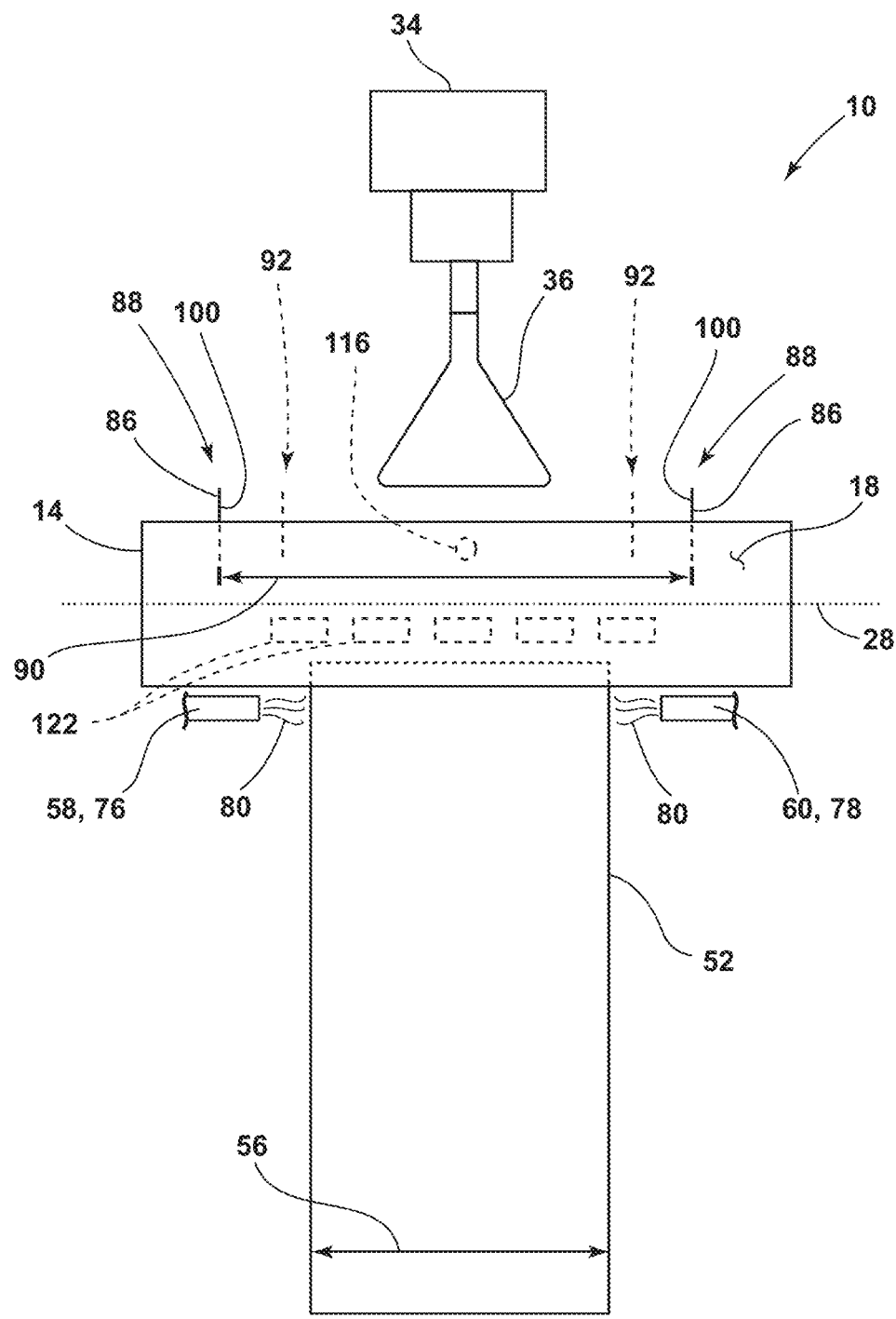
FIG. 6B is an elevation view of the apparatus of FIG. 1, illustrating the first lateral edge cooling element and the second lateral edge cooling element in the form of tube outlets blowing cooling gas laterally inward.
Figure 6C:
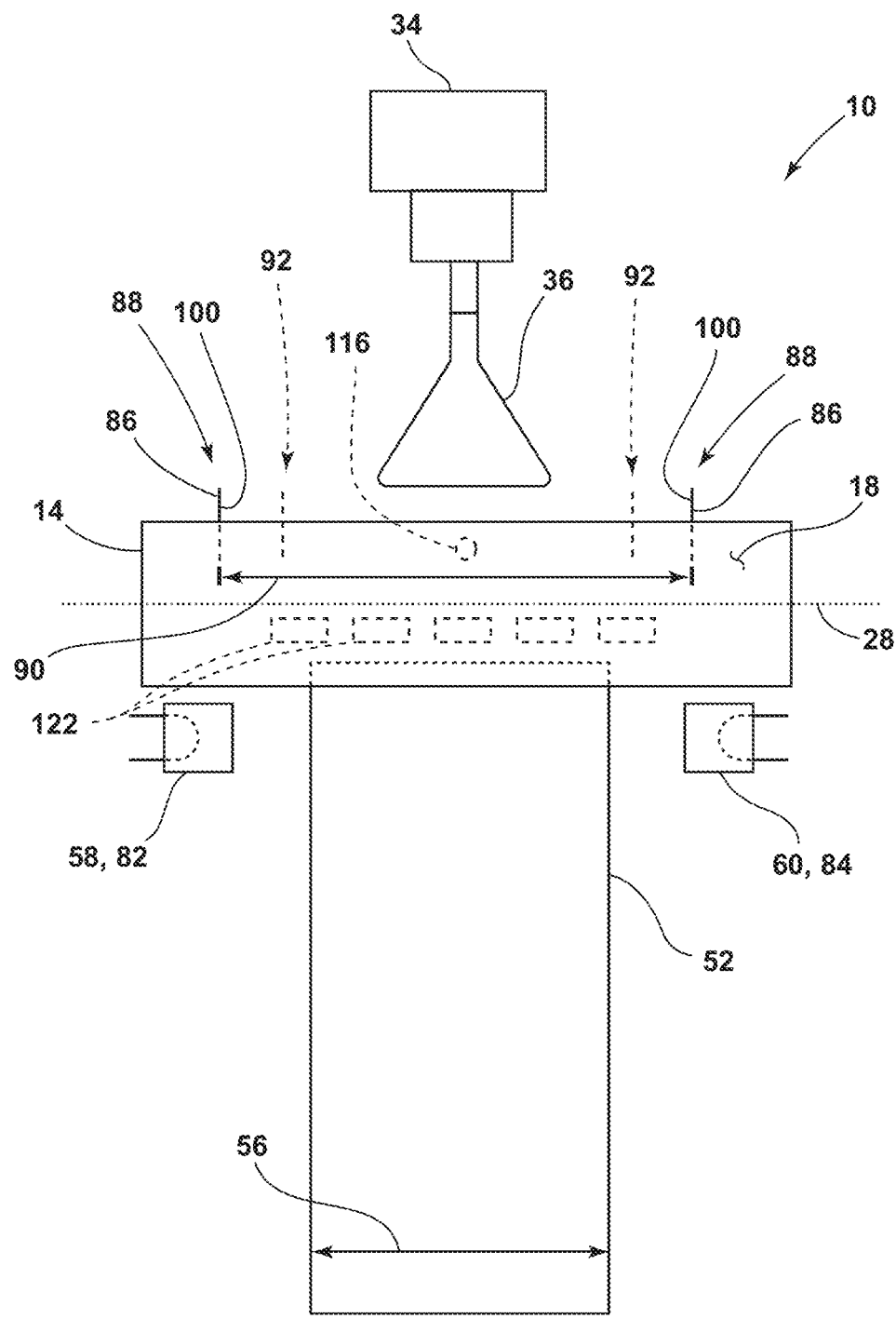
FIG. 6C is an elevation view of the apparatus of FIG. 1, illustrating the first lateral edge cooling element and the second lateral edge cooling element in the form of radiative absorptive elements thermally managed by a cooling fluid.

Referring now additionally to FIGS. 6A-6C, in embodiments, the apparatus 10 further includes a first lateral edge cooling element 58 and a second lateral edge cooling element 60. The first lateral edge cooling element 58 and the second lateral edge cooling element 60 are both disposed vertically below the horizontal plane 28 that extends through the axes of rotation 16 of the pair of forming rollers 14. As will be explained below, the first lateral edge cooling element 58 and the second lateral edge cooling element 60 are positioned to cool the lateral edges of the ribbon of glass 12. The first lateral edge cooling element 58 and the second lateral edge cooling element 60 can take a variety of forms, as further described herein.

Figure 7:
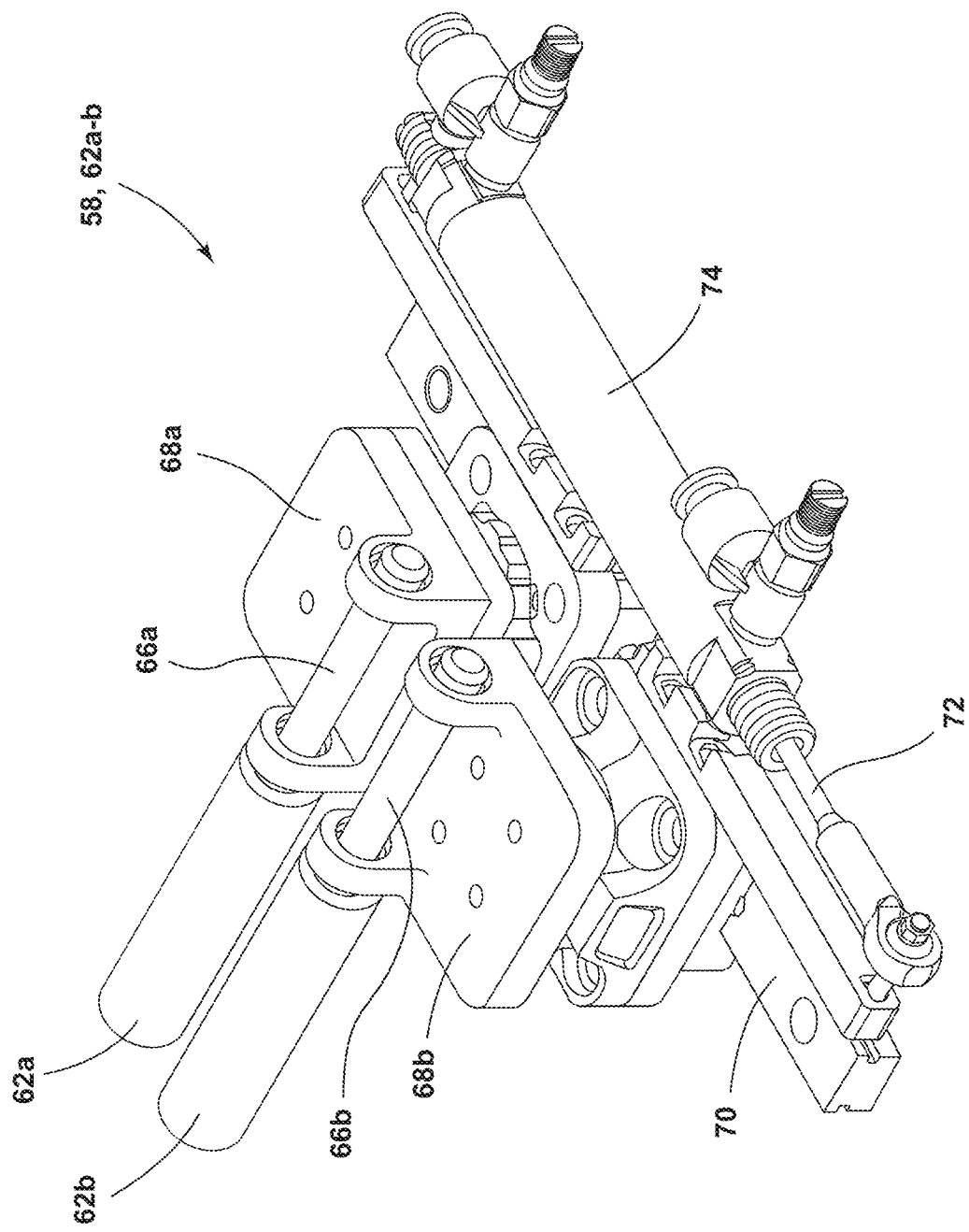
FIG. 7 is a perspective view of one of the pair of pinching rollers of FIG. 6A.

Referring now additionally to FIG. 7, in embodiments, the first lateral edge cooling element 58 includes a first pair of pinching rollers 62a-b (see FIG. 6A), and the second lateral edge cooling element 60 comprises a second pair of pinching rollers 64a-b. One roller of the first pair of pinching rollers 62a-b is positioned to one side of the vertical plane 30 extending through the gap 24 between the pair of forming rollers 14, and the other roller of the first pair of pinching rollers 62a-b is positioned to the other side of the vertical plane 30. Likewise, one roller of the second pair of pinching rollers 64a-b is positioned to one side of the vertical plane 30, and the other roller of the second pair of pinching rollers 64*a-b* is positioned to the other side of the vertical plane 30. The roller 62*a* of the first pair of pinching rollers 62*a-b* includes a laterally extending axle 66*a*. A static support base 68*a* holds the axle 66*a*, allowing the roller 62*a* to rotate about the axle 66*a*. The other roller 62*b* of the first pair of pinching rollers 62*a-b* likewise includes a laterally extending axle 66*b*. A movable support base 68*b* holds the axle 66*b*, allowing the roller 62*b* to rotate about the axle 66*b*. The movable support base 68*b* is able to move upon a track 70 that extends parallel to the horizontal plane 28 extending through the axes of rotation 16 of the pair of forming rollers 14. The movable support base 68*b* is connected to a piston 72, which is actuated by an actuator 74. Manipulation of the actuator 74 causes the movable support base 68*b* to move and thus positions the roller closer to or further away from the other roller. The second pair of pinching rollers 64*a-b* can take the same general structure, just configured as a mirror image of the first pair of pinching rollers 62*a-b*. In embodiments, the first pair of pinching rollers 62*a-b* and the second pair of pinching rollers 64*a-b* can be thermally controllable. In other words, the thermal output can be controlled, such as with a temperature setting. As will be explained further below, the first pair of pinching rollers 62*a-b* and the second pair of pinching rollers 64*a-b* apply a pinching force to the lateral edges of the ribbon of glass 12 to decrease the thickness thereof and thereby cool the same.

In other embodiments (see FIG. 6B), the first lateral edge cooling element 58 includes a first tube outlet 76, and the second lateral edge cooling element 60 comprises a second tube outlet 78. The first tube outlet 76 is positioned to blow cooling gas 80 inward horizontally parallel to the vertical plane 30 extending through the pair of forming rollers 14. The second tube outlet 78 is positioned to blow cooling gas 80 inward horizontally parallel to the vertical plane 30 extending through the pair of forming rollers 14, but in the opposite direction as the first tube outlet 76. Both the first tube outlet 76 and the second tube outlet 78 are disposed below the horizontal plane 28 extending through the axes of rotation 16 of the pair of forming rollers 14. As will be explained below, the first tube outlet 76 and the second tube outlet 78 are positioned to blow cooling gas 80 at the lateral edges of the ribbon of glass 12 to cool the same.

In still other embodiments (see FIG. 6C), the first lateral edge cooling element 58 includes a first radiative absorptive element 82, and the second lateral edge cooling element 60 includes a second radiative absorptive element 84. The first radiative absorptive element 82 is positioned adjacent to the vertical plane 30 extending through the gap 24 between the pair of forming rollers 14. The second radiative absorptive element 84 is positioned adjacent to the vertical plane 30 as well but opposite the first radiative absorptive element 82. In embodiments, the first radiative absorptive element 82 and the second radiative absorptive element 84 receive cooling fluid. The cooling fluid can be water or air, among other options. As will be explained further below, the first radiative absorptive element 82 and the second radiative absorptive element 84 are positioned to cool the lateral edges of the ribbon of glass 12 by absorbing heat from the lateral edges. Although the disclosure describes several forms that the first lateral edge cooling element 58 and the second lateral edge cooling element 60 can take, the described forms are not exclusive and the first lateral edge cooling element 58 and the second lateral edge cooling element 60 encompass any other thing that is configured and positioned to cool the lateral edges of the ribbon of glass 12 approximate the horizontal plane 28.

Figure 8A:
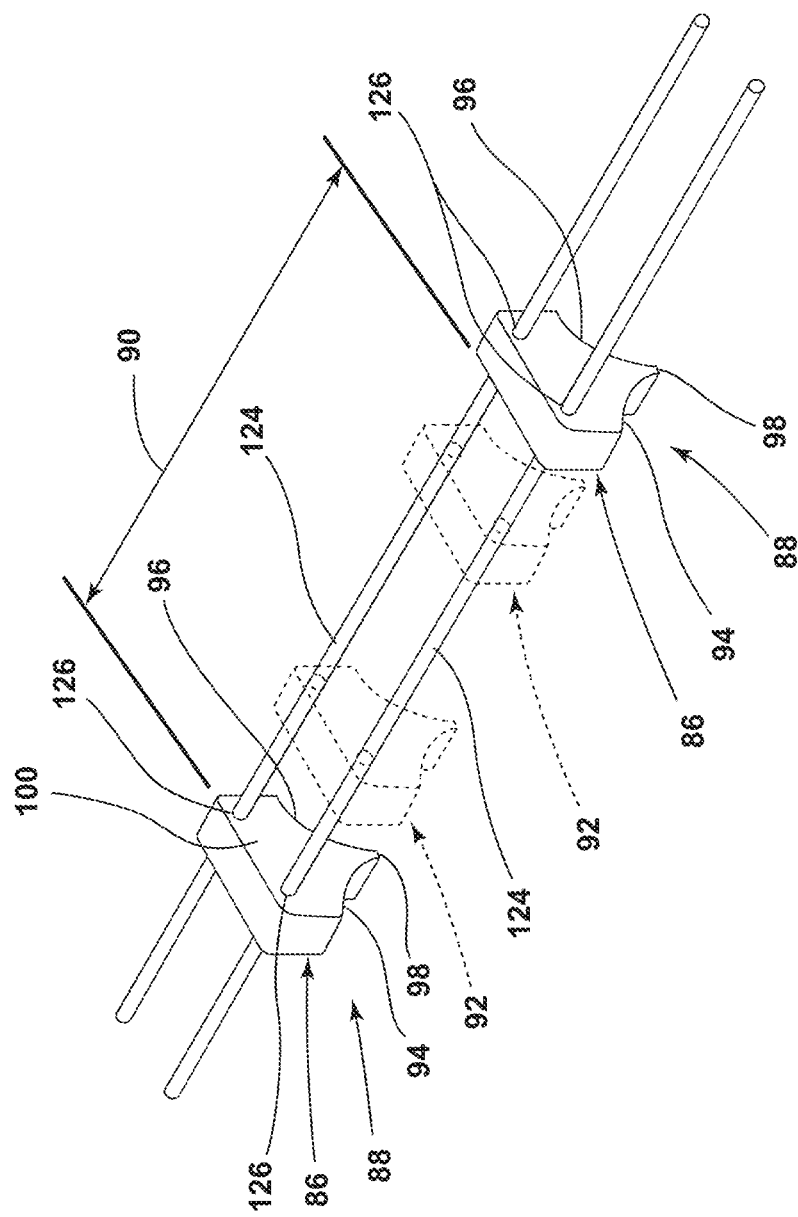
FIG. 8A is a perspective view of an embodiment of dams used with the apparatus of FIG. 1, illustrating the dams movable to, from, and between a first position and a second position where the dams are closer together than in the first position.
Figure 8B:
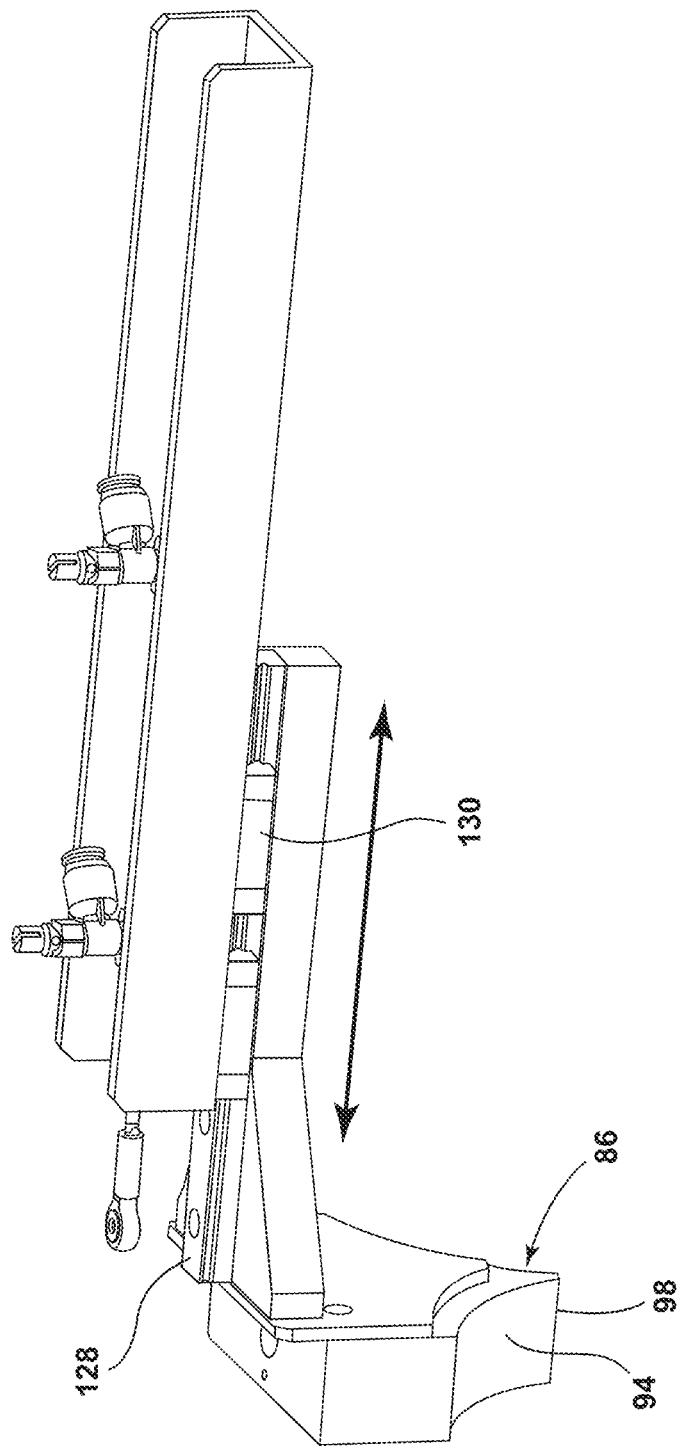
FIG. 8B is a perspective view of another embodiment of a dam used with the apparatus of FIG. 1, illustrating the dam slidably movable in relation to a track.

Referring now additionally to FIGS. 8A and 8B, in embodiments, the apparatus 10 further comprises a pair of dams 86. The pair of dams 86 are disposed above the horizontal plane 28 that extends through the axes of rotation 16 of the pair of forming rollers 14. One or both of the pair of dams 86 is laterally movable toward and away from the other of the pair of dams 86. The dams 86 can take a first position 88 where a distance 90 separates the dams 86. The dams 86 can move to, from, and between the first position 88 and a second position 92 where the distance that separates the dams 86 is less than when the dams 86 are in the first position 88. As further detailed below, the pair of dams 86 cooperate with the outer cylindrical surface 18 of the pair of forming rollers 14 to manipulate the width and height of molten glass introduced into the gap 24 between the pair of forming rollers 14.

In embodiments, each dam 86 includes a first contoured surface 94 and a second contoured surface 96. The first contoured surface 94 conforms to the outer cylindrical surface 18 of one of the pair of forming rollers 14. The second contoured surface 96 conforms to the outer cylindrical surface 18 of the other of the pair of forming rollers 14. By "conforms" it is meant that the first contoured surface 94 is arcuate and has a constant radius from the axis of rotation 16 of the forming roller 14 that the first contoured surface 94 faces, and likewise that the second contoured surface 96 is arcuate and has a constant radius from the axis of rotation 16 of the forming roller 14 that the second contoured surface 96 faces. Each dam 86 can further include a bottom edge 98, where the first contoured surface 94 and the second contoured surface 96 come closest to converging. In embodiments, the bottom edge 98 separates the first contoured surface 94 from the second contoured surface 96 by 0.7 mm to 2.0 mm. Each of the pair of dams 86 includes a primary inward facing surface 100. In embodiments, the primary inward facing surface 100 is planar and orthogonal to the vertical plane 30 extending through the gap 24 between the pair of forming rollers 14.

In embodiments, the dams 86 are suspended upon a pair of positioning rods 124 (see FIG. 8A) that extend horizontally parallel to the axes of rotation 16 of the pair of forming rollers 14. Each of the dams 86 includes a pair of apertures 126, and one of the positioning rods 124 extends through each aperture 126. The lateral position of each dam 86 along the positioning rods 124 can be altered to move the dam 86 to, from, and between the first position 88 and the second position 92. In other embodiments, each dam 86 is mounted to a slide 128 (see FIG. 8B) that is suspended from a track 130 within which the slide 128 is able to slide to allow the dam 86 to move to and from the first position 88 and the second position 92.

In embodiments, the outer cylindrical surface 18 of each of the forming rollers 14 is cooled to lower the temperature. As explained in further detail in connection with Comparative Example 3 below, as the forming rollers 14 contact molten glass, the outer cylindrical surface 18 of the forming rollers 14 expands, with the greatest amount of expansion occurring in the middle of the width 20, thus forming an outward bow that imprints a dog bone shape into the ribbon of glass 12. The active cooling (or complementary active heating) helps prevent or limit the expansion of the outer cylindrical surface 18 of the forming rollers 14.

Figure 9:
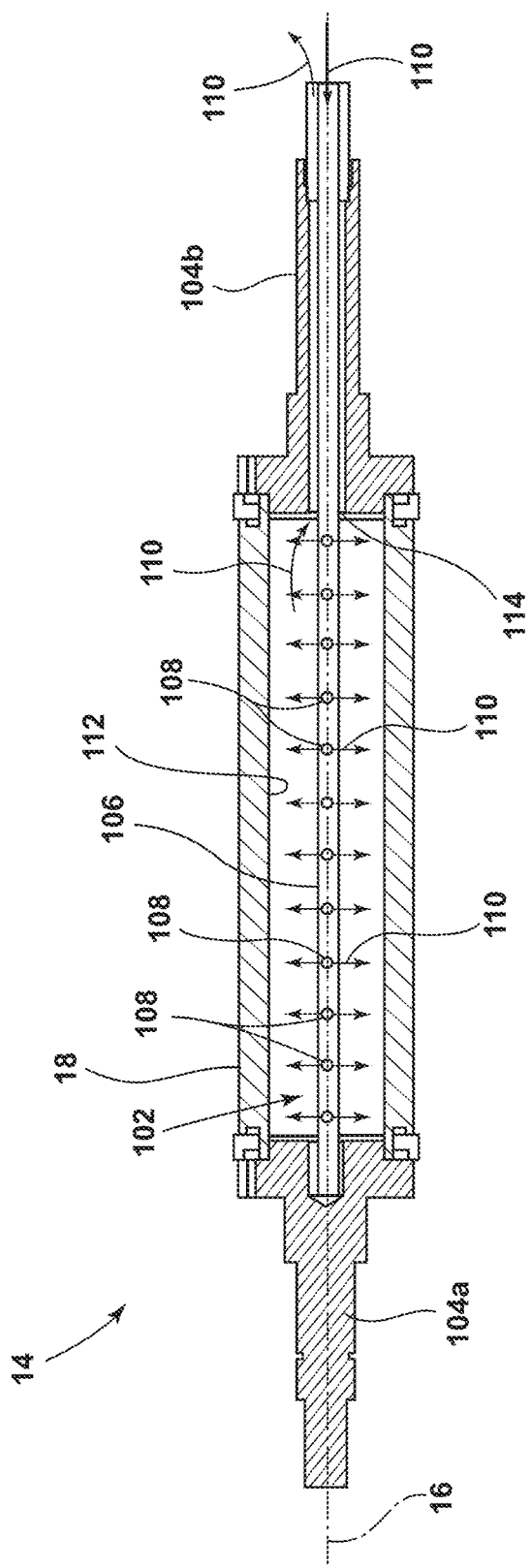
FIG. 9 is an elevation cross-sectional view of one of the forming rollers of FIG. 1, illustrating a heat exchanger to introduce cooling fluid into an interior of the forming roller to cool an outer cylindrical surface of the forming roller.

In this regard, referring now to FIG. 9, in embodiments, the apparatus 10 further includes a heat exchanger 102 disposed within one or both of the forming rollers 14 providing a passage for a cooling fluid 110 in thermal communication with the outer cylindrical surface 18 of the forming roller 14. As an example, the forming roller 14 includes lateral shafts 104a-b, that define the axis of rotation 16. The forming roller 14 further includes a distributor 106 with a plurality of holes 108 disposed inward toward the axis of rotation 16 from the outer cylindrical surface 18. The cooling fluid 110, such as water, air and water mist, or other suitable cooling fluid 110, is fed under pressure to the distributor 106. The cooling fluid 110 sprays from the holes 108 through the distributor 106 onto an inner cylindrical surface 112 of the forming roller 14 and thereby cools the inner cylindrical surface 112. Cooling the inner cylindrical surface 112 likewise cools the outer cylindrical surface 18 via conduction. The now-heated cooling fluid 110 is removed from the interior of forming roller 14 by way of an annular gap 114 between the distributor 106 and the lateral shaft 104b. The holes 108 may be arranged in any desired pattern to achieve the desired cooling effect.

In some embodiments, the apparatus 10 further includes a sprayer 116 (see, e.g., FIGS. 2 and 3) positioned and configured to spray fluid 118 (that is, liquid or gas), having a temperature that is less than a temperature of the outer cylindrical surface 18 of the forming roller 14, onto the outer cylindrical surface 18. The fluid 118 can be water or air, among other options. The fluid 118 that the sprayer 116 sprays onto the outer cylindrical surface 18 extracts heat from the outer cylindrical surface 18 of the forming roller 14 as the forming roller 14 rotates, thus lowering the temperature and thus the outward bow thereof.

In other embodiments, the apparatus 10 further includes a liquid cooled metal brush 120. The liquid can be water. The metal can be copper, or some other metal with high thermal conductivity and sufficiently high melting point to withstand the operating conditions. The liquid is in thermal contact with the metal brush 120. The metal brush 120 contacts the outer cylindrical surface 18 of the forming roller 14 as the forming roller 14 rotates and extracts heat therefrom. The liquid in thermal contact with the metal brush 120 extracts the extracted heat from the metal brush 120.

In other embodiments, the apparatus 10 further includes one or more liquid cooled riding blocks 122. The liquid can be water. Each riding block 122 can have a metal surface facing the outer cylindrical surface 18 of the forming roller 14. The metal can be copper, or some other metal with high thermal conductivity and sufficiently high melting point to withstand the operating conditions. The metal surface extracts heat from the outer cylindrical surface 18 of the forming roller 14. The liquid is in thermal communication with the metal surface and extracts the extracted heat from the metal surface.

In embodiments, the apparatus further includes convective cooling elements 123. One convective cooling element 123 can be disposed on each side of the vertical plane 30, to direct cooling fluid (liquid or gas, such as air) toward the vertical plane 30. The convective cooling elements 123 are disposed lower than the heat loss reduction elements 52, if included. As will be further discussed below, the convective cooling elements 123 can increase the rate of cooling of the ribbon of glass 12 after the ribbon of glass 12 has cooled to the glass transition temperature, and before the glass sheet 154 is separated from the ribbon of glass 12.

Figure 10:
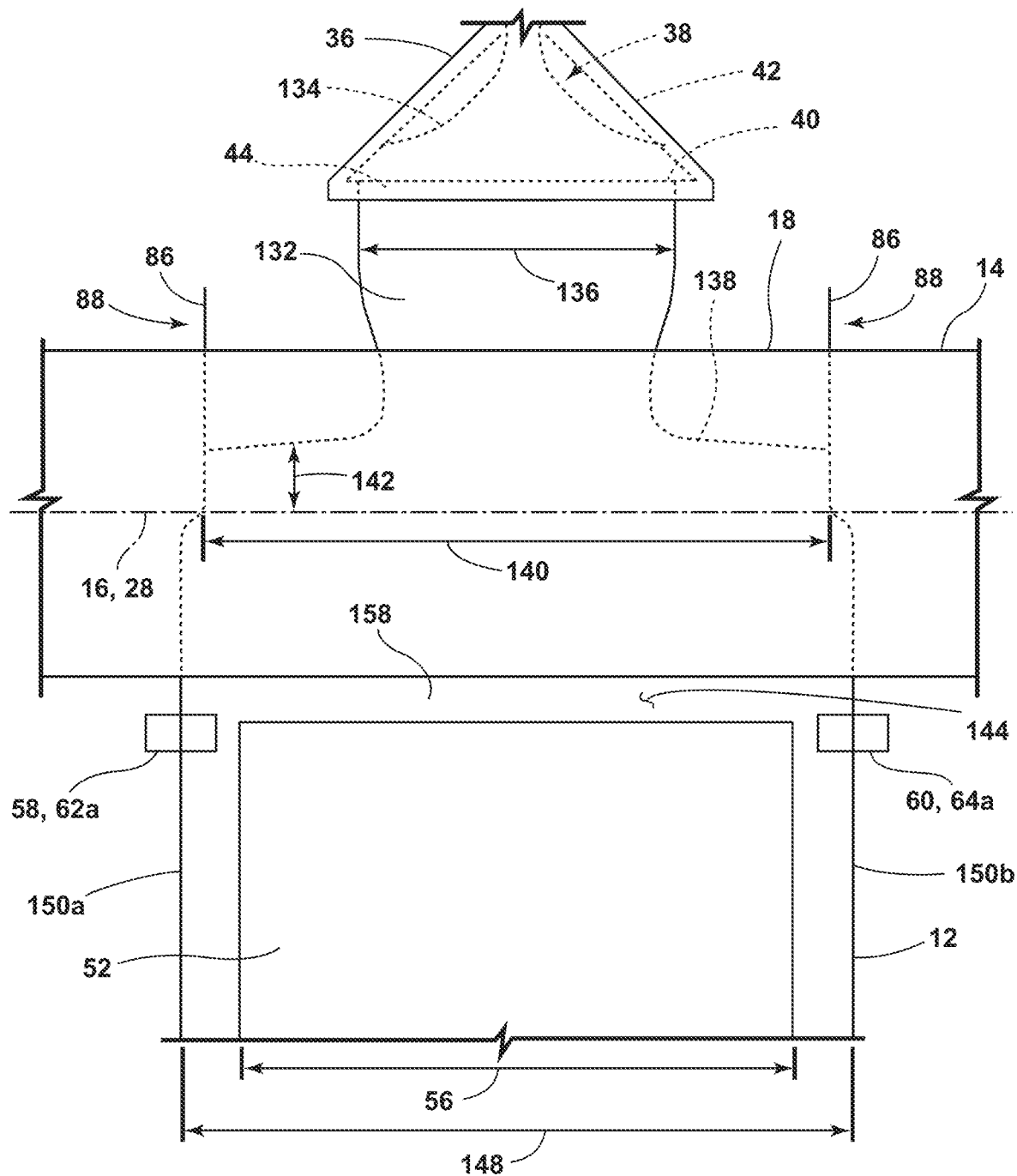
FIG. 10 is an elevation view of the apparatus of FIG. 1 forming the ribbon of glass, illustrating the distributive feed device supplying a stream of molten glass from the internal chamber, through the plurality of apertures, and to a puddle between the forming rollers, and the forming rollers forming the ribbon of glass from the puddle.
Figure 11:
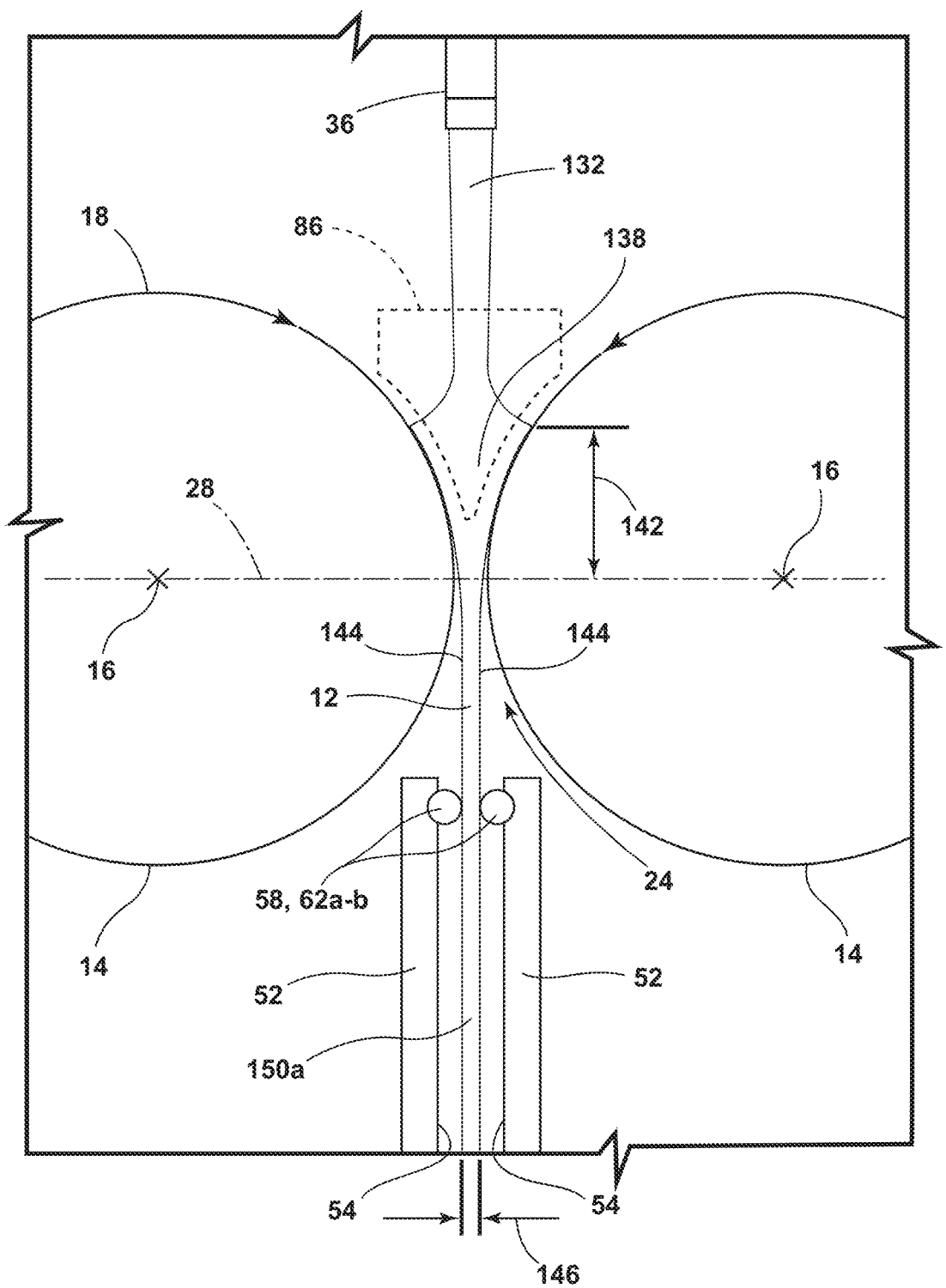
FIG. 11 is a side view of FIG. 10, illustrating the first lateral edge cooling element in the form of the first set of pinching rollers reducing the thickness of a first lateral edge of the ribbon of glass, and the ribbon of glass extending through the opposing each heat loss reduction elements.

Referring now additionally to FIGS. 10 and 11, in use, the feed device 36 supplies a stream 132 of molten glass 134 downward into the gap 24 between the pair of forming rollers 14. The feed device 36 receives the molten glass 134 from the delivery system 34, which can be a batch system that supplies a certain volume of molten glass 134, or a continuous system that supplies molten glass 134 continuously for days, months, or even years. In embodiments of the apparatus 10 where the feed device 36 is the distributive feed device 36, molten glass 134 within the internal chamber 38 exits out of the internal chamber 38 through the slot 44 as the stream 132 of molten glass 134. In such embodiments, it is preferred that the molten glass 134 within the internal chamber 38 of the distributive feed device 36 has a viscosity of 5 Poise to 8 Poise. Glass substrates having a high index of refraction typically have a low liquidus viscosity within that range. In embodiments, the stream 132 of molten glass 134 has a width 136 parallel to the axes of rotation 16 of the forming rollers 14 of 25 mm to 4000 mm, such as 25 mm, 50 mm, 100 mm, 200 mm, 250 mm, 300 mm, 350 mm, 400 mm, 500 mm, 750 mm, 1000 mm, 2000 mm, 3000 mm, or 4000 mm, or any range including any two of those values (e.g., 250 mm to 3000 mm). In other embodiments, the stream 132 of molten glass 134 that exits the distributive feed device 36 is a single stream and has a generally cylindrical form.

The stream 132 of molten glass 134 deposited between the pair of forming rollers 14 forms a puddle 138 of molten glass 134 contacting the pair of forming rollers 14 within the gap 24. In embodiments of the apparatus 10 that includes the pair of dams 86, the pair of dams 86 cooperate with the outer cylindrical surfaces 18 of the pair of forming rollers 14 to define a puddle retaining volume. In other words, the dams 86 limit a width 140 of the puddle 138 of molten glass 134, and the puddle 138 of molten glass 134 contacts the outer cylindrical surface 18 of the pair of forming rollers 14 up to a height 142 from the horizontal plane 28 that extends through the axes of rotation 16 of the pair of forming rollers 14.

As the pair of forming rollers 14 rotate toward each other above the horizontal plane 28, the pair of forming rollers 14 pull the puddle 138 of molten glass 134 downwards through the gap 24 thus forming a ribbon of glass 12 extending vertically downwards from the horizontal plane 28. The ribbon of glass 12 has two primary surfaces 144. The two primary surfaces 144 face in generally opposite directions. The two primary surfaces 144 are generally parallel to the vertical plane 30. The ribbon of glass 12 has a thickness 146 between the two primary surfaces 144.

The pair of forming rollers 14 may spread the molten glass 134 laterally while forming the molten glass 134 into the ribbon of glass 12. This is illustrated in FIG. 10 with the ribbon of glass 12 having a width 148 parallel to the axes of rotation 16 of the pair of forming rollers 14 that is wider than the width 140 of the puddle 138 of molten glass 134. In embodiments, the width 148 of the ribbon of glass 12 may be approximately equal to the width 140 of the puddle 138 of molten glass 134. The width 148 extends between a first lateral edge 150a and a second lateral edge 150b, which extend generally vertically. In addition, the pair of forming rollers 14 cools the glass so that the viscosity of the puddle 138 of molten glass 134 is sufficiently high to support the ribbon of glass 12 without the weight of the ribbon of glass 12 causing the ribbon of glass 12 to separate from the puddle 138 of molten glass 134 below the horizontal plane 28.

A portion of each primary surface 144 of the ribbon of glass 12 faces one of the heat loss reduction elements 52. In other words, the heat loss reduction elements 52 sandwich the ribbon of glass 12. In embodiments, the heat loss reduction elements 52 do not contact the ribbon of glass 12, while in other embodiments the heat loss reduction elements 52 contact the ribbon of glass 12. In embodiments, the width 56 of each heat loss reduction elements 52 is narrower than the width 148 of the ribbon of glass 12. In embodiments, where the heat loss reduction elements 52 include heating elements 53, the heating elements 53 are individually controlled to produce heat adjacent to the ribbon of glass 12.

As mentioned, the outer cylindrical surface 18 of the forming rollers 14 is at an outer diameter 22 of 20 mm to 600 mm. Choosing a smaller outer diameter 22 within that range may improve distribution of the puddle 138 of molten glass 134 and allow for reduced flow rate. In embodiments, the outer diameter 22 of the forming rollers 14 is 20 mm to 80 mm. The improved distribution of the puddle 138 as illustrated in Examples 1 and 14 below, due of the smaller outer diameter 22 forming rollers 14, can produce the ribbon of glass 12 with a generally wider width 148 and a thinner thickness 146 than larger outer diameter 22 forming rollers 14.

The use of the smaller outer diameter 22 forming rollers 14 is especially useful when the molten glass 134 has a viscosity of 0.1 Poise to 3000 Poise. At such a viscosity, the force of gravity effectively distributes the molten glass 134 horizontally into the puddle 138 before the glass is formed into the ribbon of glass 12, even when the feed device 36 is a distributive tube. The less viscous the molten glass 134, the wider the horizontal distribution of the puddle 138. The wider the puddle 138, the wider the width 148 of the resulting ribbon of glass 12. Viscosities over 3000 Poise will likely prevent the force of gravity from widely distributing the puddle 138 of the molten glass 134.

The relatively small outer diameter 22 reduces the amount of time that the puddle 138 of the molten glass 134 contacts the forming rollers 14 for any given rotational speed. The reduced amount of time reduces heat transfer from the puddle 138 of the molten glass 134 to the forming rollers 14. The reduction in heat transfer means that the forming rollers 14 form the ribbon of glass 12 at a relatively higher temperature, which permits a relatively thinner thickness 146 for the ribbon of glass 12.

In addition, the horizontal distance between the forming rollers 14 above the horizontal plane 28 increases for any given vertical distance from the horizontal plane as the outer diameter 22 of the forming rollers 14 decreases. In other words, the area of the top surface of the puddle 138 of the molten glass 134 increases as the outer diameter 22 of the forming rollers 14 decreases. The increased area increases pressure pushing the puddle 138 wider along the axes 16 of rotation of the forming rollers 14 widening the width 148 of the resulting ribbon of glass 12.

Figure 12:
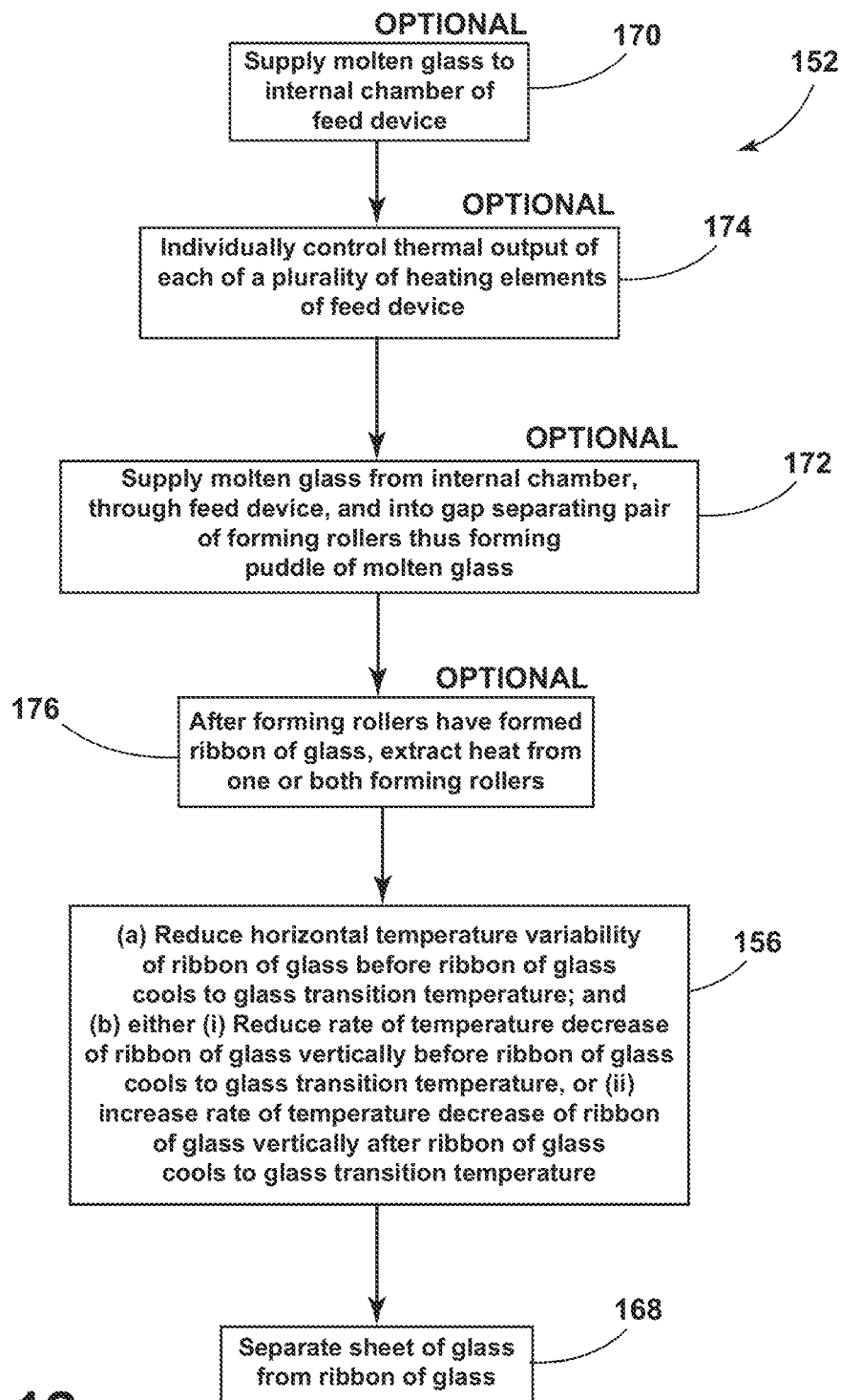
FIG. 12 is a flow chart of a method of forming a sheet of glass from the ribbon of glass of FIG. 1, illustrating a step where (a) horizontal temperature variability of the ribbon of glass is reduced and (b) either (i) the rate of temperature decrease of the ribbon of glass vertically is reduced, before the ribbon of glass cools to the glass-transition temperature, or (ii) the rate of temperature decrease of the ribbon of glass vertically is increased, after the ribbon of glass cools to the glass-transition temperature.
Figure 13:
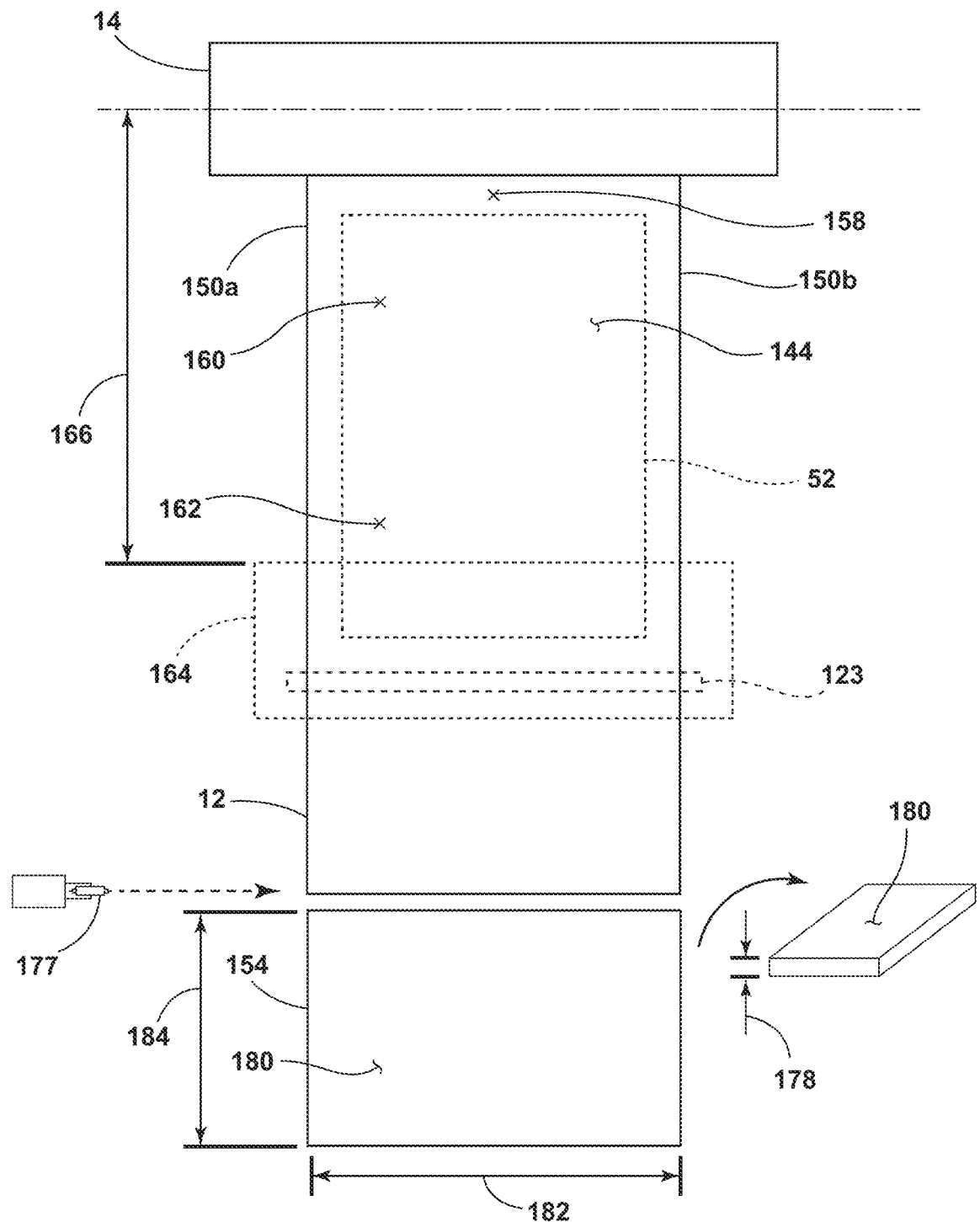
FIG. 13 is an elevation view of FIG. 10, illustrating a sheet of glass separated from the ribbon of glass, and the heat loss reduction elements reducing heat loss from the ribbon of glass (i) at a center portion of the ribbon of glass but not the lateral edges of the ribbon of glass and (ii) vertically from between the horizontal plane and partially within a setting zone where the ribbon of glass cools to the glass transition temperature.

Referring now additionally to FIGS. 12 and 13, a method 152 of forming a glass sheet 154 from the ribbon of glass 12 is herein described. After the pair of forming rollers 14 has formed the ribbon of glass 12 from the puddle 138 of molten glass 134, at a step 156, the method 152 includes (a) reducing horizontal temperature variability of the ribbon of glass 12 before the ribbon of glass 12 cools to a glass transition temperature; and (b) one or more of (i) reducing a rate of temperature decrease of the ribbon of glass 12 vertically before the ribbon of glass 12 cools to the glass transition temperature, and (ii) increasing the rate of temperature decrease of the ribbon of glass 12 vertically after the ribbon of glass 12 cools to the glass transition temperature. In embodiments, the ribbon of glass 12 just below the horizontal plane 28 has a viscosity on the order of $10^7$ Poise. Such a viscosity allows the ribbon of glass 12 to support itself vertically downward from the pair of forming rollers 14 while allowing sufficient time to manipulate horizontal temperature variability and vertical cooling rate, pursuant to the method 152, as discussed below. If the ribbon of glass 12 has a much smaller viscosity at that point, the ribbon of glass 12 will stretch under its own weight, which adds difficulty to controlling the ribbon of glass 12 near the glass transition temperature. If the ribbon of glass 12 has a much larger viscosity, then the ribbon of glass 12 is subject to pressure checks (i.e., surface defects in the ribbon of glass 12) and residual stress. In addition, at such an order of viscosity, the lateral edges 150a-b of the ribbon of glass 12 are sufficiently cool to limit rounding due to surface tension yet not so cool so as to prohibit further cooling of the lateral edges 150a-b relative to a center portion 158 of the ribbon of glass 12 to decrease horizontal temperature variability before cooling to the glass transition temperature.

As the pair of forming rollers 14 transform the puddle 138 of molten glass 134 into the ribbon of glass 12, the temperature of the ribbon of glass 12 may vary as a function of horizontal position along the width 148 of the ribbon of glass 12. For example, a temperature of the ribbon of glass 12 at the lateral edges 150a-b of the ribbon of glass 12 may be higher than a temperature of the ribbon of glass 12 at the center portion 158 of the ribbon of glass 12, assuming the same horizontal position (i.e., the same distance from the horizontal plane 28 extending through the axes of rotation 16 of the pair of forming rollers 14).

In addition, as the pair of forming rollers 14 transform the puddle 138 of molten glass 134 into the ribbon of glass 12, the temperature of the ribbon of glass 12 decreases downward as a function of distance from the horizontal plane 28. For example, the ribbon of glass 12 at vertical position 160 has a temperature that is higher than a temperature of the ribbon of glass 12 at a lower vertical position 162, and both vertical positions 160, 162 are approximately the same distance from the lateral edges 150a, 150b of the ribbon of glass 12. Eventually, the temperature of the ribbon of glass 12 cools to the glass transition temperature within a setting zone 164, which may occur after a distance 166 from the horizontal plane 28.

After the ribbon of glass 12 has cooled to below the glass transition temperature, the ribbon of glass 12 continues to cool. The method 152 further includes, at a step 168, separating the glass sheet 154 from the ribbon of glass 12. A plurality of glass sheets 154 can be separated from the ribbon of glass 12 during the same batch.

This disclosure details a discovery that if (a) the horizontal temperature variability of the ribbon of glass 12 is not decreased before the ribbon of glass cools to the glass transition temperature within the setting zone 164, and (b) either (i) the rate of temperature decease of the ribbon of glass 12 is not decreased before the ribbon of glass 12 cools to the glass transition temperature within the setting zone 164, or (ii) the rate of temperature decrease of the ribbon of glass 12 is not increased after the ribbon of glass 12 cools to the glass transition temperature, then the glass sheet 154 cannot be separated from the ribbon of glass 12 without the glass sheet 154 and the ribbon of glass 12 fracturing or the glass sheet 154 having suboptimal warp and/or total thickness variation if the glass sheet 154 is successfully separated from the ribbon of glass 12 without fracture. This concept is illustrated in Comparative Example 2 below. In other words, it has been discovered that if (a) the horizontal temperature variability of the ribbon of glass 12 is sufficiently decreased before the ribbon of glass 12 cools to the glass transition temperature and (b) either (i) the rate of temperature decrease of ribbon of glass 12 is sufficiently decreased before the ribbon of glass 12 cools to the glass transition temperature, or (ii) the rate of temperature decrease of ribbon of glass 12 is sufficiently increased after the ribbon of glass 12 cools to the glass transition temperature, then the glass sheet 154 can be separated from the ribbon of glass 12 without fracture and the glass sheet 154 can have acceptable warp and total thickness variation, even when the glass composition is such that the glass sheet 154 has a low liquidus viscosity.

Without being bound by theory, it is hypothesized that the propensity of the ribbon of glass 12 to fracture is a function of the level of internal stress of the ribbon of glass 12, as are the level of warp and total thickness variation of the glass sheet 154 separated from the ribbon of glass 12. As internal stress of the ribbon of glass 12 increases, the likelihood is greater that the step 168 of separating the glass sheet 154 from the ribbon of glass 12 will cause fracture of both, and, if the glass sheet 154 is successfully separated without fracture, the warp and total thickness variation will be higher.

In turn, it is hypothesized that the internal stress of the ribbon of glass 12 is a function of horizontal temperature variability, and either (i) the rate of temperature decrease of the ribbon of glass 12 before the ribbon of glass 12 cools to the glass transition temperature within the setting zone 164, or (ii) the rate of temperature decrease of the ribbon of glass 12 after the ribbon of glass 12 has cooled to the glass transition temperature. Horizontal temperature fluctuations increase lateral stress—the greater the fluctuation, the greater the stress. As for the rate of temperature decrease vertically, it is hypothesized that a constant rate of change of the thermal strain downward along the ribbon of glass 12 results in no thermal stress caused by the thermal strain and thus no warp. Assuming that the horizontal temperature variation approaches zero and the rate of change of thermal strain vertically is relatively constant, then Laplacian of the thermal strain also approaches zero and there is no thermal stress caused by the thermal strain. However, there is added complexity because thermal strain is a function of the coefficient of thermal expansion of the glass material. And, the coefficient of thermal expansion for the ribbon of glass 12 when the temperature of the ribbon of glass 12 is above the glass transition temperature is higher than when the temperature of the ribbon of glass 12 is below the glass transition temperature. Thus, to achieve a constant rate of change of thermal strain downward along the ribbon of glass 12, especially within the setting zone 164, where the ribbon of glass 12 enters having a temperature above the glass transition temperature and leaves having a temperature below the glass transition temperature, the ribbon of glass 12 is to cool more slowly while having a temperature above the glass transition temperature than while having a temperature below the glass transition temperature. In other words, achieving a relatively slow cooling before reaching the glass transition temperature and then a relatively fast cooling after reaching the glass transition temperature is especially important near the glass transition temperature (e.g., +/−50° C.) (within the setting zone 164) to achieve the desired constant rate of change of the thermal strain going downward along the ribbon of glass 12. This concept is further explained in connection with Example 10 below. This can be achieved either (i) by actively decreasing the rate of temperature decrease before the ribbon of glass 12 reaches the glass transition temperature or (ii) by actively increasing the rate of temperature decrease after the ribbon of glass 12 reaches the glass transition temperature, or both (i) and (ii).

By taking active measures to decrease horizontal temperature variability and either (i) to decrease the rate of cooling of the ribbon of glass 12 vertically before the ribbon of glass 12 reaches the glass transition temperature within the setting zone 164, (ii) to increase the rate of cooling of the ribbon of glass 12 vertically after the ribbon of glass 12 reaches the glass transition temperature, or both (i) and (ii), internal stress of the ribbon of glass 12 can be decreased.

In embodiments, at a step 170, the method 152 further includes, before the pair of forming rollers 14 has formed the ribbon of glass 12 from the puddle 138 of molten glass 134, supplying molten glass 134 to the internal chamber 38 of the distributive feed device 36.

Thereafter, at a step 172, the method 152 further includes supplying the molten glass 134 from the internal chamber 38, through the plurality of apertures 44 of the distributive feed device 36, and into the gap 24 separating the pair of forming rollers 14 thus forming the puddle 138 of molten glass 134. As will be further demonstrated in connection with Comparative Example 2 below, supplying the molten glass 134 with a single outlet tube results in relatively high temperature variability across the ribbon of glass 12 immediately after the pair of forming rollers 14 forms the ribbon of glass 12. With a single tube outlet, newly supplied molten glass 134 largely flows laterally off the existing puddle 138 of molten glass 134 above the forming rollers 14 and has less time to cool before forming the lateral edges 150*a-b* of the ribbon of glass 12 compared to molten glass 134 in the center portions of the puddle 138 that forms the center portion 158 of the ribbon of glass 12. Utilizing the distributive feed device 36 to supply the stream 132 of molten glass 134, having the slot 44 with the width 46, more widely distributes the mass of newly suppled molten glass 134 upon the puddle 138 of molten glass 134. The supplied molten glass 134 is supplied throughout the width 46 of the slot 44, resulting in a wider distribution of the molten glass 134 to the pair of forming rollers 14 than if a single outlet tube was utilized. The wider distribution results in more uniform cooling time before the forming rollers 14 pull the puddle 138 of molten glass 134 downward into the ribbon of glass 12. The greater uniformity in cooling time horizontally across the puddle 138 of molten glass 134 results in the ribbon of glass 12 having decreased horizontal temperature variability.

In embodiments, at a step 174, the method 152 further includes individually controlling the thermal output of each of the plurality of heating elements 48 of the distributive feed device 36. During the formation of the ribbon of glass 12, the horizontal temperature variability of the ribbon of glass 12 can be monitored. When use of the distributive feed device 36 results in the ribbon of glass 12 having suboptimal horizontal temperature variability, the thermal output of each of the plurality of heating elements 48 can be individually controlled to counter the suboptimal horizontal temperature variability. For example, if the lateral edges 150*a-b* of the ribbon of glass 12 have a higher temperature than the center portion 158 or the region between the lateral edges 150*a-b* and the center portion 158, then the heating elements 48 generally corresponding to the lower temperature regions of the ribbon of glass 12 can be activated to increase the temperature of molten glass 134 flowing through regions of the slot 44. This would reduce the horizontal temperature variability of the subsequently formed ribbon of glass 12.

In embodiments, at a step 176, the method 152 further includes extracting heat from one or both of the pair of forming rollers 14 after the pair of forming rollers 14 has formed the ribbon of glass 12 from the puddle 138 of molten glass 134. As the forming rollers 14 increase in temperature, the outer diameter 22 of the forming rollers 14 increases, with the greatest increase occurring at the midpoint of the width 20 of the forming rollers 14. The increase of the outer diameter 22 of the forming rollers 14 tapers off moving laterally outward from the midpoint of the width 20 of the forming rollers 14. This bowing outward of the forming rollers 14 sets a dog bone shape into the ribbon of glass 12, regardless of the degree of horizontal temperature variation of the ribbon of glass 12 or the rate at which the ribbon of glass 12 cools to the glass transition temperature. Cooling the outer cylindrical surface 18 reduces the bow and thus reduces or eliminates the dog bone shape.

Heat can be extracted from one or both of the pair of forming rollers 14 in a number of ways. Without limitation, in embodiments, heat is extracted from one or both of the pair of forming rollers 14 in or more of the following ways: (i) by transmitting heat exchanging cooling fluid 110 into the forming roller 14, and the heat exchanging cooling fluid 110 is in thermal communication with the outer cylindrical surface 18 of the forming roller 14; (ii) spraying fluid 118 having a temperature that is less than a temperature of the outer cylindrical surface 18 of the forming roller 14 onto the outer cylindrical surface 18, such as with the sprayer 116; (iii) contacting the forming roller 14 with the liquid cooled metal bush 120; and (iv) opposing the forming roller 14 with the liquid cooled riding block 122. In embodiments, more heat is extracted near the midpoint of the width 20 of the forming rollers 14 than the edges of the forming rollers 14.

As mentioned above, at the step 156, the method 152 includes reducing horizontal temperature variability of the ribbon of glass 12 before the ribbon of glass 12 cools to the glass transition temperature. In embodiments, the step 156 of reducing temperature variability includes increasing heat loss of the lateral edges 150a-b of the ribbon of glass 12 relative to the center portion 158 of the ribbon of glass 12. In other words, to reduce horizontal temperature variability, a focus can be to cool the lateral edges 150a-b more than the center portion 158 of the ribbon of glass 12.

As mentioned above, the molten glass 134 formed into the ribbon of glass 12 tends to have a higher temperature at the lateral edges 150a-b compared to the center portion 158. This is an aspect of the horizontal temperature variability of the ribbon of glass 12. Without being bound by theory, it is believed that the temperature disparity causes a disparity in surface tension (specifically, elevated surface tension at the lateral edges 150a-b). The greater surface tension at the lateral edges 150a-b pulls adjacent molten glass 134 toward the lateral edges 150a-b and thus increases the thickness 146 of the ribbon of glass 12 at the lateral edges 150a-b. The increasing thickness 146 at the lateral edges 150a-b decreases the surface-to-volume ratio at the lateral edges 150a-b and thus further reduces the cooling rate relative to the remainder of the ribbon of glass 12, further exacerbating horizontal temperature variability. Accordingly, actively reducing the thickness 146 and/or the temperature of the ribbon of glass 12 at the lateral edges 150a-b before the ribbon of glass 12 cools to the glass transition temperature counters the aforementioned effects and thereby improves horizontal temperature variability. In addition, actively reducing the thickness 146 of the ribbon of glass 12 at the lateral edges 150a-b directly reduces total thickness variation of the ribbon of glass 12.

Figure 14A:
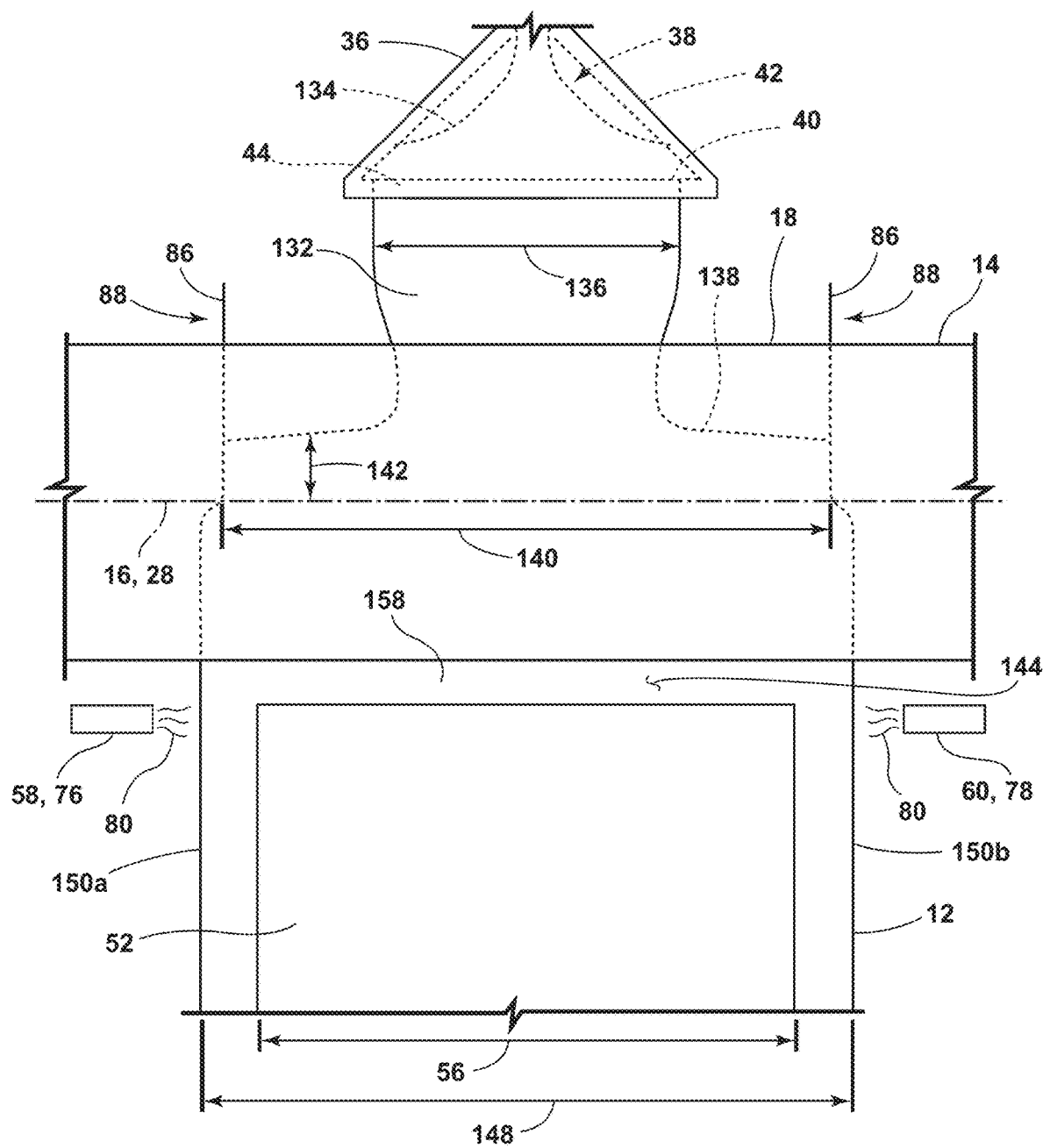
FIG. 14A is the view of FIG. 10 but illustrating the lateral edge cooling elements in the form of tube outlets blowing cooling gas onto the lateral edges of the ribbon of glass.

Referring now additionally to FIG. 14A, in embodiments, increasing heat loss of the lateral edges 150a-b of the ribbon of glass 12 relative to the center portion 158 of the ribbon of glass 12 includes blowing cooling gas 80 onto the lateral edges 150a-b. For example, the first tube outlet 76 is positioned to blow cooling gas 80 at the lateral edge 150a of the ribbon of glass 12 parallel to the vertical plane 30, and the second tube outlet 78 is positioned to blow cooling gas 80 at the second lateral edge 150b of the ribbon of glass 12 also parallel to the vertical plane 30. The cooling gas 80 can be air. Because the cooling gas 80 is blown at the lateral edges 150a-b of the ribbon of glass 12 parallel to the vertical plane 30, the cooling gas 80 contacts the lateral edges 150a-b before the center portion 158 of the ribbon of glass 12 and to a greater extent than the center portion 158 of the ribbon of glass 12. Thus, the cooling gas 80 increases heat loss of the lateral edges 150a-b of the ribbon of glass 12 more than the center portion 158 of ribbon of glass 12. This concept is illustrated in Comparative Example 4 and Example 5 below. Caution should be exercised in selecting a flow rate of the cooling gas 80, because, as the flow rate increases, the chances of the cooling gas 80 introducing warp into the ribbon of glass 12 increases.

Figure 14B:
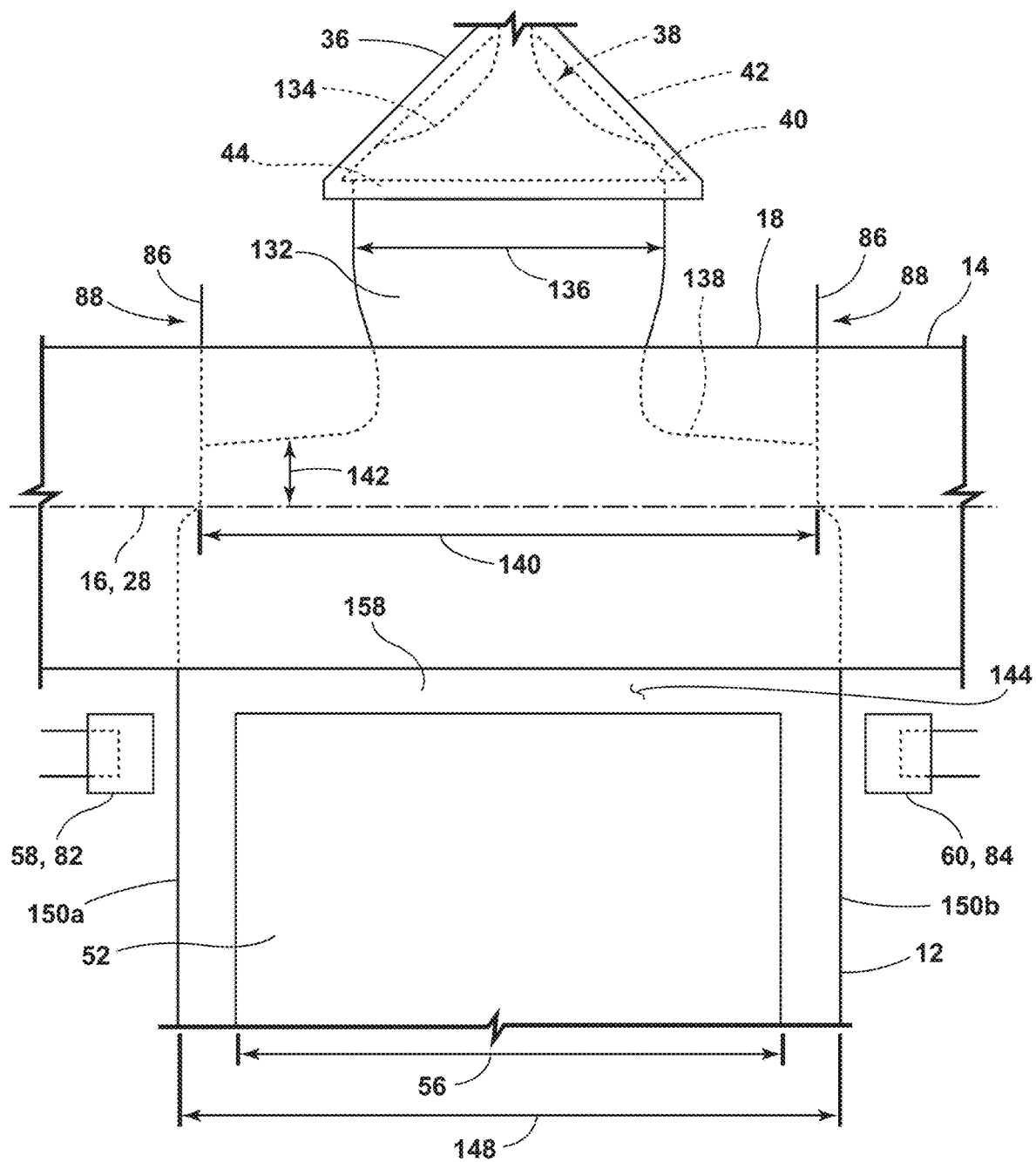
FIG. 14B is the view of FIG. 10 but illustrating the lateral edge cooling elements in the form of radiative absorptive cooling elements disposed adjacent to, and absorbing heat from, the lateral edges of the ribbon of glass.

Referring now additionally to FIG. 14B, in other embodiments, increasing heat loss of the lateral edges 150a-b of the ribbon of glass 12 relative to the center portion 158 of the ribbon of glass 12 includes the first lateral edge cooling element 58 decreasing the temperature of the first lateral edge 150a of the ribbon of glass 12, and the second lateral edge cooling element 60 decreasing the temperature of the second lateral edge 150b of the ribbon of glass 12. As mentioned above, the first lateral edge cooling element 58 and the second lateral edge cooling element 60 can include the first radiative absorptive element 82 and the second radiative absorptive element 84, respectively. The first radiative absorptive element 82 faces the first lateral edge 150a of the ribbon of glass 12. The second radiative absorptive element 84 faces the second lateral edge 150b of the ribbon of glass 12. Adjusting the flow rate of the cooling fluid flowing through the first radiative absorptive element 82 and the second radiative absorptive element 84 changes the amount of heat extracted from the first lateral edge 150a of the ribbon of glass 12 and the second lateral edge 150b of the ribbon of glass 12, respectively.

Referring back to FIGS. 10 and 11, in embodiments, increasing heat loss of the lateral edges 150a-b of the ribbon of glass 12 relative to the center portion 158 of the ribbon of glass 12 includes reducing the thickness 146 of the ribbon of glass 12 at the lateral edges 150a-b of the ribbon of glass 12. For example, the first pair of pinching rollers 62a-b are configured to reduce the thickness 146 of the ribbon of glass 12 at the first lateral edge 150a of the ribbon of glass 12. One roller of the first pair of pinching rollers 62a-b contacts one of the primary surfaces 144 of the ribbon of glass 12 at the first lateral edge 150a. The other roller of the first pair of pinching rollers 62a-b contacts the other primary surface 144 of the ribbon of glass 12 at the first lateral edge 150a. The rollers of the first pair of pinching rollers 62a-b apply a pinching force onto the first lateral edge 150a of the ribbon of glass 12. The rollers of the first pair of pinching rollers 62a-b thus reduce the thickness 146 of the ribbon of glass 12 at the first lateral edge 150a as the first pair of pinching rollers 62a-b roll and thereby pull the ribbon of glass 12 between the first pair of pinching rollers 62a-b. The second pair of pinching rollers 64a-b are configured to reduce the thickness 146 of the ribbon of glass 12 at the second lateral edge 150b of the ribbon of glass 12, in the same manner, with the second pair of pinching rollers 64a-b contacting and pulling the second lateral edge 150b of the ribbon of glass 12 through the second pair of pinching rollers 64a-b, reducing the thickness 146 at the second lateral edge 150b. The first pair of pinching rollers 62a-b and the second pair of pinching rollers 64a-b can rotate faster than the speed at which the ribbon of glass 12 proceeds through the first pair of pinching rollers 62a-b and the second pair of pinching rollers 64*a-b*. The faster rotation of the pinching rollers 62*a-b*, 64*a-b* prevents the ribbon of glass 12 from sticking and reduces out-of-round variation (that is, variation induced by the pinching rollers 62*a-b*, 64*a-b* not having a perfectly circular rotation about their respective axles 66).

Further, in embodiments, the first pair of pinching rollers 62*a-b* and the second pair of pinching rollers 64*a-b* can be thermally controlled to actively control the extraction of heat from the lateral edges 150*a-b* of the ribbon of glass 12. Such heat extraction from the lateral edges 150*a-b* can improve horizontal temperature variation across the ribbon of glass 12. In other words, in embodiments, increasing heat loss of the lateral edges 150*a-b* of the ribbon of glass 12 relative to the center portion 158 includes contacting the lateral edges 150*a-b* of the ribbon of glass 12 with opposing rollers 62*a-b*, 64*a-b* that extract heat from the lateral edges 150*a-b* of the ribbon of glass 12.

As will be further illustrated in Example 6 below, the first pair of pinching rollers 62*a-b* and the second pair of pinching rollers 64*a-b* can both reduce horizontal temperature variation across the ribbon of glass 12 (improving warp, total thickness variation, and separability of the glass sheet 154 without fracture) and directly reduce the thickness variation of the lateral edges 150*a-b* of the ribbon of glass 12 compared to the center portion 158. In embodiments, before the thickness 146 of the ribbon of glass 12 at the lateral edges 150*a-b* of the ribbon of glass 12 is reduced, the thickness 146 of the ribbon of glass 12 at the lateral edges 150*a-b* is at least 0.5 mm greater than the thickness 146 of the ribbon of glass 12 at the center portion 158 of the ribbon of glass 12. In embodiments, after the thickness 146 of the ribbon of glass 12 at the lateral edges 150*a-b* of the ribbon of glass 12 is reduced, the thickness 146 of the ribbon of glass 12 at the lateral edges 150*a-b* is less than 0.1 mm greater than the thickness 146 of the ribbon of glass 12 at the center portion 158 of the ribbon of glass 12.

In embodiments, reducing horizontal temperature variability of the ribbon of glass 12 before the ribbon of glass 12 cools to the glass transition temperature comprises reducing heat loss of the center portion 158 of the ribbon of glass 12 relative to the lateral edges 150*a-b* of the ribbon of glass 12. As described, one approach to reducing horizontal temperature variability of the ribbon of glass 12 is to decrease the temperature of the lateral edges 150*a-b* of the ribbon of glass 12 relative to the center portion 158 as described above. Another approach to reducing horizontal temperature variability is to reduce heat loss of the center portion 158 relative to the lateral edges 150*a-b*. This approach allows the lateral edges 150*a-b* to cool without aid while the rate at which the center portion 158 cools is slowed. As the ribbon of glass 12 approaches the glass transition temperature, the faster cooling of the hotter lateral edges 150*a-b* and the slower cooling of the center portion 158 allows horizontal temperature variability to decrease as the ribbon of glass 12 moves downward.

In embodiments, reducing heat loss of the center portion 158 of the ribbon of glass 12 relative to lateral edges 150*a-b* of the ribbon of glass 12 comprises facing the center portion 158 of the ribbon of glass 12 but not the lateral edges 150*a-b* of the ribbon of glass 12 at the heat loss reducing elements 52. As described above, the width 56 of each heat loss reducing element 52 is narrower than the width 148 of the ribbon of glass 12. Assuming that each heat loss reducing element 52 is centrally positioned relative to the ribbon of glass 12, then each heat loss reducing element 52 opposes one of the primary surfaces 144 at the center portion 158 of the ribbon of glass 12 but not at the lateral edges 150*a-b* of the ribbon of glass 12. The heat loss reducing elements 52, which as mentioned can be insulative substrates, active heating elements, or both, thus reduce the rate at which the center portion 158 of the ribbon of glass 12 cools but not the rate at which the lateral edges 150*a-b* of the ribbon of glass 12 cool. As the ribbon of glass 12 moves downward from the horizontal plane 28 and cools toward the glass transition temperature, the higher temperature lateral edges 150*a-b* cool faster than the center portion 158 opposing the heat loss reducing elements 52, and the horizontal temperature variability reduces. This aspect is explained further below with Comparative Example 7 and Example 8. When active heating elements are utilized as the heat loss reducing elements 52, the heating elements 53 can be controlled so that the surface 54 of the heat loss reducing element 52 affected by heating elements 53 and facing the ribbon of glass 12 have temperatures that assist in equalizing the horizontal temperature variability of the ribbon of glass 12. In some instances, the temperatures of surface 54 of the heat loss reducing element 52 are lower than the temperatures of areas of the ribbon of glass 12 nearest the surface 54. In some instances, the temperatures of surface 54 of the heat loss reducing element 52 are higher than the temperatures of areas of the ribbon of glass 12 nearest the surface 54.

In embodiments, reducing horizontal temperature variability of the ribbon of glass 12 before the ribbon of glass 12 cools to the glass transition temperature includes increasing the height 142 of the puddle 138 of molten glass 134 from the horizontal plane 28. In embodiments, increasing the height 142 of the puddle 138 of molten glass 134 includes increasing the flow rate of the stream 132 of molten glass 134 from the feed device 36. It has been discovered that the temperature of the lateral edges 150*a-b* of the ribbon of glass 12, and thus the horizontal temperature variability of the ribbon of glass 12, can be a function of the height 142 of the puddle 138 of molten glass 134. More specifically, the lower the height 142 of the puddle 138 of molten glass 134, the higher the temperature of the lateral edges 150*a-b* of the ribbon of molten glass 134 and the greater the horizontal temperature variability. Experiments conducted have demonstrated that the temperature at the lateral edges 150*a-b* of the ribbon of glass 12 decrease by approximately 6° C. for each millimeter increase in the height 142 of the puddle 138 of molten glass 134. Without being bound by theory, it is thought that raising the height 142 of the puddle 138 of molten glass 134 increases the amount of time that the molten glass 134 contacts the outer cylindrical surface 18 of the forming rollers 14, with the increased contact time further reducing the temperature of the molten glass 134 before being formed into the ribbon of glass 12.

Figure 15:
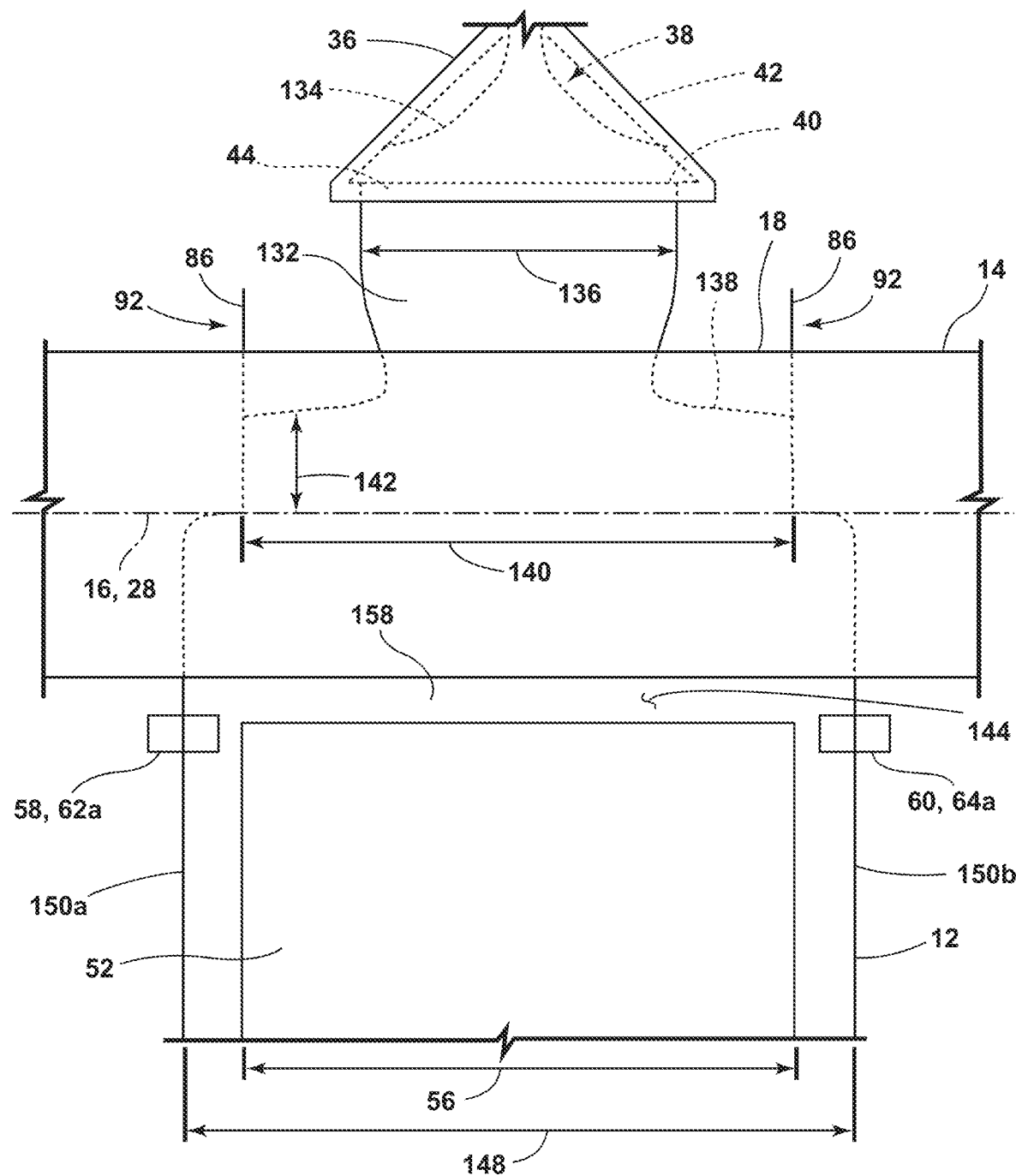
FIG. 15 is the view of FIG. 10 but illustrating the pair of dams closer together in the second position narrowing the width of the puddle of molten glass.

Referring now additionally to FIG. 15, as mentioned above, the apparatus 10 can include a pair of laterally movable dams 86 that can be moved closer to each other, and the dams 86 with the outer cylindrical surface 18 of the forming rollers 14 define the puddle retaining volume. As at least one of the pair of dams 86 moves from the first position 88 (see, e.g., FIG. 10) to the second position 92 (see, e.g., FIG. 15), the width 140 of the puddle 138 of molten glass 134 narrows and the height of the puddle 138 of molten glass 134 increases. Thus, moving the dams 86 closer to each other increases the height 142 of the puddle 138 of molten glass 134. In embodiments, increasing the height 142 of the puddle 138 of molten glass 134 from the horizontal plane 28 comprises moving one or both of the movable dams 86 closer to the other of the movable dams 86. Movable dams 86 additionally provide the benefit of maintaining a constant height 142 for the puddle 138 of molten glass 134 in response to a change in the flow rate of molten glass 134 from the feed device 36. In embodiments, the dams 86 are thermally controllable to extract heat from the sides of the molten glass 134, which may aid in reducing the horizontal temperature variability of the ribbon of glass 12. The relationship between the height 142 of the puddle 138 and horizontal temperature variability of the ribbon of glass is further illustrated at Example 9 below.

In embodiments, reducing horizontal temperature variability of the ribbon of glass 12 before the ribbon of glass 12 cools to a glass transition temperature results in the horizontal temperature variability of the ribbon of glass 12, across an entire width of the ribbon of glass 12, to be 10° C. or less, or 8° C. or less, or 5° C. or less, or 2° C. or less, or 1° C. or less, such as 10° C., 9° C., 8° C., 7° C., 6° C., 5° C., 4° C., 3° C., 2° C., 1° C., 0.5° C., or 0.1° C., or any range between any two of those values (e.g., 0.1° C. to 5° C.). In some embodiments, the temperature variability is across 60 percent, or across 65 percent, or across 70 percent, or across 75 percent, or across 80 percent, or across 85 percent, or across 90 percent, or across 95 percent, or across 99 percent of the entire width of the ribbon of glass 12. Therefore, for example, the horizontal temperature variability of the ribbon of glass 12, across 80 percent of the entire width of the glass, may be 10° C. or less, or 8° C. or less, or 5° C. or less, or 2° C. or less, or 1° C. or less. In another example, the horizontal temperature variability of the ribbon of glass 12, across 90 percent of the entire width of the glass, may be 10° C. or less, or 8° C. or less, or 5° C. or less, or 2° C. or less, or 1° C. or less. The horizontal temperature variability is the difference between the maximum temperature and the minimum temperature of portions of the ribbon of glass 12 taken along the same horizontal level. The measurements can be taken via infrared camera. The measurements are taken before the ribbon of glass 12 cools to the glass transition temperature, such as when the minimum temperature is within 50° C. of the glass transition temperature.

In addition to reducing the horizontal temperature variability of the ribbon of glass 12, the method 152 includes one or more of (i) reducing the rate of temperature decrease of the ribbon of glass 12 vertically before the ribbon of glass 12 cools to the glass transition temperature, and (ii) increasing the rate of temperature decrease of the ribbon of glass 12 vertically after the ribbon of glass has cooled to the glass transition temperature. As described above, a point of the vertical temperature control is to achieve a constant rate of change of the thermal strain through the setting zone 164 while the ribbon of glass 12 cools to and past the glass transition temperature. The constant rate of change of thermal strain reduces thermal stress. This concept is further explained in connection with Example 10 below. The reduction of thermal stress leads to the ability to separate the glass sheet 154 from the ribbon of glass 12 without fracture, and the glass sheet 154 having acceptable warp and total thickness variation. In embodiments, (i) the ribbon of glass 12 cools at a first average cooling rate from 50° C. above the glass transition temperature to the glass transition temperature, (ii) the ribbon of glass 12 cools at a second average cooling rate from the glass transition temperature to 50° C. below the glass transition temperature; and (iii) the first average cooling rate is slower than the second average cooling rate. In other words, the ribbon of glass 12 cools at the first average cooling rate before the ribbon of glass 12 cools to the glass transition temperature that is slower than the second average cooling rate at which the ribbon of glass 12 cools after the ribbon of glass 12 has cooled to the glass transition temperature. The average cooling rates, as discussed herein, refer to the average cooling rates of the ribbon of glass 12 along a length of the glass within setting zone 164

In embodiments, the ribbon of glass 12 cools to the glass transition temperature within 24 inches from the horizontal plane 28, such as within 5 inches, 6 inches, 7 inches, 8 inches, 9 inches, 10 inches, 11 inches, 12 inches, 13 inches, 14 inches, 15 inches, 16 inches, 17 inches, 18 inches, 19 inches, 20 inches, 21 inches, 22 inches, 23 inches, or 24 inches, or any range including any two of those values (i.e., within 8 to 18 inches). Thus, the step 156 of reducing horizontal temperature variation and, if incorporated, slowing the vertical rate of cooling along the ribbon of glass 12, occurs within that span.

In embodiments, reducing the rate of temperature decrease of the ribbon of glass 12 vertically before the ribbon of glass 12 cools to the glass transition temperature includes facing the primary surfaces 144 of the ribbon of glass 12 at the heat loss reduction elements 52. In embodiments where the heat loss reduction elements 52 are insulative substrates, then the insulative substrates reduce heat transfer from the ribbon of glass 12 to the external environment, which reduces the rate of temperature decrease of the ribbon of glass 12. To effectively reduce heat transfer from the ribbon of glass 12, the insulative substrates should be approximately 1 mm from the ribbon of glass 12. In embodiments where the heat loss reduction elements 52 includes heating elements 53, the thermal output of the heating elements 53 can be controlled to reduce the rate of temperature decrease of the ribbon of glass 12 vertically compared to if there were no heat loss reduction elements 52 utilized. Rows of heating elements 53 can be configured to have thermal outputs that decrease as a function of vertical distance from the horizontal plane 28.

Then, after the ribbon of glass 12 cools to the glass transition temperature and before separating the glass sheet 154 from the ribbon of glass 12, the primary surfaces 144 of the ribbon of glass 12 are made to no longer face the heat loss reduction elements 52. In other words, the heat loss reduction elements 52 face the ribbon of glass 12 when the temperature of the ribbon of glass 12 is above the glass transition temperature but do not face the ribbon of glass 12 after the temperature of the ribbon of glass 12 has cooled past the glass transition temperature (such as when the ribbon of glass 12 has a temperature that is 25° C. cooler than the glass transition temperature, or 50° C. cooler, or 25° C. to 50° C. cooler). These aspects are further exemplified in connection with Comparative Example 11 and Example 12 below.

In embodiments, increasing the rate of temperature decrease of the ribbon of glass 12 vertically after the ribbon of glass 12 has cooled to the glass transition temperature includes blowing cooling fluid at one or more of the primary surfaces 144 of the ribbon of glass 12. In embodiments, the convective cooling elements 123 can direct the cooling fluid to the primary surfaces 144 of the ribbon of glass 12. In embodiments, the convective cooling elements 123 direct the cooling fluid to the primary surfaces 144 of the ribbon of glass 12 while the ribbon of glass 12 is within the setting zone 164 but after the ribbon of glass 12 has cooled to the glass transition temperature.

As mentioned, the above apparatus 10 and method 152 are especially beneficial to manufacture glass sheets 154 having a high index of refraction. The index of refraction as used herein is the index of refraction at room temperature and for electromagnetic radiation having a wavelength of about 589 nm. By a "high index of refraction," it is meant that the glass sheet 154 has an index of refraction of 1.65 or greater, such as 1.65, 1.7, 1.8, 1.9, 2.0, 2.1, 2.2, 2.3, 2.4, 2.5, 2.6, 2.7, 2.8, 2.9, 3.0, 3.1, 3.2, 3.3, or any range including any two of those values (e.g., 1.7 to 3.0, 1.7 to 2.1, etc.). For example, a composition providing an index of refraction of 1.8 (at a wavelength of 633 nm) comprises (in mol %): 40.1 $SiO_2$, 11.3 $Li_2O$, 3.8 $ZrO_2$, 4.8 $Nb_2O_5$, 2.4 $B_2O_3$, 22.9 CaO, 5.4 $La_2O_3$, and 9.3 $TiO_2$. In wt %, the composition comprises: 28.5 $SiO_2$, 4.00 $Li_2O$, 5.5 $ZrO_2$, 15 $Nb_2O_5$, 2.0 $B_2O_3$, 15.2 CaO, 21 $La_2O_3$, and 8.8 $TiO_2$. Although the method 152 is especially beneficial to produce glass sheets 154 having a high index of refraction, the method 152 can produce glass sheets 154 having any index of refraction.

In some embodiments the glass has a composition comprising (in weight percentage, on an oxide basis, with the total weight percentage adding to 100%):
    $SiO_2$, 5-55 wt %;
    $ZrO_2$, 5-10 wt %;
    CaO, 3.5-18 wt %;
    $La_2O_3$, 0.2 wt % to 30 wt %;
    $Nb_2O_5$, 0.5 wt % to 20 wt %;
    $TiO_2$, 5-20 wt %;
    $As_2O_3$, 0% to 0.2 wt %; and
    $Er_2O_3$, 0.05% to 0.9 wt % (and preferably 0.1 to 0.9 wt %, for example, 0.1 to 0.8 wt %) and/or $Pr_2O_3$, 0.05% to 1 wt %; or $Nd_2O_3$, 0.05% to 1 wt %; or $Ho_2O_3$, 0.05% to 1 wt %; or Ce oxide ($CeO_2$), 0.05% to 1 wt %.

In embodiments, the composition of the glass comprises (in weight percentage, on an oxide basis, with the total weight percentage adding to 100%):
    $SiO_2$, 5-60 wt %;
    $ZrO_2$, 5-10 wt %;
    CaO, 3.5-18 wt %;
    $La_2O_3$, 0.2 wt % to 30 wt %;
    $Nb_2O_5$, 0.5 wt % to 20 wt %;
    $TiO_2$, 5-20 wt %;
    $As_2O_3$, 0% to 0.2 wt %;
    $Er_2O_3$, 0.01% to 0.5 wt % (e.g., 0.05 wt %-0.5 wt %, or 0.1 wt %-0.5 wt %);
    $Na_2O$, 2-5 wt %;
    $K_2O_5$, 0-9 wt %;
    SrO, to 1 wt %;
    BaO, 0-20 wt %;
    F, 0-1 wt %; and
    $B_2O_3$, 0-20 wt %.

Because pure silica has a refractive index of about 1.5, keeping the amount of $SiO_2$ at 55% or below (e.g., 7-45 wt %) while adding higher index dopants allows the glass to be a high index glass of high clarity and no significant coloring. If the amount of $SiO_2$ is increased to above 60%, higher index dopants or constituents may need to be added, which may result in a colored, rather than clear, glass. According to some embodiments, the total amount of $Er_2O_3$, $Nd_2O_3$, $Ho_2O_3$, Ce oxide, and $Pr_2O_3$ in the glass is less than 1.5 wt %, which helps to maintain clarity of the glass, and high transmissivity (transmission) at the desired wavelengths.

The step 168 of the method 152 includes separating the glass sheet 154 from the ribbon of glass 12. It should be understood that numerous glass sheets 154 can be separated from the ribbon of glass 12, and the feed device 36 delivers a constant supply of molten glass 134 from the delivery system 34 to the forming rollers 14, which continuously forms the ribbon of glass 12 anew. This allows for the continuous formation of the ribbon of glass 12 and glass sheets 154 to be separated therefrom, at least until all the molten glass 134 from the delivery system 34 is exhausted.

Step 168 encompasses any process utilized to separate the glass sheet 154 from the ribbon of glass 12. In embodiments, separating the glass sheet 154 comprises first scoring the ribbon of glass 12 and applying a tensile stress across the score to create a crack, and then driving that crack through the thickness 26 of the ribbon of glass 12. The score may be formed by any conventional method. For example, the score may be produced by contacting the ribbon of glass 12 with a scoring member 177 such as a scoring wheel, a scribe, or an abrasive member that creates damage at one of the primary surfaces 144. The subsequent tensile stress is applied by bending the ribbon of glass 12 in a direction that places the scored side of the ribbon of glass 16, across the score line, in tension. The tension in turn drives the crack formed at the score line through the thickness 146 of the ribbon of glass 12. The score line is preferably formed in the center portion 158 of the ribbon of glass 12—that is, across the width 148 of the ribbon of glass 12 between the lateral edges 150a-b.

In other embodiments, the scoring member 177 is a laser and optionally a cooling device that contacts the ribbon of glass 12 with a cooling fluid such as a cooled gas, a liquid, or a combination thereof (a mist). The laser heats the ribbon of glass 12 across the intended scoring path with a laser beam that heats a narrow region of the ribbon of glass 12 upon which the laser beam impinges. The heated path is then cooled with the cooling fluid, creating a large tension in the ribbon of glass 12 that produces a score.

In embodiments, separating the glass sheet 154 from the ribbon of glass 12 occurs when the ribbon of glass 12 is 15 inches to 100 inches from the horizontal plane 28, such as 15 inches, 20 inches, 25 inches, 30 inches, 35 inches, 40 inches, 45 inches, 50 inches, 55 inches, 60 inches, 65 inches, 70 inches, 75 inches, 80 inches, 85 inches, 90 inches, 95 inches, or 100 inches, or any range including any two of those values (e.g., 25 inches to 50 inches). The method 152 allowing the ribbon of glass 12 to cool below the glass transition temperature and the glass sheet 154 to be separated from the ribbon of glass 12 within a span of 100 inches or less from the horizontal plane 28 is a substantially different and beneficial outcome than if a slow annealing process were utilized to minimize stress. The method 152 results in the ribbon of glass 12 cooling at an average rate of 5° C./s to 25° C./s, which is a much faster average cooling rate than if a slow and lengthy anneal process were utilized. Consequently, the method 152 beneficially requires much less space than if a slow annealing process were utilized. Slow annealing processes can require the ribbon of glass 12 to undertake one or more horizontal turns to accommodate vertical building constraints. The method 152 described herein requires less than 12 feet of vertical height (or even less than 5 feet) for the ribbon of glass 12 to cool before separation of the glass sheet 154 and, thus, does not require the ribbon of glass 12 to turn horizontally.

Accordingly, the glass sheet 154 manufactured pursuant to the method 152 has a higher fictive temperature than a glass sheet 154 manufactured pursuant to a slow anneal process. "Fictive temperature" is a concept used to indicate the structural state of a glass. Glass that is cooled quickly from a high temperature is said to have a higher fictive temperature because of the "frozen in" higher temperature structure. Glass that is cooled more slowly, or that is annealed by holding for a time near its annealing point, is said to have a lower fictive temperature.

Compaction, also referred to as thermal stability or dimensional change, is an irreversible dimensional change (shrinkage) in the glass substrate. The glass sheet 154 made pursuant to the method 152 will likely have a greater compaction than if the glass sheet 154 were made from a ribbon of glass 12 slowly annealed.

The glass sheet 154 has a thickness 178 (see FIG. 13), defined as the distance between the two primary surfaces 180 of the glass sheet 154, that may be slightly less than the ribbon of glass 12 from which the glass sheet 154 is separated due to compaction. The ability to form the ribbon of glass 12 with the desired thickness 146, and thus the glass sheet 154 with the desired thickness 178, depends on the rotating speed of the pair of forming rollers 14. In embodiments, the glass sheet 154 has a thickness 178 of 0.1 mm to 8.5 mm, such as 0.1 mm, 0.11 mm, 0.25 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, or any range including any two of those values (e.g., 0.7 mm to 2.0 mm, 0.1 mm to 3.0 mm, and so on). The thickness 178 can be measured with a caliper.

In embodiments, the forming rollers 14 having the outer diameter 22 of 20 mm to 80 mm results in the ribbon of glass 12 from which the glass sheet 154 is separated, and the thickness 178 of the glass sheet 154 is 0.1 mm to 3.0 mm (such as 0.1 mm to 1.0 mm).

The glass sheet 154 produced pursuant to the method 152 has acceptably low warp and total thickness variation. In embodiments, the glass sheet 154 has a warp of 100 µm or less, such as 50 µm or less, 25 µm or less, 15 µm or less, 0.01 to 100 µm, 0.01 µm to 50 µm, 0.01 µm to 25 µm, 0.01 µm to 15 µm, or 0.01 µm, 0.1 µm, 0.5 µm, 1 µm, 2 µm, 3 µm, 4 µm, 5 µm, 6 µm, 7 µm, 8 µm, 9 µm, 10 µm, 11 µm, 12 µm, 13 µm, 14 µm, or 15 µm, 25 µm, 50 µm, 100 µm, or any range including any two of those values (e.g., 1 µm to 50 am). As described in ASTM F1390, "warp" refers to the difference between the maximum and minimum distance of the median plane from the reference plane. The middle plane, as taught by ASTM F1390, is the "imaginary" plane inside the glass sheet 154, which is estimated to be equidistant from the primary surfaces 180 of the glass sheet 154. ASTM F1390 is incorporated herein by reference.

In embodiments, the glass sheet 154 has a total thickness variation of 100 µm or less, such as 50 µm or less, 25 µm or less, 0.01 µm to 100 µm, 0.01 µm to 50 µm, 0.01 µm to 25 µm, or 0.1 µm, 0.5 µm, 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 21 µm, 22 µm, 23 µm, 24 µm, 25 µm, 50 µm, 100 µm, or any range including any two of those values (e.g., 4 µm to 50 am). "Total thickness variation" as used herein refers to the difference between the maximum thickness and the minimum thickness of the glass sheet 154 in free, unclamped, state.

In embodiments, the width 182 of the glass sheet 154 is between lateral edges, and is within a range of 15 mm to 500 mm, such as 15 mm, 25 mm, 50 mm, 100 mm, 110 mm, 120 mm, 130 mm, 140 mm, 150 mm, 160 mm, 170 mm, 180 mm, 190 mm, 200 mm, 210 mm, 220 mm, 230 mm, 240 mm, 250 mm, 260 mm, 270 mm, 280 mm, 290 mm, 300 mm, 310 mm, 320 mm, 330 mm, 340 mm, 350 mm, 375 mm, 400 mm, 425 mm, 450 mm, 475 mm, 500 mm, or any range including any two of those values (e.g., 50 mm to 400 mm). In embodiments, the lateral edges are parallel, extending a length 184.

Examples

Example 1. For Example 1, two ribbons of glass were formed using two different sets of forming rollers—a first set having an outer diameter of 4 inches (~101 mm) and a second set having an outer diameter of 2 inches (~51 mm). A single tube outlet feed device was utilized to supply the stream of molten glass to the gap between the sets of forming rollers to form the puddle of molten glass. The same flow rate of molten glass was delivered to each of the sets of forming rollers. No dams were utilized to adjust the width or the height of the puddle of molten glass.

With the set of forming rollers with the 4-inch outer diameter, a ribbon of glass was produced having a thickness of 6.1 mm and a width of 89 mm. With the set of forming rollers with the 2-inch outer diameter and the same flow rate of molten glass, (i) a ribbon of glass was produced having a smaller thickness of 4.6 mm and slightly larger width of 106 mm, and (ii) a ribbon of glass was produced having a larger width of 140 mm at approximately the same thickness of 6.1 to 6.7 mm. This example illustrates that, in general, for a given flow rate, as the outer diameter of the forming rollers decreases, the width of the ribbon of glass increases and the thickness of the ribbon of glass decreases.

Figure 16:
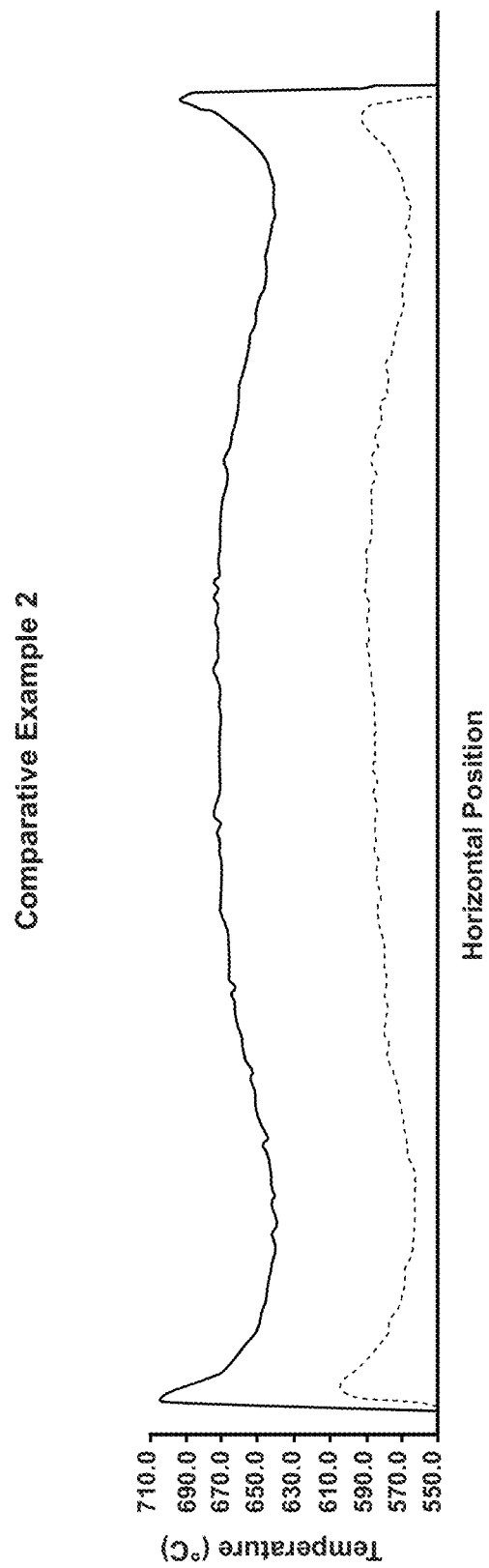
FIG. 16 is a graph of temperature of the ribbon of glass of Comparative Example 2 as a function of horizontal position taken at two different horizontal positions as the ribbon of glass cooled moving downward vertically, illustrating relatively large horizontal temperature variability throughout the ribbon of glass without active measures to reduce the horizontal temperature variability.

Comparative Example 2. For Comparative Example 2, a single tube outlet feed device was utilized to supply the stream of molten glass to the gap between the forming rollers to form the puddle of molten glass. The stream of molten glass has a viscosity of 10 Poise and a temperature of 1140° C. No dams were utilized to adjust the width or the height of the puddle of molten glass. The forming rollers formed a ribbon of glass from the puddle of molten glass. The horizontal temperature profile was measured at several vertical positions below the horizontal plane extending through the axes of rotation of the pair of forming rollers. The graph of the horizontal temperature profile measurements is reproduced at FIG. 16. Both lines of data on the graph correspond to horizontal temperature profile measurements taken before the ribbon of glass cooled to the glass transition temperature.

The upper line on the graph corresponds to a horizontal temperature profile measurement taken closer to (i.e., about 2 inches from) the horizontal plane extending through the axes of rotation of the forming rollers. Reading the upper line left-to-right indicates a maximum temperature of above 700° C. near the left lateral edge. The temperature decreases rapidly moving horizontally rightward to a minimum temperature of about 640° C. between the left lateral edge and the center portion of the ribbon of glass. The temperature then increases toward the center portion of the ribbon of glass, which had a temperature of about 670° C. The temperature then decreases moving rightward to a local minimum temperature of about 640° C. and then increases again moving to the right lateral edge to a local maximum temperature of over 690° C. That represents a horizontal temperature variation of approximately 60° C. to the left side of the center portion and a horizontal temperature variation of approximately 50° C. to the right side of the center portion.

The lower line representing horizontal temperature measurements taken further down the ribbon of glass (i.e., about 6 inches from the horizontal plane) reveal the same temperature variability pattern. The left lateral edge had a maximum temperature of over 600° C. Moving rightward, the temperature dropped to under 570° C. near the left lateral edge, rising to about 590° C. at the center portion, then falling again to under 570° C. near the right lateral edge, and then rising again to above 590° C. at the right lateral edge. That represents a horizontal temperature variation of approximately 30° C. to the left side of the center portion and a horizontal temperature variation of approximately 20° C. to the right side of the center portion.

Figure 17:
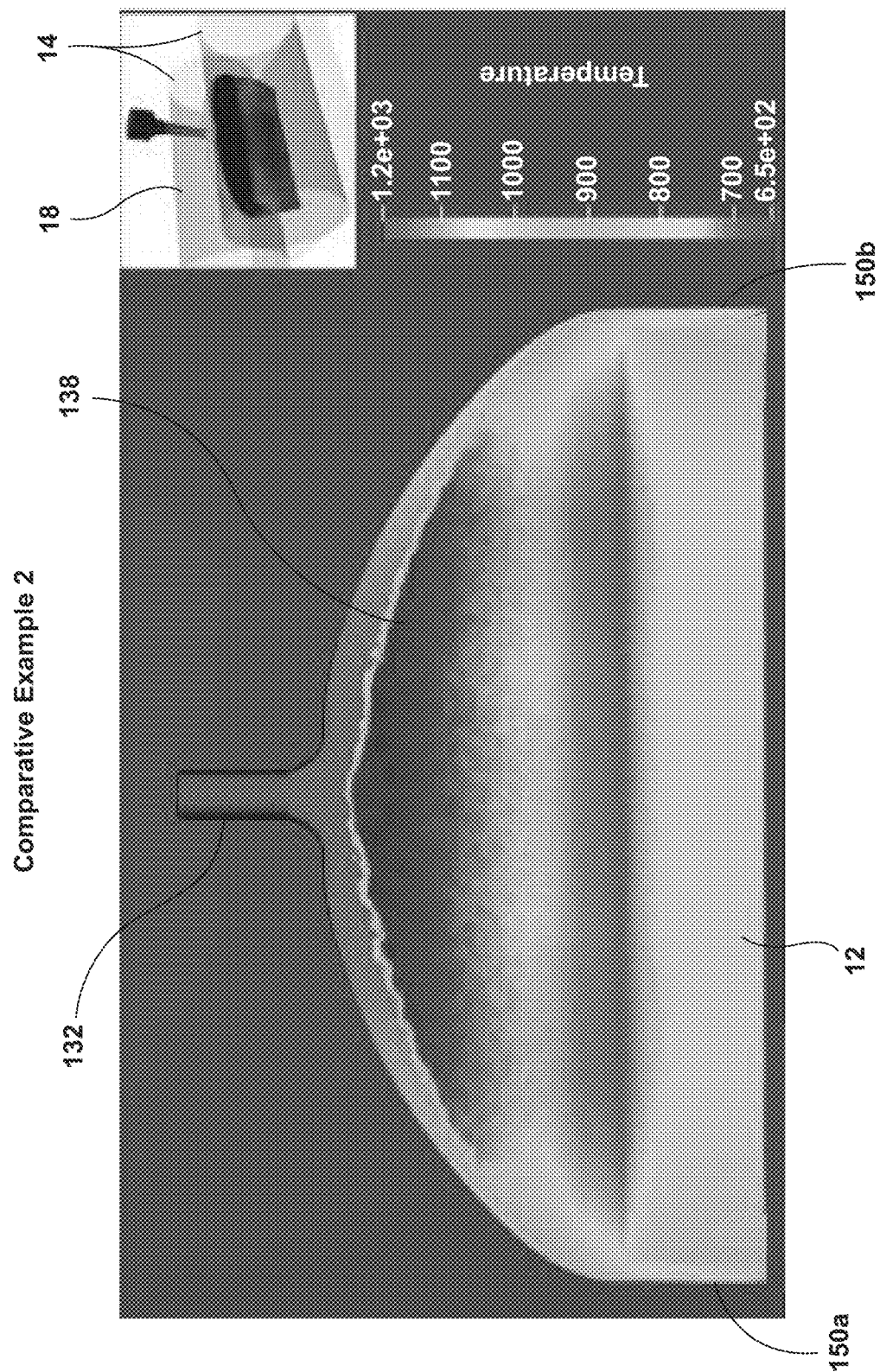
FIG. 17 is a computer modeled temperature illustration relating to Comparative Example 2, illustrating the stream of molten glass from a single tube feed device moving to the lateral edges causing large temperature variability within the ribbon of glass.

Computer modeling was performed to provide insight as to why the utilization of a single tube outlet to supply molten glass to the gap between the rollers resulted in wide horizontal temperature variations across the ribbon of glass. The modeling output reproduced at FIG. 17 illustrates that the puddle of molten glass is higher in the center portion compared to the lateral edges, and thus molten glass from center portion of the puddle of molten glass has greater contact with the rollers than the molten glass at the lateral edges. The greater contact with the rollers cools the center portion of the puddle of molten glass more than the lateral edges. Thus, the lateral edges of the ribbon of glass have a higher temperature than the center portion of the ribbon of glass.

Figure 18:
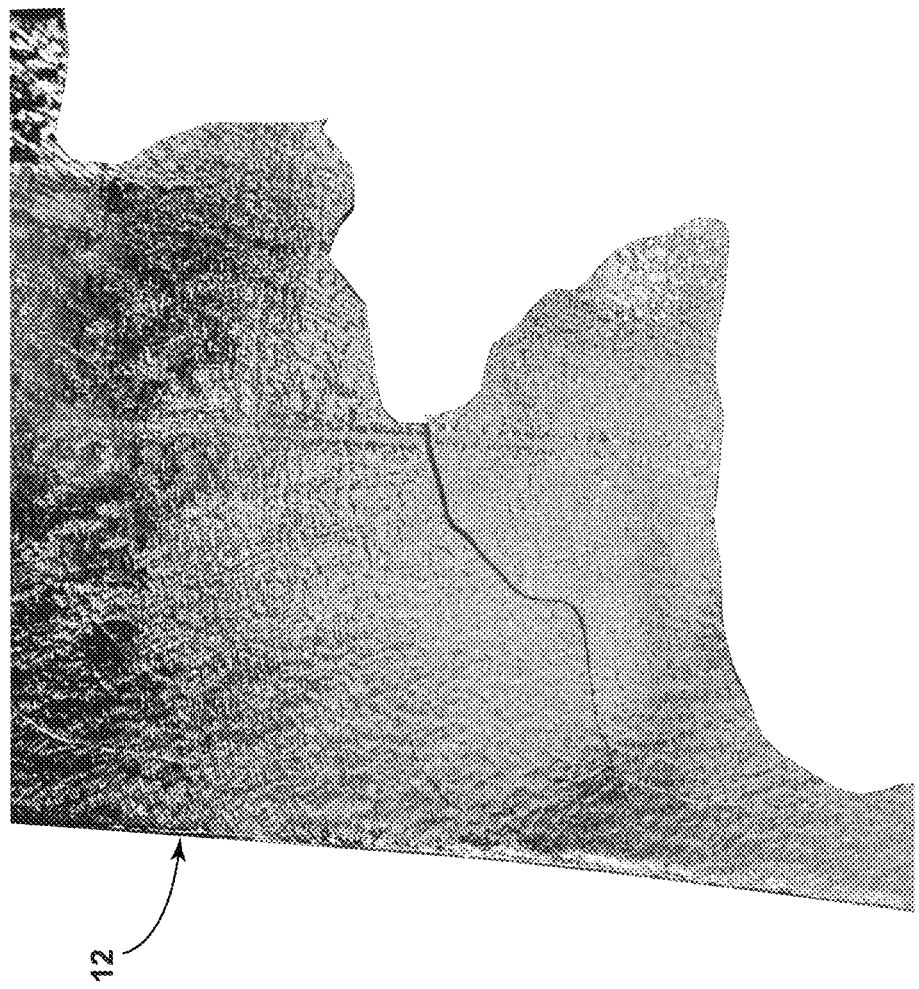
FIG. 18 is a fractured ribbon of glass relating to Comparative Example 2, illustrating that the ribbon of glass is prone to fracture upon attempt to separate a sheet of glass from the ribbon of glass absent active measures to reduce horizontal temperature variability and either (i) to reduce the vertical cooling rate before the ribbon of glass cools to the glass transition temperature, or (ii) to increase the vertical cooling rate after the ribbon of glass cools to the glass transition temperature, as set forth in the method of FIG. 12.

After cooling below the glass transition temperature, the ribbon of glass fractured upon scoring of the ribbon of glass in an attempt to separate a glass sheet therefrom. An image of the fractured ribbon of glass is reproduced at FIG. 18. As mentioned above, without being bound by theory, it is hypothesized that the horizontal temperature variability across the ribbon of glass and the too rapid cooling of the ribbon of glass before cooling to the glass transition temperature locked in an internal stress after cooling to the glass transition temperature that was too high for the ribbon of glass to tolerate without fracturing.

Figure 19:
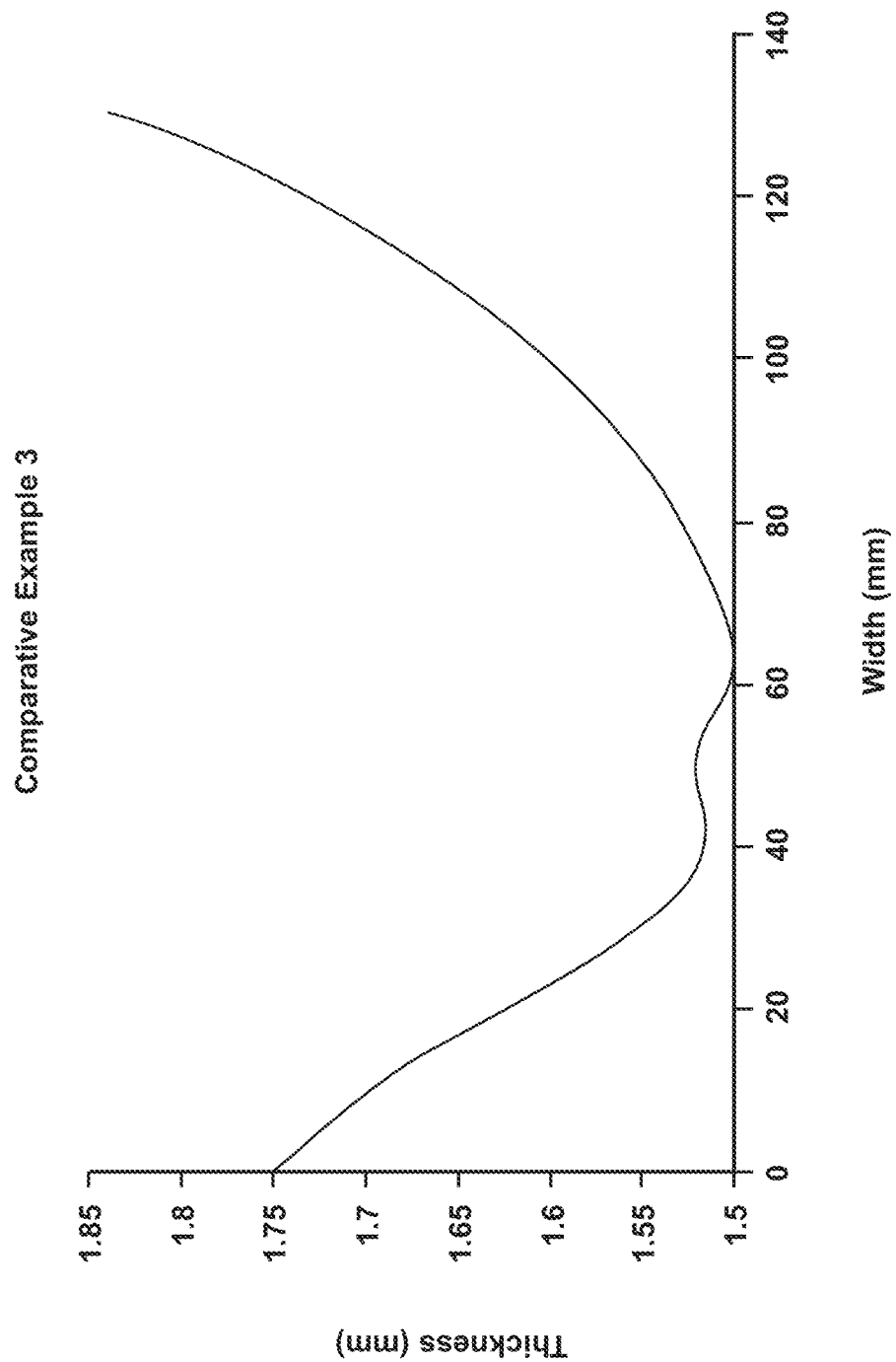
FIG. 19 is a graph of the thickness of the ribbon of glass of Comparative Example 3 as a function of horizontal position across the ribbon of glass from one lateral edge to the other lateral edge, where no effort was made to cool the outer cylindrical surface of the forming rollers, illustrating that the thickness of the ribbon of glass at the lateral edges were thicker than the thickness of the ribbon of glass at the center portion thereof.

Comparative Example 3. For Comparative Example 3, a single tube outlet feed device was utilized to supply the stream of molten glass to the gap between the forming rollers to form the puddle of molten glass. No effort was made to cool the outer cylindrical surface of the forming rollers, as the forming rollers formed a ribbon of glass from the puddle of molten glass. The result is the formation of a ribbon of glass with significant thickness variation, as set forth in the graph reproduced at FIG. 19. In particular, the thickness of the ribbon of glass at the lateral edges were measured to be about 1.75 mm or above, while the thickness of the ribbon of glass at the center portion was measured to be as thin as 1.5 mm.

Figure 20:
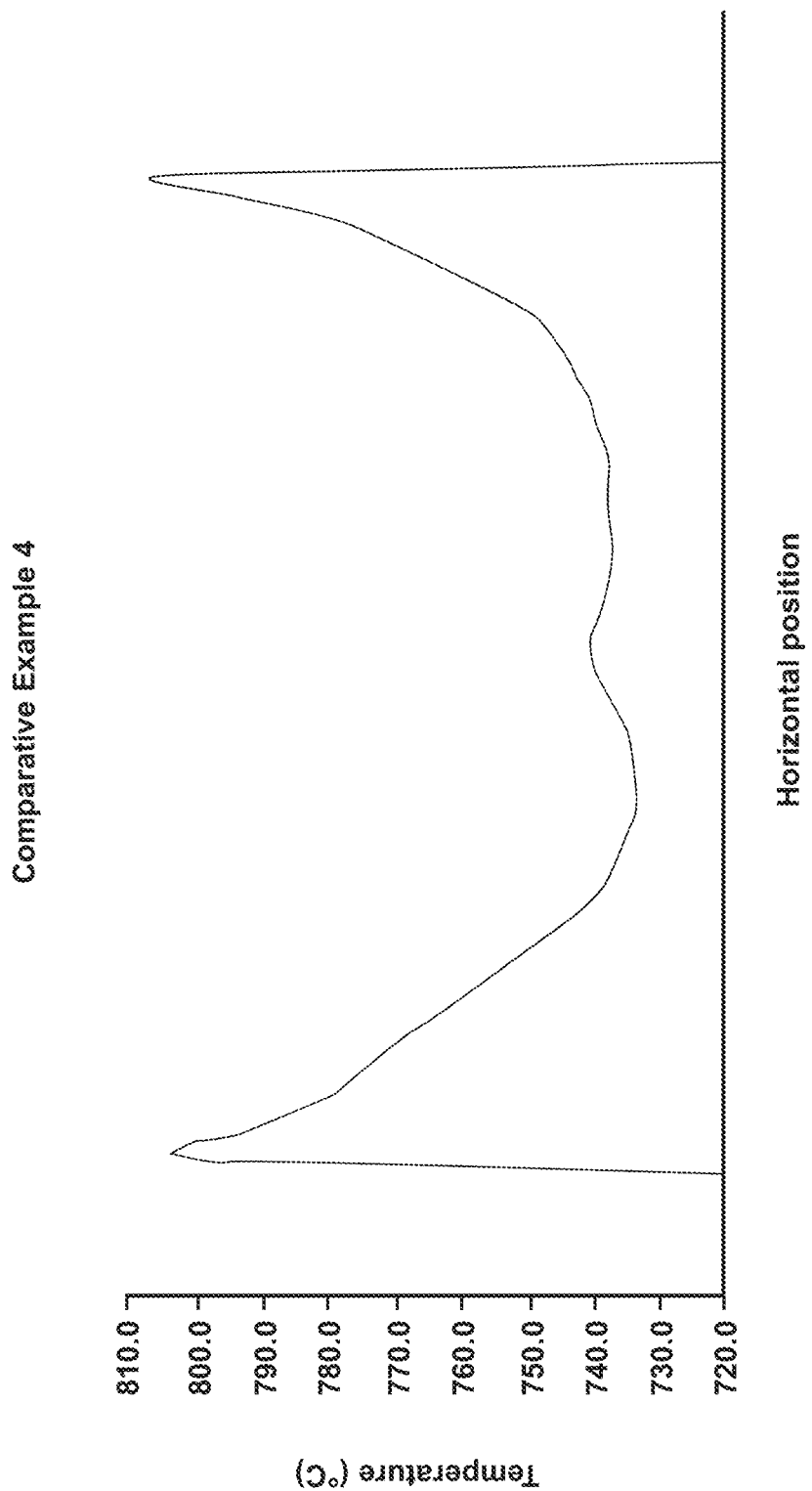
FIG. 20 is a graph of temperature of the ribbon of glass of Comparative Example 4 as a function of horizontal position, illustrating relatively large horizontal temperature variability throughout the ribbon of glass without measures to actively reduce the horizontal temperature variability.

Comparative Example 4 and Example 5. For Comparative Example 4, a single tube outlet feed device supplied the stream of molten glass to the gap between the forming rollers to form the puddle of molten glass. No dams were utilized to adjust the width or the height of the puddle of molten glass. The forming rollers formed a ribbon of glass from the puddle of molten glass. The horizontal temperature profile was measured at a position below the horizontal plane extending through the axes of rotation of the pair of forming rollers, before the ribbon of glass cooled to the glass transition temperature. The graph of the horizontal temperature profile measurement is reproduced at FIG. 20. The maximum temperatures of the ribbon of glass were at the lateral edges and measured about 805° C. The minimum temperature of the ribbon of glass was within the center portion and measured about 735° C. The horizontal temperature variability of the ribbon of glass was thus about 70° C.

Figure 21:
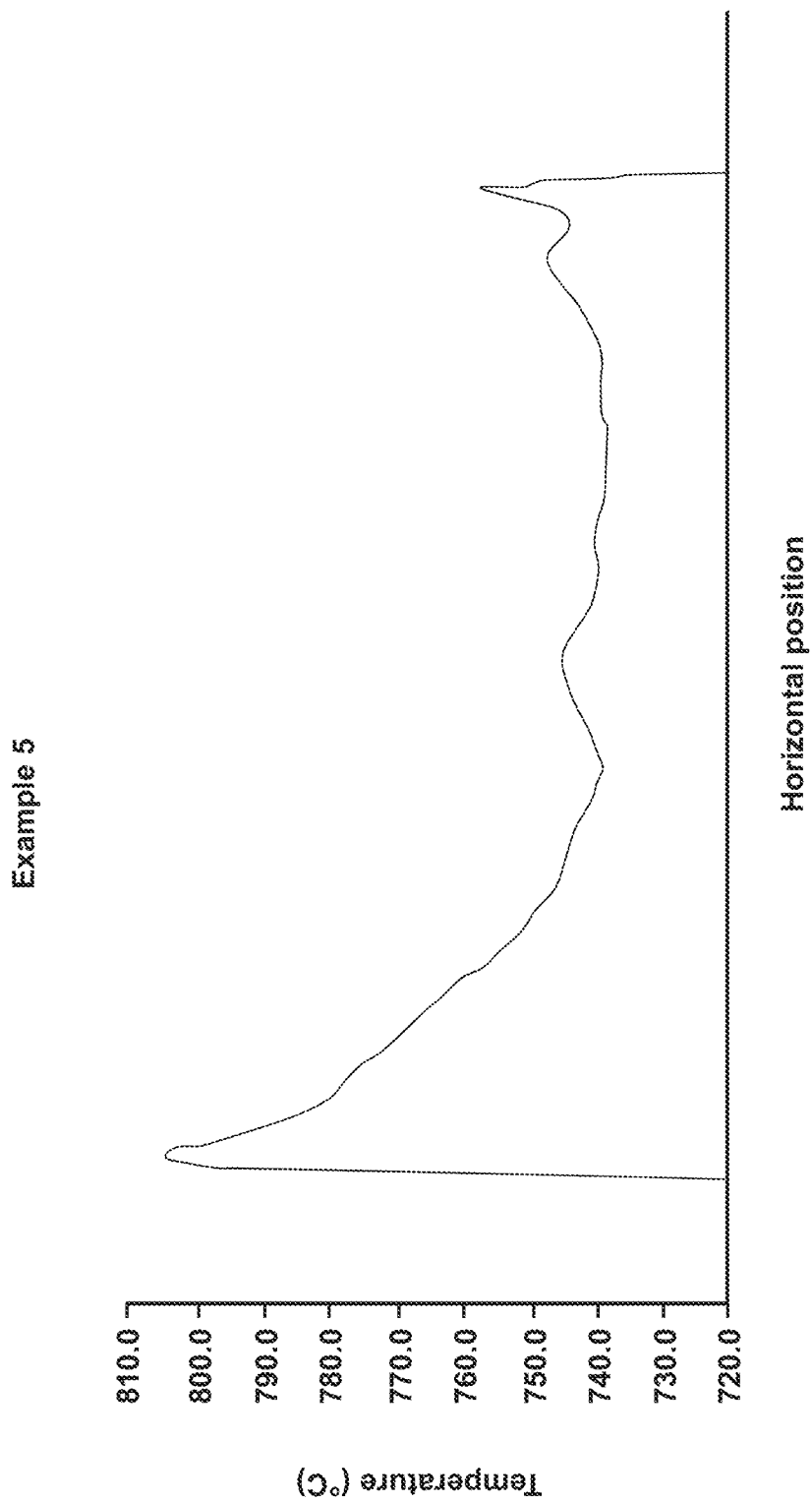
FIG. 21 is a graph of temperature of the ribbon of glass of Example 5 as a function of horizontal position, illustrating reduced horizontal temperature variability on the right side of the ribbon of glass where a tube outlet blew cooling gas onto the right lateral side of the ribbon of glass compared to the left side of the ribbon of glass where no such cooling gas was blown.

For Example 5, the same circumstances that formed the ribbon of glass for Comparative Example 4 were present, except the second tube outlet was utilized to blow cooling gas (specifically, air) at the second lateral edge of the ribbon of glass. The horizontal temperature profile was measured at a horizontal position below the horizontal plane extending through the axes of rotation of the pair of forming rollers, before the ribbon of glass cooled to the glass transition temperature. The graph of the horizontal temperature profile measurement is reproduced at FIG. 21. The maximum temperature of the ribbon of glass was at the first lateral edge and measured about 805° C., and occurred because cooling gas was not blown at the first lateral edge (to allow for further comparison). The minimum temperature of the ribbon of glass was at the center portion and measured about 740° C. A local maximum temperature did occur at the second lateral edge but measured under 760° C., because the blown cooling gas cooled the second lateral edge. Blowing the cooling gas onto the second lateral edge of the ribbon of glass reduced the temperature of the second lateral edge by about 45° C. compared to the first lateral edge. In addition, the horizontal temperature variation between the center portion and the second lateral edge was about 20° C., while the horizontal temperature variation between the center portion and the first lateral edge was about 55° C. Thus, blowing the cooling gas onto the lateral edges of the ribbon of glass is demonstrated to reduce horizontal temperature variability of the ribbon of glass. Further, blowing the cooling gas onto the second lateral edge of the ribbon of glass reduced the variation in thickness of the second lateral edge of the ribbon of glass compared to the center portion.

Example 6. For Example 6, a single tube outlet feed device was utilized to supply the stream of molten glass to the gap between the forming rollers to form the puddle of molten glass. No dams were utilized to adjust the width or the height of the puddle of molten glass. The forming rollers formed a ribbon of glass from the puddle of molten glass. A pair of pinching rollers were utilized to reduce the thickness of the second lateral edge of the ribbon of glass but not the first lateral edge of the ribbon of glass. The pair of pinching rollers reduced the thickness of the ribbon of glass at the second lateral edge from 3 mm to 2.26 mm. The thickness of the ribbon of glass near the second lateral edge was about 2.2 mm. The thickness of some portions of the ribbon of glass were reduced to 1.9 mm.

Figure 22:
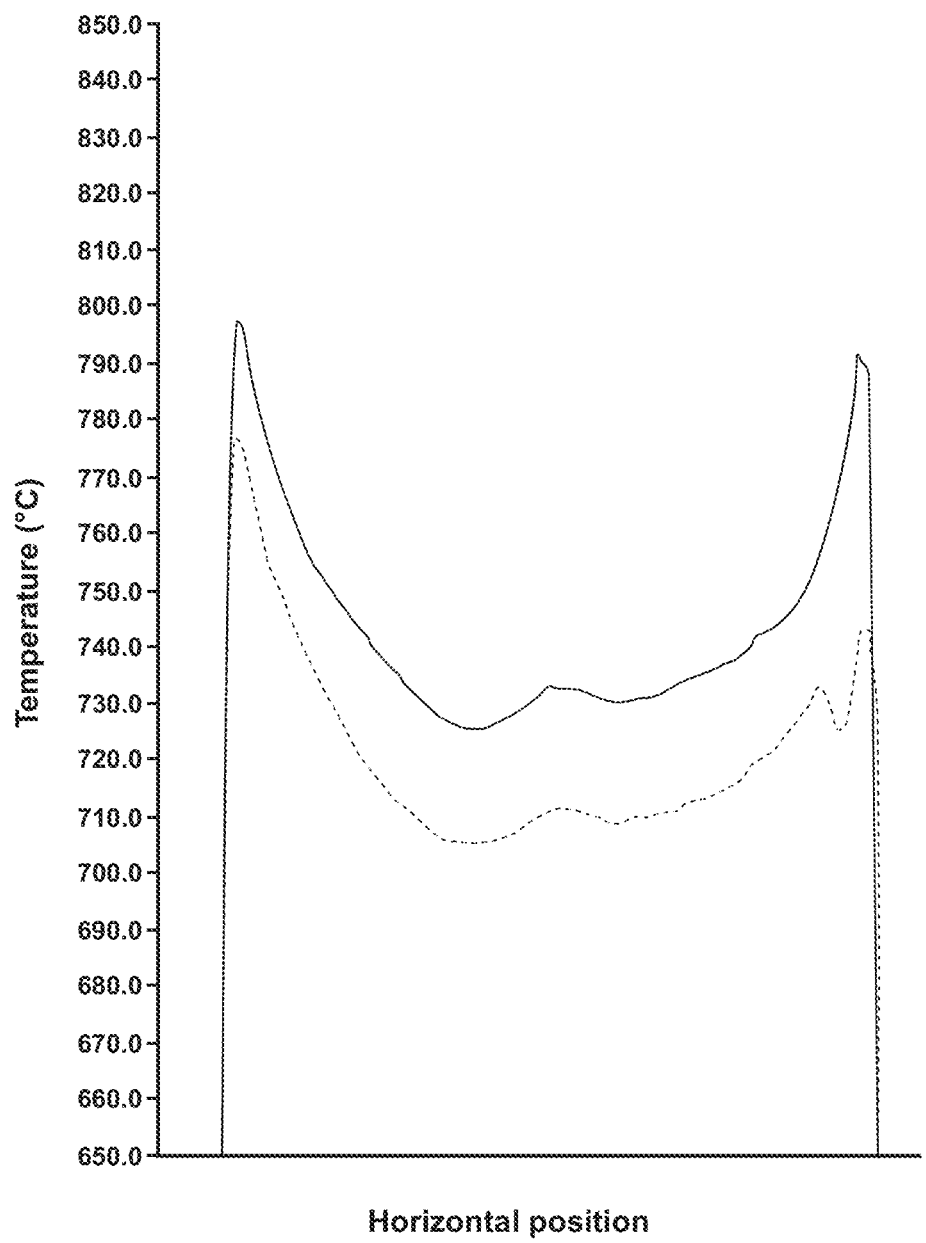
FIG. 22 is a graph of temperature of the ribbon of glass of Example 6 as a function of horizontal position, illustrating reduced horizontal temperature variability on the right side of the ribbon of glass where a set of pinching rollers reduced the thickness of the right lateral side of the ribbon of glass compared to the left side of the ribbon of glass where no such set of pinching rollers were utilized.

The horizontal temperature profile was measured at a horizontal position before the pair of pinching rollers reduced the thickness of the second lateral edge of the ribbon of glass. The horizontal temperature profile was again measured at a lower position after the pair of pinching rollers reduced the thickness of the second lateral edge of the ribbon of glass. The graph of the horizontal temperature profile measurements is reproduced at FIG. 22. Before the pair of pinching rollers reduced the thickness of the second lateral edge, the second lateral edge had a temperature of about 790° C., while the center portion had a temperature of under 730° C., providing a horizontal temperature variation of over 60° C. After the pair of pinching rollers reduced the thickness of the second lateral edge, the second lateral edge had a temperature of about 745° C., while the center portion had a temperature of about 705° C., providing a horizontal temperature variation of about 40° C. Reducing the thickness of the second lateral edge thus reduced horizontal temperature variation by about 20° C. The first lateral edge had a temperature of about 775° C., which was about 30° C. higher than the second lateral edge after contact with the pair of pinching rollers. The maximum temperatures of the ribbon of glass were at the lateral edges and measured about 805° C. The minimum temperature of the ribbon of glass was within the center portion and measured about 735° C. The horizontal temperature variability of the ribbon of glass was thus about 70° C.

Figure 25:
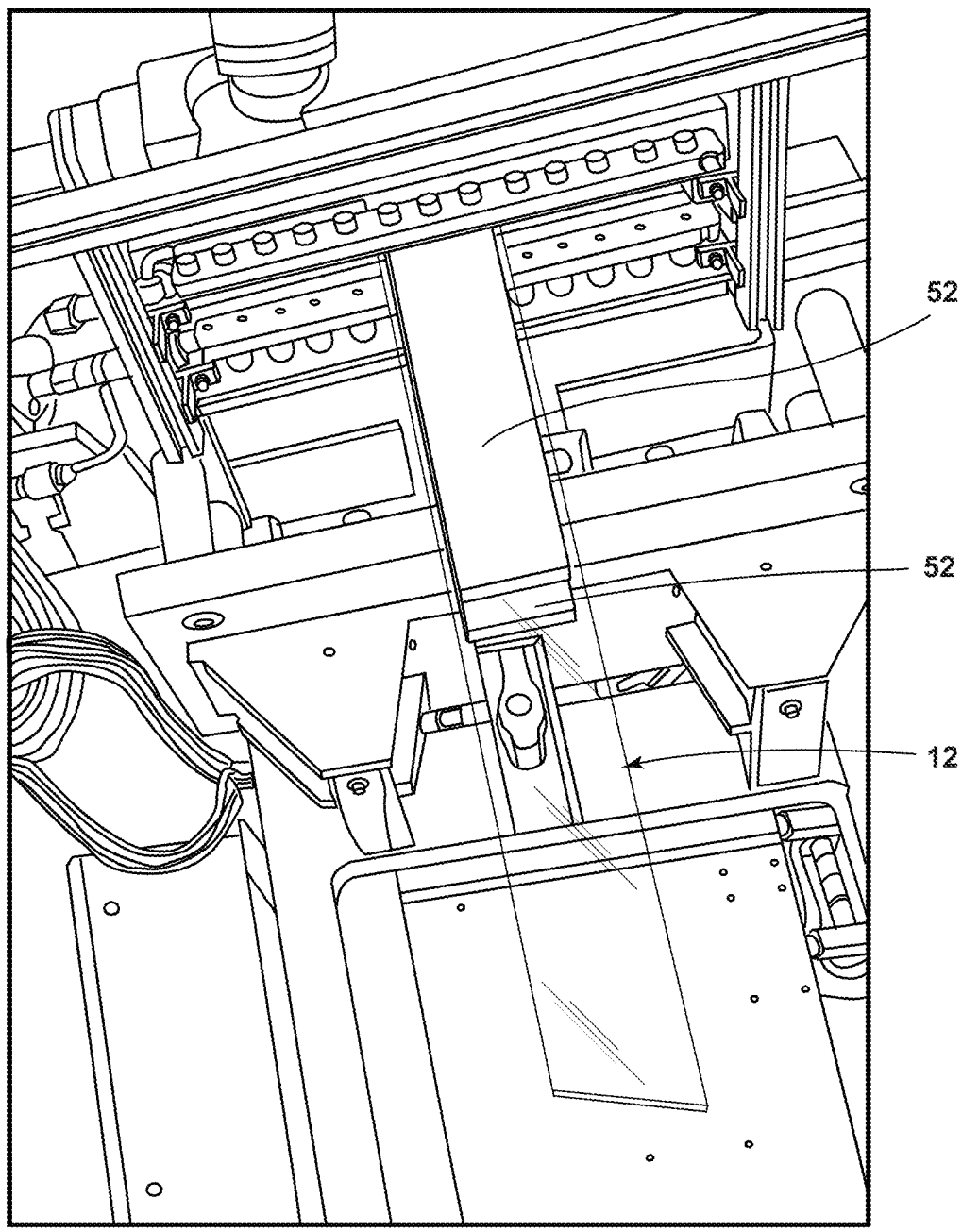
FIG. 25 illustrates the ribbon of glass of Example 8 and the heat loss reduction elements in the form of insulative substrates facing both sides of the ribbon of glass, illustrating a lack of fracture because of the insulative substrates actively reducing horizontal temperature variability and vertical cooling rate of the ribbon of glass before the ribbon of glass cools to the glass transition temperature.

Comparative Example 7 and Example 8. For both Comparative Example 7 and Example 8, a single tube outlet feed device was utilized to supply the stream of molten glass to the gap between the forming rollers to form the puddle of molten glass. No dams were utilized to adjust the width or the height of the puddle of molten glass. The forming rollers formed a ribbon of glass from the puddle of molten glass. With Comparative Example 7, no heat loss reduction elements were positioned to face the primary surfaces of the ribbon of glass, allowing the ribbon of glass to cool without restriction. With Example 8, heat loss reduction elements in the form of insulative substrates were positioned to face both primary surfaces of the ribbon of glass, with the insulative substrates centered to leave the lateral edges of the ribbon of glass exposed but the center portion insulated, as shown in FIG. 25.

Figure 23:
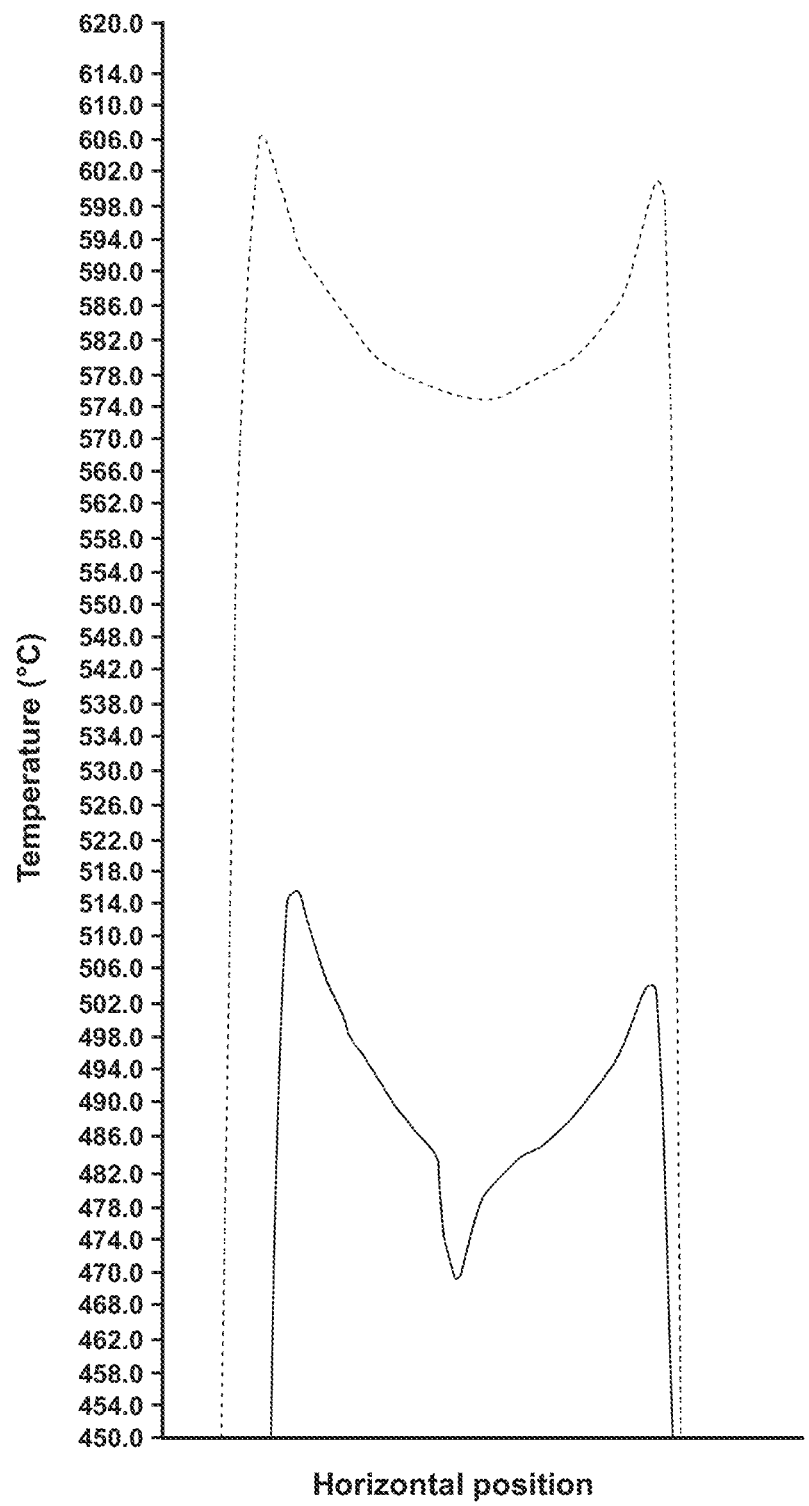
FIG. 23 is a graph of temperature of the ribbon of glass of Comparative Example 7 as a function of horizontal position taken at two different vertical positions, illustrating no reduction of horizontal temperature variability where no heat loss reduction elements were utilized.
Figure 24:
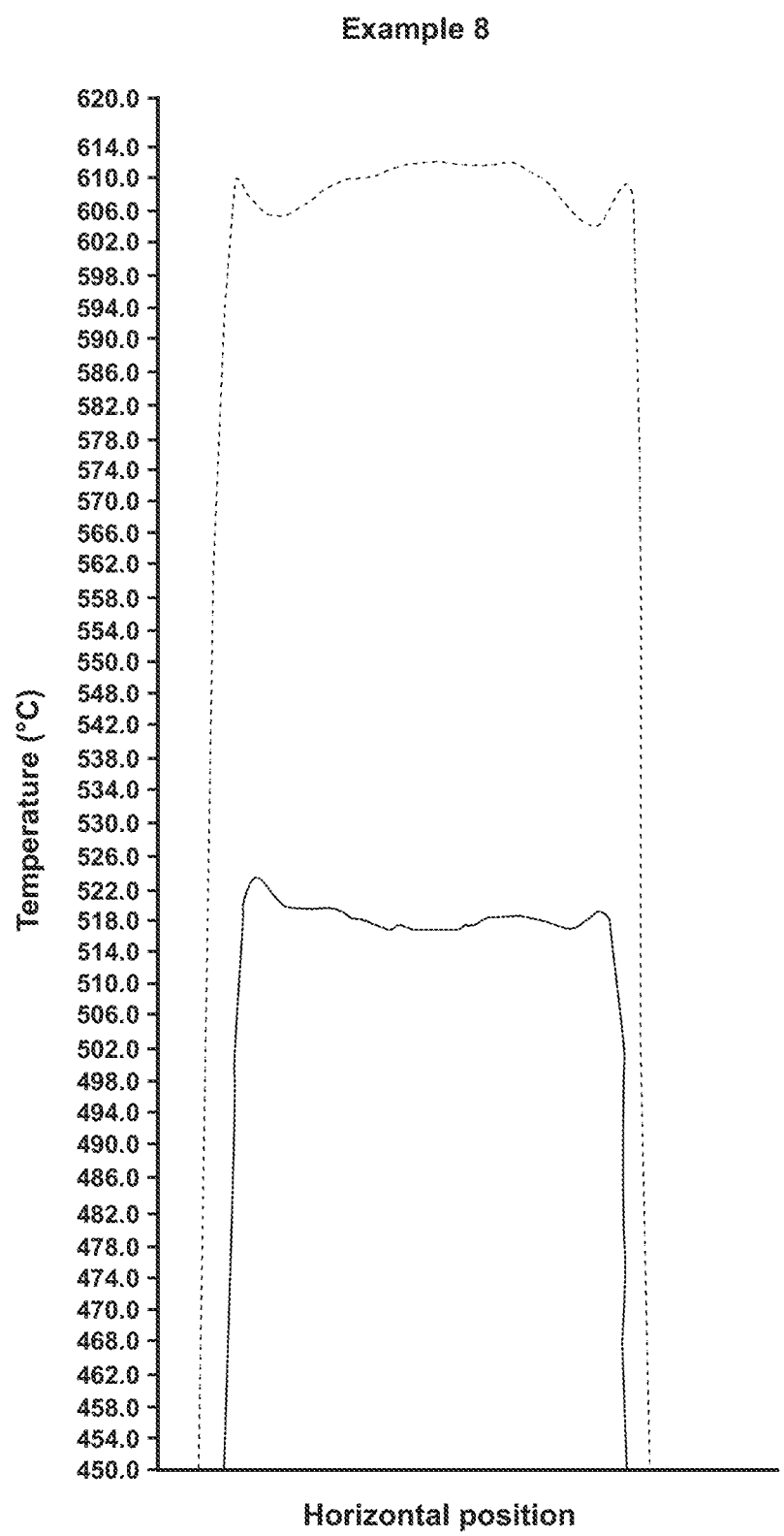
FIG. 24 is a graph of temperature of the ribbon of glass of Example 8 as a function of horizontal position taken at two different vertical positions, illustrating significant reduction in horizontal temperature variability due to facing separate heat loss reduction elements, in the form of insulative substrates, at each of the primary surfaces of the ribbon of glass at the central portion of the ribbon of glass but not the lateral edges.

For both Comparative Example 7 and Example 8, the horizontal temperature profile was measured at two vertical positions—the first horizontal position being just below a bottom of the insulative substrate(s) and the second horizontal position being lower and closer to where the temperature of the ribbon of glass approaches the glass transition temperature. The horizontal temperature profiles are graphically reproduced as FIG. 23 for Comparative Example 7 and as FIG. 24 for Example 8. The use of no heat loss reduction elements in Comparative Example 7 resulted in a substantial horizontal temperature variation that increased as the ribbon of glass approached the glass transition temperature. More specifically, the first lateral edge of the ribbon of glass had a temperature of about 606° C. at the first horizontal temperature profile measurement, while the center portion had a temperature of about 574° C., for a horizontal temperature variation of about 32° C. At the lower horizontal temperature profile measurement, the first lateral edge had a temperature of about 516° C., while the center portion had a temperature of about 470° C., for a horizontal temperature variation of about 46° C.

Figure 26:
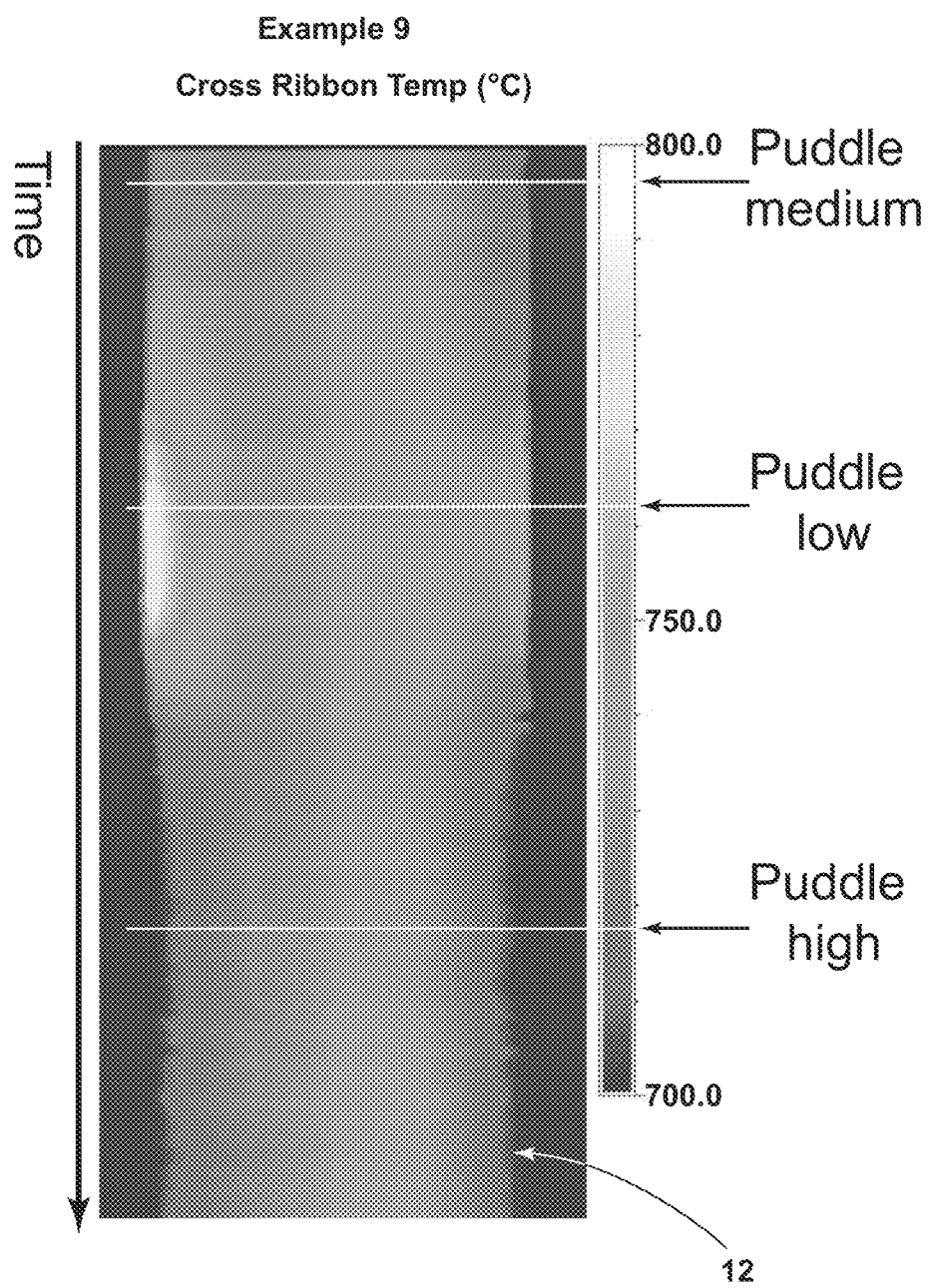
FIG. 26 is a thermal imaging temperature profile of the ribbon of glass of Example 9, illustrating that, (i) when the dams are placed in the first position resulting in a relatively short puddle of molten glass ("Puddle Low"), the resulting ribbon of glass has a relatively high horizontal temperature variability, (ii) when the dams are placed in a second position resulting in a taller puddle of molten glass ("Puddle Medium"), the resulting ribbon of glass has a relatively low horizontal temperature variability, and (iii) when the dams are placed in an even closer position resulting in an even taller puddle of molten glass ("Puddle High"), the resulting ribbon of glass has a more excessive horizontal temperature variability than the Puddle Medium scenario but less extreme horizontal temperature variability than the Puddle Low scenario.

In contrast, the use of two heat loss reduction elements in the form of insulative substrates in Example 8—one insulative substrate facing the center portion of one primary surface of the insulative substrate, a second insulative substrate facing the center portion of the other primary surface of the insulative substrate—caused the temperature of the lateral edges to approximately equalize with the center portion. At the upper horizontal temperature profile measurement, the center portion had the highest temperature of about 612° C., while the lowest temperature of about 604° C. was near but not at the second lateral edge of the ribbon of glass. Horizontal temperature continued to equalize as the ribbon of glass approached the glass transition temperature. At the lower horizontal temperature profile measurement, the first lateral edge had the highest temperature of about 526° C., while the lowest temperature of about 518° C. was at the center portion of the ribbon of glass. The horizontal temperature variation from the center portion to the second lateral edge was less than 4° C. In Example 8, a glass sheet was able to be separated from the ribbon of glass without the ribbon of glass fracturing, as illustrated in the photograph reproduced at FIG. 26.

Example 9. For Example 9, a single tube outlet feed device was utilized to supply a stream of molten glass to the gap between the forming rollers to form the puddle of molten glass. The mass flow rate of the stream of molten glass was altered to change the height of the puddle of molten glass, which approximates the use of dams to control the height of the puddle of molten glass. The forming rollers formed a ribbon of glass from the puddle of molten glass. Initially, the mass flow rate of the stream of molten glass was relatively high and thus the puddle of molten glass was relatively high. The horizontal temperature profile was then determined for the resulting ribbon of glass formed when the puddle was relatively high. This horizontal temperature profile is denoted on the graph reproduced as FIG. 26 as "Puddle high." The horizontal temperature variability was no more than about 40° C. The mass flow rate of the stream of molten glass was then altered to be relatively low and thus the puddle of molten glass was relatively low. The horizontal temperature profile was then determined for the resulting ribbon of glass that was formed when the puddle was relatively low. This horizontal temperature profile is denoted on the graph as "Puddle low." The horizontal temperature variability was as high as about 80° C. The mass flow rate of the stream of molten glass was then changed to be between the relatively low and the relatively high mass flow rates, resulting in the puddle of molten glass to have a medium height. The horizontal temperature profile was then determined for the resulting ribbon of glass. The horizontal temperature profile for the "Puddle Medium" scenario reveals the overall least horizontal temperature variability of the different scenarios. The horizontal temperature variability resulting from the "Puddle Medium" scenario was no more than about 10° C.

Figure 27:
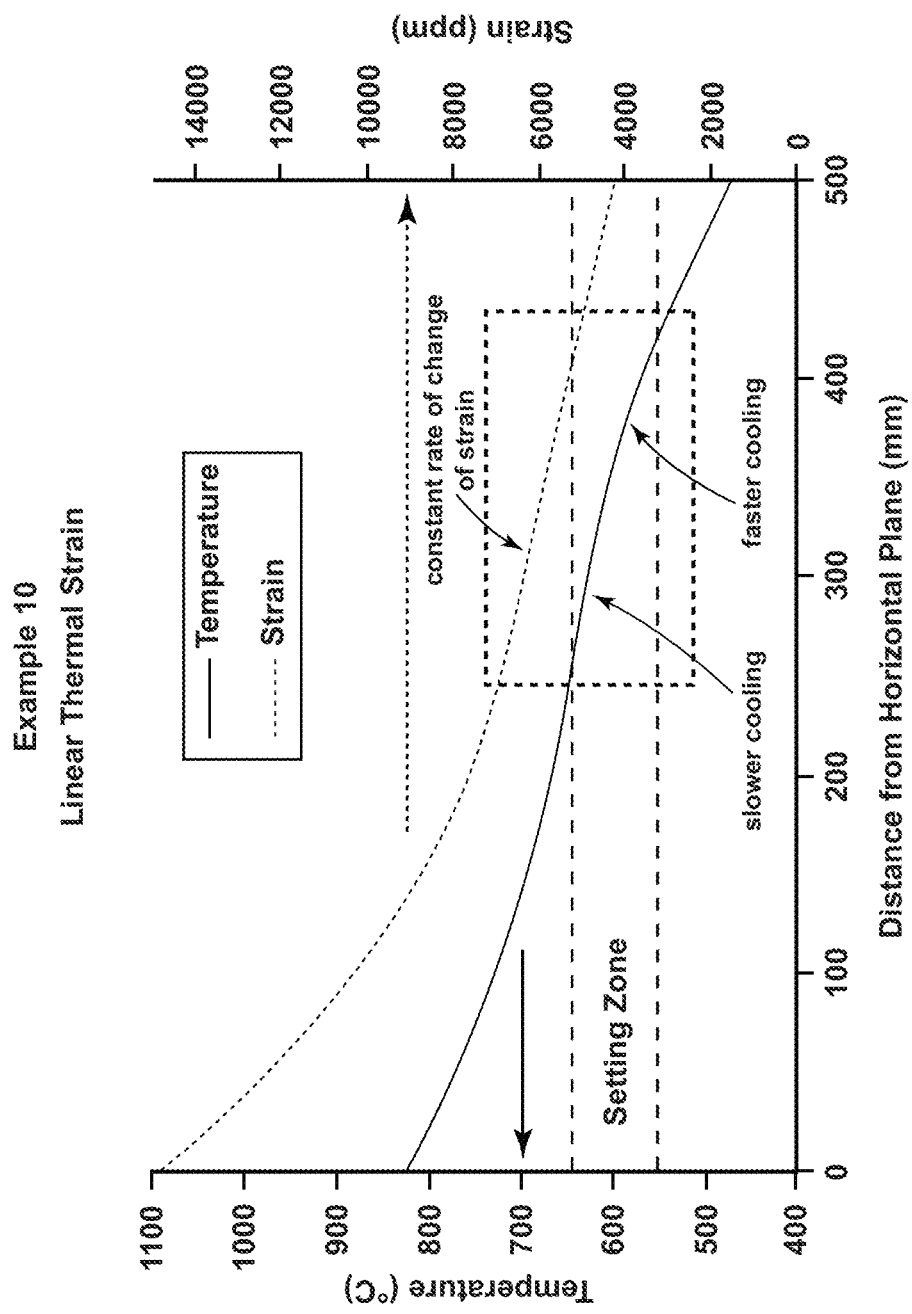
FIG. 27, relating to Example 10, is a computer model of strain and temperature of the ribbon of glass as a function of vertical distance from the horizontal plane, illustrating that, if the rate of cooling of the ribbon of glass is slowed within the setting zone just before cooling to the glass transition temperature, and then accelerated within the setting zone just after cooling to the glass transition temperature, then the rate of change of the strain is relatively constant throughout the setting zone, meaning reduced thermal stress while the ribbon of glass cools past the glass transition temperature.

Example 10. For Example 10, a computer model of temperature of the ribbon of glass as a function of distance from the horizontal plane was generated in order to achieve a constant rate of change of the thermal strain (i.e., a linear strain profile) throughout the "setting zone" centered about an assumed glass transition temperature of 600° C. The graph of the modeled results is reproduced as FIG. 27. To achieve a constant rate of change of the thermal strain downward along the ribbon of glass while the ribbon of glass is transitioning through the glass transition temperature, i.e., from 650° C. to 550° C., the ribbon of glass needs to cool relatively slowly from about 250 mm to about 350 mm from the horizontal plane while the temperature is above 600° C., and then relatively quickly from 350 mm and onward from the horizontal plane while the temperature is below 600° C. Note that, according to the model, the ribbon of glass should take about 100 mm to cool from 650° C. to 600° C. (from about 250 mm to about 350 mm) but only about 75 mm to cool from 600° C. to 550° C. (from about 350 mm to about 425 mm).

Figure 28:
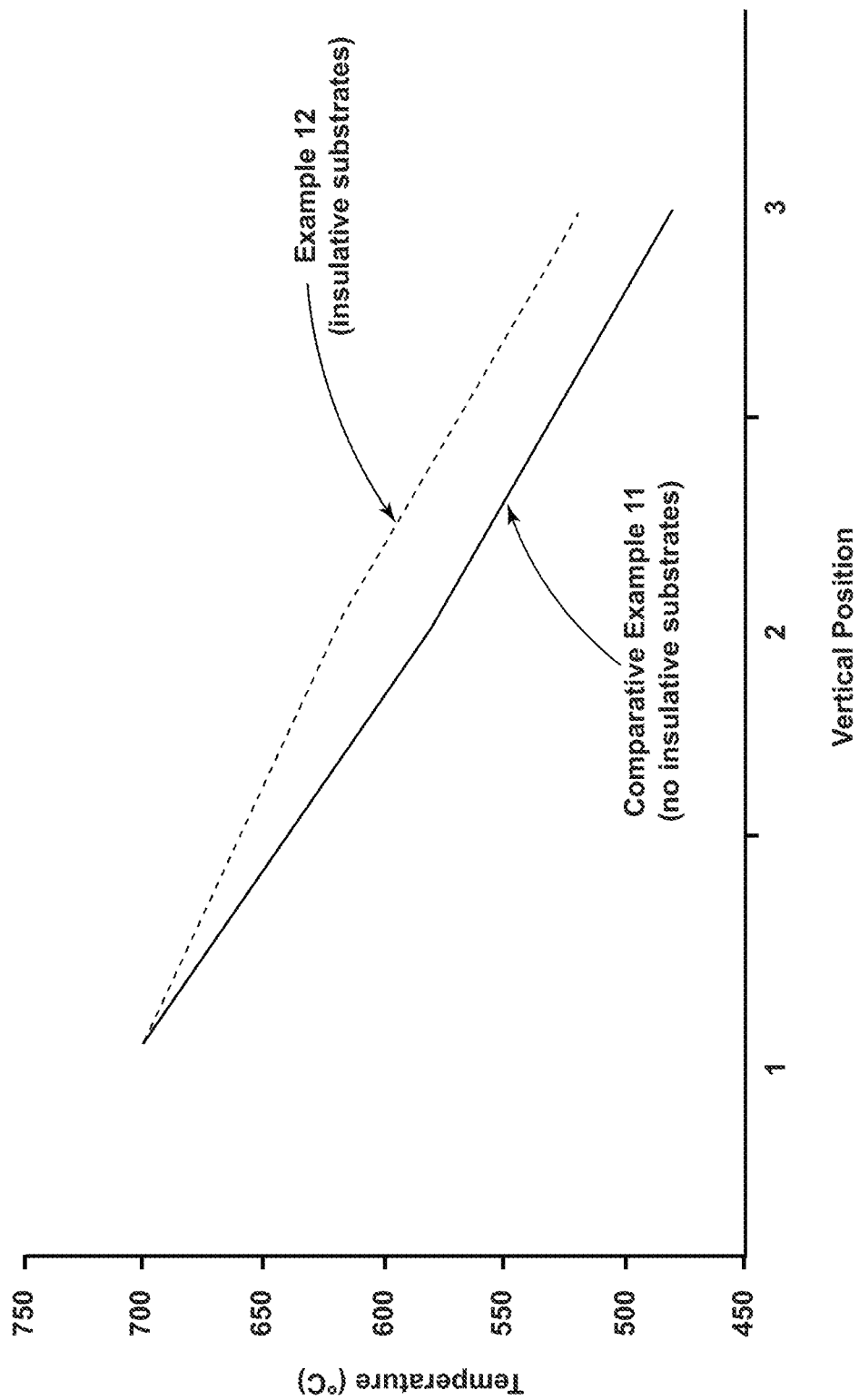
FIG. 28 is a graph of temperature of the ribbon of glass of Comparative Example 11 (where no heat loss reduction elements were implemented) and of Example 12 (where heat loss reduction elements in the form of insulative substrates were implemented) as a function of vertical position, illustrating that the insulative substrates used in Example 12 result in the ribbon of glass cooling more slowly from positions 1-2 and then more quickly from positions 2-3, which is closer to the computer-modeled reduced thermal stress situation of FIG. 27.

Comparative Example 11 and Example 12. For Comparative Example 11 and Example 12, a single tube outlet feed device was utilized to supply the stream of molten glass to the gap between the forming rollers to form the puddle of molten glass. No dams were utilized to adjust the width or the height of the puddle of molten glass. The forming rollers formed a ribbon of glass from the puddle of molten glass. For Example 12 (like Example 8), heat loss reduction elements in the form of insulative substrates were positioned to face both primary surfaces of the ribbon of glass, with the insulative substrates centered to leave the lateral edges exposed but the center portion of the ribbon of glass insulated. For Comparative Example 11, no heat loss reduction elements were utilized, and the ribbon of glass cooled by exposure to ambient air. The temperature of the ribbon of glass was measured via infrared camera at three positions (position 1 exiting the forming rollers, position 2 where the ribbon of glass passed the insulative substrate in Example 11, and position 3 further down the ribbon before separation of a glass sheet from the ribbon of glass). The recorded temperature as a function of position measured is graphically reproduced as FIG. 28. The insulative substrates resulted in the ribbon of glass of Example 12 cooling slower than the ribbon of glass of Comparative Example 11. The ribbon of glass of Example 12 had a temperature at position 2 that was about 40° C. higher than the temperature of the ribbon of glass of Comparative Example 11 at position 2. From position 2 to position 3, where the ribbon of glass of Example 12 no longer faced the insulative substrates, the rate of cooling (i.e., temperature decrease) increased compared to the rate of cooling from position 1 to position 2. The rate of cooling for Example 12 from position 1 to position 2 resulted in a thermal strain profile that is closer to linear than the rate of cooling for Comparative Example 11.

Figure 29:
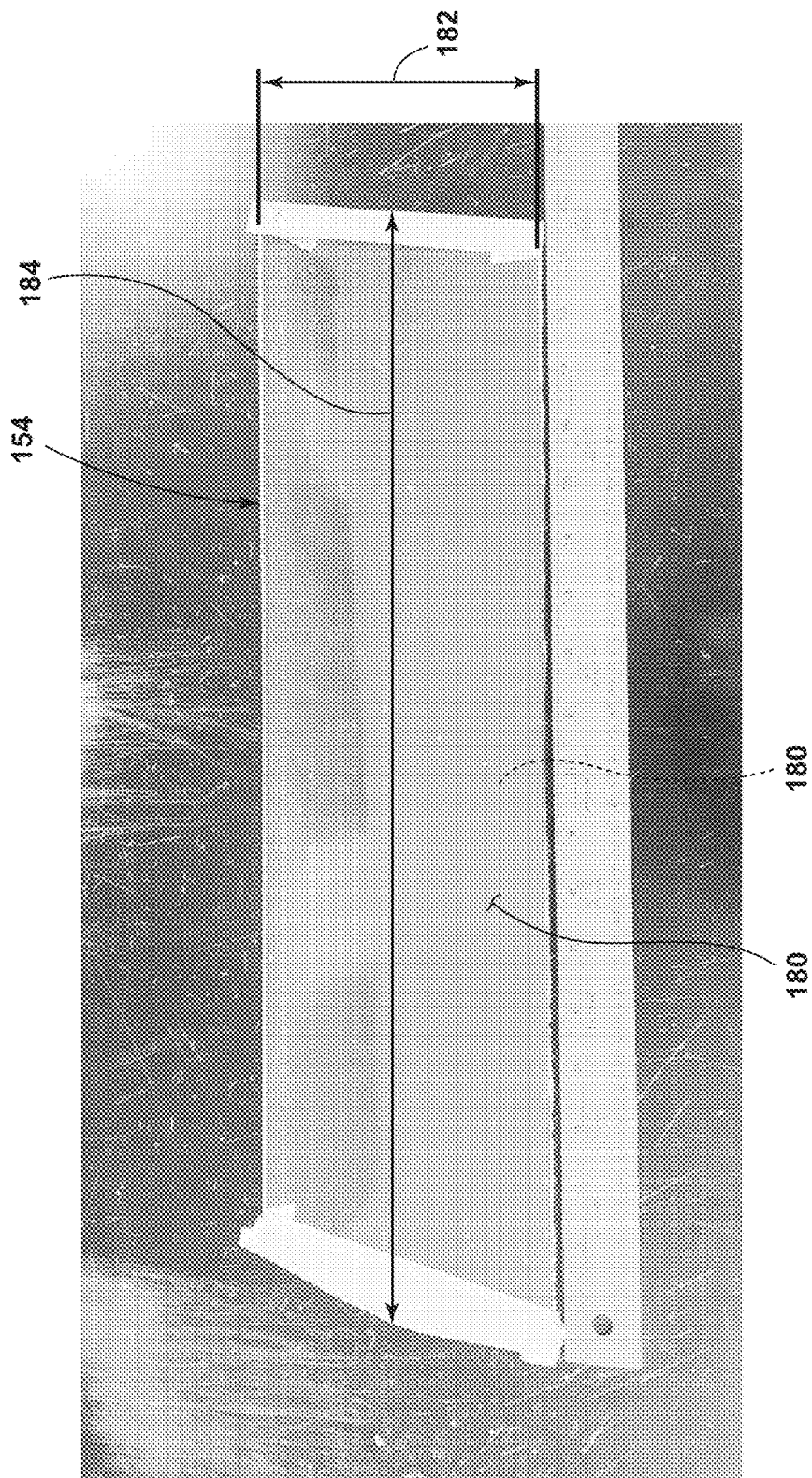
FIG. 29, relating to Example 13, is a picture of a glass sheet separated from a ribbon of glass made pursuant to the method of FIG. 12, illustrating that the glass sheet is without fracture or noticeable warp.
Figure 30:
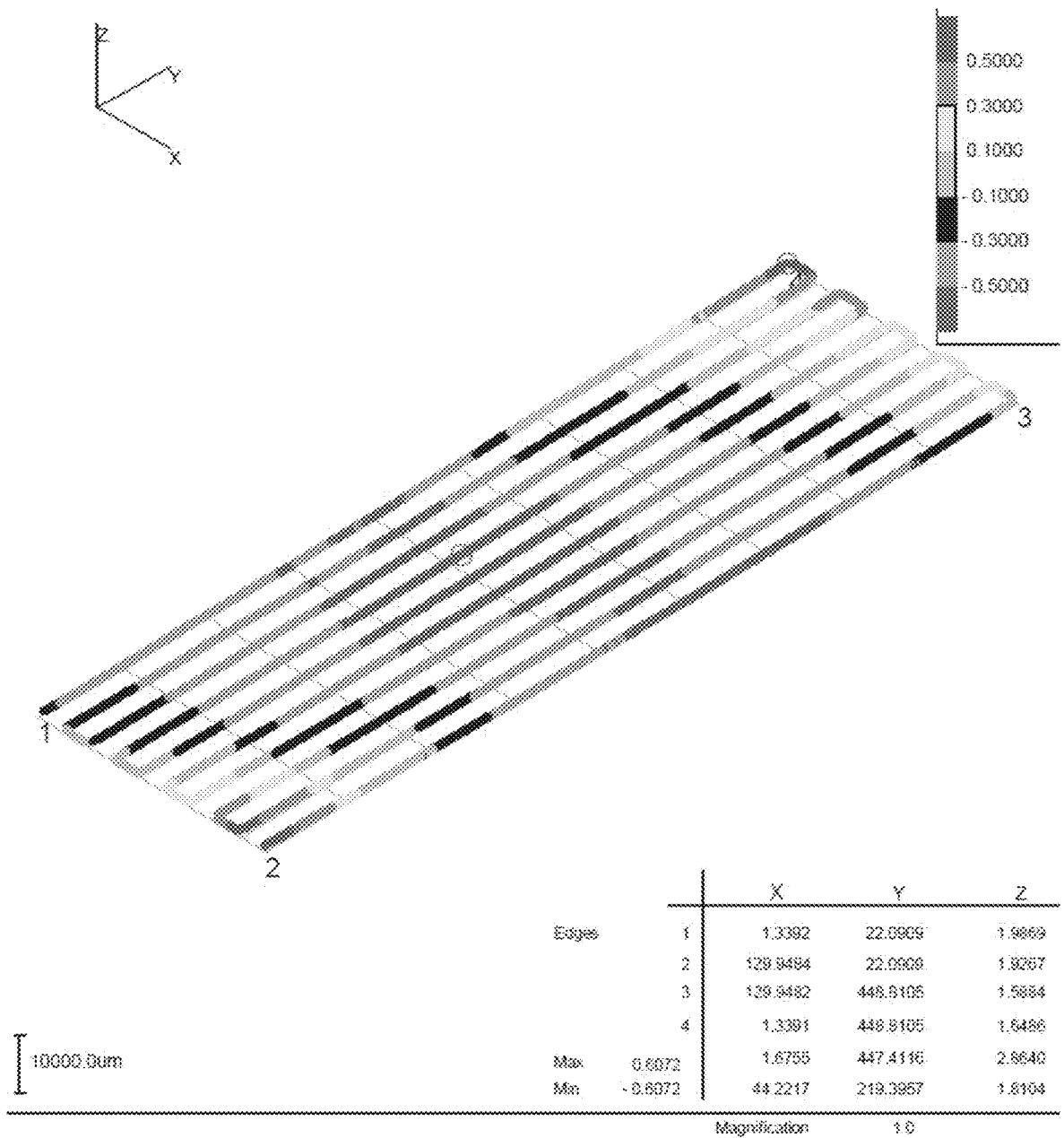
FIG. 30 is a profilometry profile of the glass sheet of FIG. 29, illustrating that the separated glass sheet has minimal warp and total thickness variation.

Example 13. For Example 13, a distributive feed device was utilized to supply the stream of molten glass to the gap between the forming rollers to form the puddle of molten glass. The molten glass had a composition configured to form a glass sheet with an index of refraction of 1.8. Dams were utilized to increase the height of the puddle of molten glass compared to if no dams were utilized. The forming rollers formed a ribbon of glass from the puddle of molten glass. The forming rollers had an outer cylindrical surface at an outer diameter of 104 mm. The forming rollers rotated at a speed of 0.8 m per minute. No heat loss reduction elements were utilized. Nevertheless, horizontal temperature variability was decreased. A glass sheet was separated from the ribbon of glass. A picture of glass sheet is reproduced as FIG. 29. As the picture reveals, the glass sheet is without internal fracture. The profile of the glass sheet was measured via profilometry. A graphical representation of the measurement is reproduced at FIG. 30. The glass sheet had a thickness of 1.4 mm at the center portion, a thickness of 1.6 at the lateral edges, a width of 130 mm, and a length of 450 mm. The glass sheet had an estimated warp of about 200 micrometers, and a total thickness variation of about 300 micrometers.

Example 14. In Example 14 a distributive feed device was utilized to supply the stream of molten glass to the gap between the forming rollers to form the puddle of molten glass. The molten glass had a composition configured to form a glass sheet with an index of refraction of 1.8. The molten glass was delivered at a viscosity of 10 Poise. Dams were not utilized. The forming rollers formed a ribbon of glass from the puddle of molten glass. No heat loss reduction elements were utilized. A glass sheet was separated from the ribbon of glass.

Figure 31:
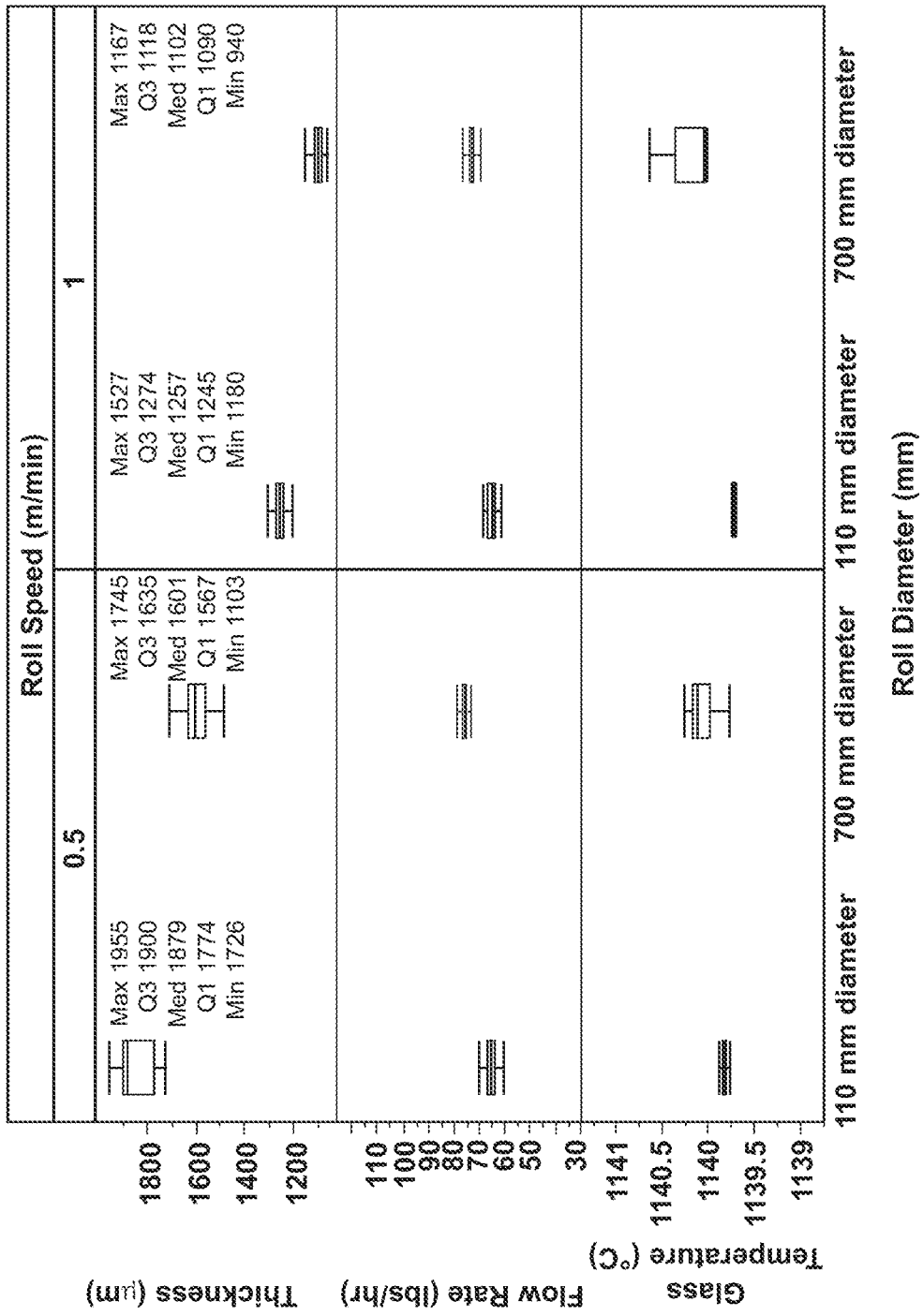
FIG. 31, relating to Example 14, is a graph illustrating that reducing the outer diameter of the forming rollers reduces the thickness of the ribbon of glass and thus the thickness of the sheet of glass separated therefrom.

The rotational speed of the forming rollers was varied between 0.5 m/min and 1.0 m/min, and the outer diameter of the outer cylindrical surface was varied between 70 mm and 110 mm, to determine the effect on thickness of the resulting ribbon of glass (and thus the glass sheets separated therefrom). The volumetric flow rate of the molten glass delivered into the gap between the forming rollers was held relatively constant for each run. As illustrated in the graph reproduced at FIG. 31, for a rotational speed of 0.5 m/min, the forming rollers having the outer diameter of 110 mm formed a ribbon of glass having a median thickness of 1879 μm (1.9~ mm), while the forming rollers having the outer diameter of 70 mm formed a ribbon of glass having a median thickness of 1601 μm (~1.6 mm), which is a reduction in thickness of about 15%. For a rotational speed of 1.0 m/min, the forming rollers having the outer diameter of 110 mm formed a ribbon of glass having a median thickness of 1257 μm (1.3~ mm), while the forming rollers having the outer diameter of 70 mm formed a ribbon of glass having a median thickness of 1102 am (~1.1 mm), which is a reduction in thickness of about 12%.

In addition, the ribbon of glass that the smaller outer diameter forming rollers formed was wider that the ribbon of glass that the larger outer diameter forming rollers formed. That is a consequence of conservation of volume. For any given rotational speed of the forming rollers and volumetric flow rate of molten glass to the forming rollers, a reduction of thickness necessitates an increase in width. In other words, thickness and width are inversely proportional under those conditions.

The invention claimed is:

1. A method of forming a ribbon of glass comprising:
   supplying molten glass into a gap separating a pair of forming rollers,
      the molten glass having a viscosity of 0.01 Poise to 3000 Poise, and
      each of the pair of forming rollers having an outer diameter of 20 mm to 80 mm;
   forming the ribbon of glass from the molten glass; and
   (i) reducing a rate of temperature decrease of the ribbon of glass vertically before the ribbon of glass cools to a glass transition temperature, and/or (ii) increasing the rate of temperature decrease of the ribbon of glass vertically after the ribbon of glass has cooled to the glass transition temperature.

2. The method of claim 1, further comprising controlling horizontal temperature variability of the ribbon of glass to be 10° C. or less across 80 percent of an entire width of the ribbon of glass before the ribbon of glass cools to the glass transition temperature.

3. The method of claim 2, further comprising controlling the horizontal temperature variability of the ribbon of glass to be 10° C. or less across 95 percent of the entire width of the ribbon of glass before the ribbon of glass cools to the glass transition temperature.

4. The method of claim 2, further comprising controlling the horizontal temperature variability of the ribbon of glass to be 5° C. or less across 80 percent of the entire width of the ribbon of glass before the ribbon of glass cools to the glass transition temperature.

5. The method of claim 4, further comprising controlling the horizontal temperature variability of the ribbon of glass to be 5° C. or less across 95 percent of the entire width of the ribbon of glass before the ribbon of glass cools to the glass transition temperature.

6. The method of claim 1, further comprising cooling lateral edges of the ribbon of glass.

7. The method of claim 1, further comprising reducing heat loss at a center portion of the ribbon of glass but not at lateral edges of the ribbon of glass.

8. The method of claim 1, further comprising controlling a cooling rate of the ribbon of glass while the ribbon glass moves vertically downward within a setting zone such that the ribbon of glass has a first cooling rate before the ribbon of glass cools to the glass transition temperature and a second cooling rate after the ribbon of glass cools to the glass transition temperature, the first cooling rate being less than the second cooling rate.

9. The method of claim 8, wherein the ribbon of glass cools at the first cooling rate from 50° C. above the glass transition temperature to the glass transition temperature and wherein the ribbon of glass cools at the second cooling rate from the glass transition temperature to 50° C. below the glass transition temperature.

10. The method of claim 8, further comprising heating the ribbon of glass with heating elements to control the cooling rate of the ribbon of glass.

11. The method of claim 10, further comprising blowing fluid at the ribbon of glass after the ribbon of glass has cooled to the glass transition temperature.

12. The method of claim 1, wherein after the pair of forming roller has formed the ribbon of glass, the ribbon of glass has a viscosity of about $10^7$ Poise.

13. The method of claim 1, further comprising separating a glass sheet from the ribbon of glass.

14. The method of claim 13, wherein the glass sheet has a warp of 100 microns or less.

15. The method of claim 14, wherein the glass sheet has warp of 25 microns or less.

16. The method of claim 13, wherein the glass sheet has a total thickness variation of 100 microns or less.

17. The method of claim 13, wherein:
the glass sheet has a warp of 100 microns or less,
the glass sheet has a total thickness variation of 100 microns or less, and
the glass sheet has a thickness of 0.1 mm to 3.0 mm.

18. The method of claim 13, wherein the glass sheet has an index of refraction of 1.65 or greater.

19. The method of claim 18, wherein the glass sheet has an index of refraction of 1.7 or greater.

* * * * *